US011802764B2

(12) United States Patent
Unger et al.

(10) Patent No.: US 11,802,764 B2
(45) Date of Patent: Oct. 31, 2023

(54) POINT LAYOUT SYSTEM USING SINGLE LASER TRANSMITTER

(71) Applicant: Trimble Navigation Limited, Sunnyvale, CA (US)

(72) Inventors: Eric Keith Unger, Tipp City, OH (US); James N. Hayes, Urbana, OH (US); Chris W. Snyder, Union City, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 141 days.

(21) Appl. No.: 17/545,404

(22) Filed: Dec. 8, 2021

(65) Prior Publication Data

US 2022/0099440 A1   Mar. 31, 2022

Related U.S. Application Data

(62) Division of application No. 15/869,255, filed on Jan. 12, 2018, now Pat. No. 11,226,199.
(Continued)

(51) Int. Cl.
*G01C 3/00* (2006.01)
*G01S 7/48* (2006.01)
(Continued)

(52) U.S. Cl.
CPC ............. *G01C 3/08* (2013.01); *G01C 15/006* (2013.01); *G01C 15/06* (2013.01); *G01S 7/003* (2013.01);
(Continued)

(58) Field of Classification Search
USPC ...................................................... 356/4.01
See application file for complete search history.

(56) References Cited

U.S. PATENT DOCUMENTS

| 4,029,415 A | 6/1977 | Johnson |
| 4,035,084 A | 7/1977 | Ramsay |

(Continued)

FOREIGN PATENT DOCUMENTS

| DE | 69122965 | 3/1992 |
| DE | 69224671 | 3/1994 |

(Continued)

OTHER PUBLICATIONS

Spectra Precision QML800 / QML800G QuickMark Layout User Guide; Published by Trimble Navigation Ltd, Apr. 2016. (45 pages).
(Continued)

*Primary Examiner* — James R Hulka
(74) *Attorney, Agent, or Firm* — Frederick H. Gribbell; Russell F. Gribbell; Aaron S. Brodsky

(57) ABSTRACT

A laser controller having an electronic distance measuring instrument and a laser light transmitter creating a vertical laser plane is used with a remote controller and a movable target for point layout tasks. The electronic distance measurer and laser transmitter are mounted on the same vertical pivot axis. Once the system is set-up for a particular jobsite, the laser plane can be aimed at a specific point of interest on the jobsite floor, and a visible laser light line will then appear on the floor, from the laser controller, all the way to that point of interest. The distance measuring instrument is aimed along the same heading as the laser plane, and it gives the distance to the movable target, which is moved along the visible laser light line, until reaching the specified distance, and thereby find the point of interest.

9 Claims, 23 Drawing Sheets

Related U.S. Application Data

(60) Provisional application No. 62/447,078, filed on Jan. 17, 2017.

(51) Int. Cl.

| | | |
|---|---|---|
| *G01C 3/08* | (2006.01) | |
| *G01S 7/497* | (2006.01) | |
| *G01S 7/481* | (2006.01) | |
| *G01C 15/00* | (2006.01) | |
| *G01C 15/06* | (2006.01) | |
| *G01S 17/74* | (2006.01) | |
| *G01S 7/00* | (2006.01) | |
| *G01S 17/42* | (2006.01) | |

(52) U.S. Cl.
CPC ............ *G01S 7/4813* (2013.01); *G01S 7/497* (2013.01); *G01S 17/42* (2013.01); *G01S 17/74* (2013.01)

(56) References Cited

U.S. PATENT DOCUMENTS

| | | |
|---|---|---|
| 4,598,481 A | 7/1986 | Donahue |
| 4,820,041 A | 4/1989 | Davidson |
| 4,836,671 A | 6/1989 | Bautista |
| 5,076,690 A | 12/1991 | deVos |
| 5,100,202 A | 3/1992 | Hughes |
| 5,100,229 A | 3/1992 | Lundberg |
| 5,110,202 A | 5/1992 | Dornbusch |
| 5,137,354 A | 8/1992 | deVos |
| 5,243,398 A | 9/1993 | Nielsen |
| 5,272,814 A | 12/1993 | Key |
| 5,294,970 A | 3/1994 | Dornbusch |
| 5,539,990 A | 7/1996 | Le |
| 5,579,102 A | 11/1996 | Pratt |
| 5,588,216 A | 12/1996 | Rank |
| 5,598,269 A | 1/1997 | Kitaevich |
| 5,864,956 A | 2/1999 | Dong |
| 5,983,510 A | 11/1999 | Wu |
| 6,035,540 A | 3/2000 | Wu |
| 6,140,957 A | 10/2000 | Wilson |
| 6,501,543 B2 | 12/2002 | Hedges |
| 6,545,751 B2 | 4/2003 | Beliveau |
| 6,763,595 B1 | 7/2004 | Hersey |
| 7,110,092 B2 | 9/2006 | Kasper |
| 7,148,958 B2 | 12/2006 | Ohtomo |
| 7,644,505 B2 | 1/2010 | Zeng |
| 7,679,727 B2 | 3/2010 | Benz |
| 7,992,310 B2 | 8/2011 | Litvin |
| 8,087,176 B1 | 1/2012 | Hayes |
| 8,269,984 B2 | 9/2012 | Hinderling |
| 8,281,495 B2 | 10/2012 | Hayes |
| 8,307,562 B2 | 11/2012 | Bascom |
| 8,553,212 B2 | 10/2013 | Jaeger |
| 8,595,946 B2 | 12/2013 | Hayes |
| 9,176,598 B2 * | 11/2015 | Sweetser ............... G06F 3/0325 |
| 9,182,229 B2 * | 11/2015 | Grässer .................. G01C 15/06 |
| 9,523,575 B2 * | 12/2016 | Kumagai ............... G01C 15/004 |
| 9,605,957 B2 * | 3/2017 | Nishita ................ G01C 15/105 |
| 9,879,993 B2 * | 1/2018 | McFadden ............. G01C 11/02 |
| 2002/0008870 A1 * | 1/2002 | Beliveau ............. G01C 15/002 |
| | | 356/152.1 |
| 2002/0033940 A1 * | 3/2002 | Hedges ................ G01C 15/002 |
| | | 356/141.4 |
| 2003/0174305 A1 * | 9/2003 | Kasper .................. G01S 1/7038 |
| | | 356/3.09 |
| 2004/0177523 A1 | 9/2004 | Chang |
| 2005/0099617 A1 * | 5/2005 | Ohtomo ............... G01C 15/004 |
| | | 356/11 |
| 2005/0102063 A1 | 5/2005 | Bierre |
| 2006/0179672 A1 | 8/2006 | Tacklind |
| 2006/0280212 A1 | 12/2006 | Lu |
| 2007/0289152 A1 * | 12/2007 | Zeng ...................... G01C 15/06 |
| | | 702/1 |
| 2008/0204699 A1 * | 8/2008 | Benz ...................... G01S 17/875 |
| | | 356/614 |
| 2010/0039712 A1 * | 2/2010 | Litvin .................. G01C 15/004 |
| | | 359/738 |
| 2010/0296075 A1 * | 11/2010 | Hinderling ............. G01S 7/4972 |
| | | 356/3 |
| 2011/0265336 A1 * | 11/2011 | Bascom ................. G01C 15/00 |
| | | 33/286 |
| 2011/0314684 A1 | 12/2011 | Hayes |
| 2012/0008136 A1 * | 1/2012 | Jaeger .................. G01C 15/002 |
| | | 356/138 |
| 2012/0042529 A1 * | 2/2012 | Hayes .................. G01C 15/004 |
| | | 33/291 |
| 2012/0166137 A1 * | 6/2012 | Grasser .................. G01C 15/06 |
| | | 702/150 |
| 2012/0186088 A1 | 7/2012 | Amor |
| 2012/0198711 A1 | 8/2012 | Hayes |
| 2012/0203502 A1 | 8/2012 | Hayes |
| 2012/0242830 A1 * | 9/2012 | Kumagai ............. G01C 15/002 |
| | | 348/135 |
| 2013/0019486 A1 * | 1/2013 | Hayes .................. G01C 15/004 |
| | | 33/228 |
| 2015/0268043 A1 * | 9/2015 | McFadden ............. G01C 11/02 |
| | | 702/159 |
| 2015/0276402 A1 * | 10/2015 | Grässer .................. G01C 15/06 |
| | | 702/150 |
| 2016/0076885 A1 * | 3/2016 | Nishita ................ G01C 25/005 |
| | | 29/428 |
| 2016/0116282 A1 | 4/2016 | Unger |
| 2018/0202805 A1 * | 7/2018 | Unger ...................... G01S 7/4813 |

FOREIGN PATENT DOCUMENTS

| | | |
|---|---|---|
| DE | 19527829 | 1/1997 |
| DE | 19648626 | 5/1998 |
| DE | 102011077080 | 12/2011 |
| EP | 2226610 | 9/2010 |
| EP | 2503284 | 9/2012 |
| EP | 2998701 | 3/2016 |
| JP | 10239057 | 9/1998 |
| WO | 2009053085 | 4/2009 |

OTHER PUBLICATIONS

Spectra Precision QuickMark Layout White Paper; Published by Trimble Navigation Ltd, Apr. 2016. (9 pages).
Article 19 "Informal Comments" from PCT/US2018/013467.
Exhibit A for "Informal Comments" from PCT/US2018/013467.
Exhibit B for "Informal Comments" from PCT/US2018/013467.
Topcon LN-100 Layout Navigator Catalog—© 2014.
PCT International Preliminary Report on Patentability (dated Apr. 10, 2018).
PCT Invitation to Pay Additional Fees (dated Apr. 10, 2018).

* cited by examiner

POINT LAYOUT SYSTEM USING SINGLE LASER TRANSMITTER

CROSS-REFERENCE TO RELATED APPLICATIONS

The present application is a divisional of application Ser. No. 15/869,255, titled "POINT LAYOUT SYSTEM USING SINGLE LASER TRANSMITTER," filed on Jan. 12, 2018; and claims priority to provisional patent application Ser. No. 62/447,078, titled "POINT LAYOUT SYSTEM USING SINGLE LASER TRANSMITTER," filed on Jan. 17, 2017.

TECHNICAL FIELD

The technology disclosed herein relates generally to layout "surveying" equipment and is particularly directed to a two-dimension layout system of the type which identifies points and their coordinates, and transfers identified points on a surface to other surfaces in a vertical direction. An embodiment is specifically disclosed using a single laser controller having a laser light transmitter that creates a vertical laser plane, an electronic distance measuring instrument, and a remote controller to control certain functions, with a movable target for use with the electronic distance measuring instrument. The laser light transmitter and the electronic distance measuring instrument are mounted on a rotatable platform that can be rotated to any azimuth direction (or "heading"), and then the laser transmitter will produce a "static" (non-moving) vertical laser plane at that desired heading. Preferably the laser transmitter includes a self-leveling capability, with a rotation axis about the azimuth, and emits a substantially vertical (plumb) laser plane output (as a fan beam or a rotating laser line).

The laser controller used in this technology is a simplified and reduced cost laser based layout system that is intended to aid in the placement of wall tracks and/or framed wall structures for the construction of steel frame buildings and possibly residential structures. Low cost and ease of use are forefront to the overall design criteria, which is directed to a system that needs only a single user for controlling the remote controller, while also moving the target to a correct location on the physical jobsite floor. In the illustrated embodiment, the electronic distance measuring instrument comprises a laser distance meter (LDM) that is mounted on the same vertical pivot axis as the laser transmitter that emits a fan beam.

Once the system is set up for a particular jobsite, the laser fan beam can then be aimed at a specific point of interest on the physical jobsite floor, and a visible laser light line will then appear along the floor from the laser controller, all the way to that point of interest and beyond, if there is no obstruction on the floor to block the laser light line. This vertical laser fan beam is a "static" plane of laser light energy; it is not a continually moving "dynamic" laser beam such as that produced by some conventional surveying or layout systems. Even if the vertical laser plane is produced by a rotating laser beam, that laser plane nevertheless is "static" in effect, because it rotates in a single (static) vertical laser plane, and it does not jump around all over the jobsite, as do the "dynamic" conventional systems. The laser distance meter will be aimed along the same azimuth as the vertical laser plane, so that the LDM will always be able to give the correct distance along that azimuth, throughout any point layout procedures.

Once the laser plane has been "aimed" at a particular point of interest, the typical action of the user will be to view the laser light line on the jobsite floor and to follow that laser light line with the movable target, while monitoring the distance between the laser controller and the movable target (as determined by the LDM). The user can either view a displayed readout (or light) on the remote controller, or view an indicating lamp on the laser controller, to discover when the user is approaching the correct distance to the point of interest, along that laser light line.

Optionally, the remote controller could emanate an audible sound for that purpose, perhaps at a different pitch, or at a different rate of beeping, as the correct distance to the point of interest is being reached. As another option, the laser controller could flash the visible wavelength light fan beam, perhaps at a varying flashing rate as the correct distance to the point of interest is being reached. When the user has reached the point of interest with the movable target, the remote controller will so indicate (as will the lamp on the laser controller), and the user can then place a mark on the physical jobsite floor along the laser light line, for future use as a visible indication of the correct spot of that point of interest.

If the target is oriented plumb, which is recommended, the laser fan beam will produce an "L-mark" on the combination of the jobsite floor surface and the target surface. The jobsite floor surface will exhibit a horizontal laser light line that is in the correct azimuth direction from the laser controller, and the target surface will exhibit a vertical laser light line that is at the correct distance (to a point of interest, or to a control point). The intersection of the L-shaped light lines will be at the elbow of the "L-mark" and further, this L-mark intersection will be located precisely at the point of interest, for example, that is to be laid out.

To lay out multiple points on a jobsite, the user could use a stick RAM (e.g., a Flash memory chip) to store the coordinates of the points of interest to be laid out. The stick RAM could be inserted into a USB port on the tablet (i.e., the remote controller), and the software on the tablet could then automatically send a command to the laser controller to direct the laser fan beam to the heading for the first point of interest on the user's point list. After each point of interest has been marked, the user could enter that status on the tablet's input circuit (e.g., on a keypad, or on a touchscreen display, of the tablet), and then the remote controller could send a command to the laser controller to now aim at the next point of interest on the layout point list. The laser controller could then automatically rotate the laser fan beam to the correct heading for that next point of interest, and so on, until all points of interest on the layout point list for that particular portion of the jobsite floor have been laid out. The software could be allowed to automatically select the order in which the various points of interest are to be laid out, or the user could make that selection manually, and thereby command the remote controller to create the layout point list in the order that is selected by the user.

As an alternative methodology, (using the Internet or other network) the user could access a remote data file that is stored in the cloud, or in the memory of a separate computer. This data file could be a CAD file that contains a virtual jobsite floor plan, for example, and once it was downloaded to the remote controller, that data file could show a graphical representation of the jobsite floor plan (in at least two dimensions) on the display monitor (a visual display screen) of the remote controller, while also showing the various known points of interest that are to be laid out by the user. With appropriate software, the user could touch the remote controller touchscreen right on one of the displayed points of interest, and the laser controller could then be commanded to automatically rotate the fan beam to aim at that specific point of interest, literally showing the way for the user to move to that point of interest, with a laser light line along the physical jobsite floor.

Another alternative methodology is to provide a simplified laser controller that uses a laser transmitter that produces a vertical laser fan beam, but does not require any type of electronic distance measuring instrument. In this alternative system, the laser transmitter is aimed at control points or at points of interest, similarly to the systems described above, but the actual distance measurements are performed manually, by using a tape measure, for example. This alternative system is still quite easy to use, because the user only needs to follow the visible laser light line that appears on the physical jobsite floor surface while extending the tape measure to the physical spot where either the control point, or the point of interest, is located.

Another alternative embodiment is to provide a separate laser receiver for detecting the laser light fan beam from the laser controller. This could be useful in "bright light" situations, in which the sunlight is so intense that a visible wavelength laser plane would be difficult to see. A laser receiver could be mounted to a movable accessory cart in a manner so that the photosensor is running horizontally (rather than vertically, as in a laser receiver used as an elevation sensor). When the laser plane impacts the photosensor, the laser receiver can provide an audible and/or visual indication of "LEFT" or "RIGHT," until the user moves the laser receiver's "null" point to the exact position of the laser plane. When that occurs, the laser receiver can provide an audible and/or visual indication of "ON AZIMUTH," which would be a distinctly different sound or light.

The use of the separate laser receiver also allows for a greater distance between the laser controller and the laser receiver, when the laser light plane becomes less intense at the target screen and laser receiver. Additionally, an invisible light laser transmitter could be used along with the laser receiver on the accessory cart.

STATEMENT REGARDING FEDERALLY SPONSORED RESEARCH OR DEVELOPMENT

None.

BACKGROUND

A common method in the conventional art for locating a point of interest on a jobsite is through the use of a "total station" or a "robotic total station." A total station is an electronic/optical instrument with the ability to precisely orient itself in rotation and provide distance measurements. Once the instrument is set up and oriented to a jobsite work area, through the use of several known coordinates on the jobsite, any point of interest can be located.

For example, a robotic total station has the capability to track automatically a retro-prism. Referring now to FIG. 16, such a prism 3 is mounted to a pole 4 along with a robotic total station controller 5, for controlling the entire system. After a point of interest is selected (typically from a point list), the robotic total station 1 will follow the human user 2 with the prism 3 and pole 4 as the user approaches the desired location for that point of interest. A common procedure would go something like the following:

(1) The user selects the point of interest 7 from the point list on the controller 5.

(2) The user decides to move in a direction thought to be toward the point of interest.

(3) As the user moves, the total station 1 tracks and measures the azimuth angle and distance to the prism 3. The position of the pole 4 can be calculated from the measured angle and distance to the prism 3.

(4) Since there is no visual indication on the jobsite as to where the actual point is, the user may (inadvertently) choose to go in a direction that moves farther from the desired point of interest 7. The robotic total station 1 will display that to the user on the controller 5, and the user will have to choose a new direction so as to close in on the final (desired) location.

(5) As the user closes in on the point of interest 7, he will set the pole 4 at a location he feels is near to the final location, and will carefully level the pole while observing the controller 5 display for an indication of the actual pole location.

(6) Invariably the pole 4 location is off a little, and the user will then move the pole 4 in a direction that is felt to close in on the final (correct) location, re-level the pole 4 and observe the new pole location as calculated by the robotic total station 1. It must be emphasized that the correct heading 6 (i.e., the correct azimuth) that the user 2 should be "looking for" cannot be seen visually. All he has are distance and angle readouts on the display of the controller 5.

(7) The process is repeated until the pole 4 location is close enough to satisfy the user.

A non-robotic total station can also be used for locating points of interest on a jobsite work area. For example, the use of a non-robotic total station to locate points of interest on a jobsite would require an additional person behind the instrument (i.e., the total station). This added person is needed to manually view the pole 4 and prism 3 through the telescope of the total station and, using hand signals, to direct the user 2 holding the pole 4 to move left or right to stay on the correct heading. Otherwise, the procedure to converge onto the desired point of interest would follow a similar procedure as that outlined above for the robotic total station.

The difficulty for performing the above, seemingly simple, tasks is hard to imagine, unless one has actually done those tasks. It is especially difficult for the user who is walking around with the pole 4, trying to get the prism 3 at the correct, precise, location of that desired point of interest, while also holding the pole in a vertical (plumb) orientation. Of course, such procedures become more routine after many repetitions, but it is still a labor-intensive and exacting function that often must be performed outdoors, while exposed to the weather and bothersome insects.

SUMMARY

Accordingly, it is an advantage to provide a point layout system for use on jobsite floors that uses a single laser controller with a rotatable laser light transmitter that creates a vertical laser plane and an electronic distance measuring instrument that aims along the same vertical laser plane, and a remote controller to control certain functions, with a movable target for use with the electronic distance measuring instrument.

It is another advantage to provide a point layout system in which a laser controller emits a rotatable vertical laser plane that can be aimed at a specific point of interest on the jobsite floor, and a visible laser light line will then appear on the floor from the laser controller all the way to that point of interest and beyond. A laser distance meter (LDM) will be aimed along the same heading as the vertical laser plane, so that LDM will always be able to give the correct distance along that azimuth, throughout any point layout procedures.

It is yet another advantage to provide a laser controller with a rotatable laser light transmitter that creates a vertical laser plane and an electronic distance measuring instrument that aims along the same vertical laser plane, and a remote controller to control certain functions. A human user views a visible laser light line on the jobsite floor (produced by the vertical laser plane) and follows that laser light line with a movable target screen, while monitoring the distance between the laser controller and the point of interest on the display monitor of the remote controller. When the user has reached the point of interest, the remote controller and/or the laser controller will so indicate, and the user can then place a mark on the jobsite floor along the laser light line and right at (or near) the bottom edge of the target screen, for future use as a visible indication of the correct spot of that point of interest. The surface of the target screen will clearly show the laser fan beam as a highly visible vertical laser light line, usually all the way down to its bottom edge (proximal to—i.e., at or near—the floor level). The combination of the vertical laser light line on the target screen and the horizontal laser light line on the jobsite floor will produce a visible "L-mark," directly at, or proximal to, the point of interest.

It is still another advantage to provide a laser controller with a rotatable laser light transmitter that creates a vertical laser plane and an electronic distance measuring instrument that aims along the same vertical laser plane, and a remote controller that is mounted on a movable accessory cart. The accessory cart also holds a target screen near floor level, for use with the electronic distance measuring instrument. To find a point of interest, the human user steers the accessory cart so as to follow a visible laser light line produced by the vertical laser plane, until reaching the correct distance, as indicated by the remote controller and/or the laser controller. The user can then place a mark on the jobsite floor along the laser light line, and right at (or near) the bottom edge of the target screen. The surface of the target screen will clearly show the laser fan beam as a highly visible vertical laser light line, usually all the way down to its bottom edge (proximal to—i.e., at or near—the floor level). The combination of the vertical laser light line on the target screen and the horizontal laser light line on the jobsite floor will produce a visible "L-mark," directly at, or proximal to, the point of interest.

It is a further advantage to provide a laser controller with a rotatable laser light transmitter that creates a vertical laser plane and an electronic distance measuring instrument that aims along the same vertical laser plane, and a remote controller to control certain functions. The laser controller is readily set up with the jobsite floor plan coordinate system by aiming the vertical laser plane at a known control point of the jobsite floor surface, which is easily accomplished, because the vertical laser plane produces a very visible laser light line on the jobsite surface that can be easily aimed directly at the control point. Once the vertical laser plane is aiming at the correct heading, the human user places a target screen right at the control point, and commands the electronic distance measuring instrument to take a sample measurement, and that distance and heading become known data for the overall control system (which the remote controller will keep track of). The same steps are repeated for a second known control point on the jobsite floor, and once all the distance and angle data is entered into the remote controller (along with the jobsite floor plan coordinates of the two control points), then the exact position of the laser controller can be calculated, in terms of this jobsite's floor plan coordinates. The laser controller can then proceed to lay out multiple points of interest on that jobsite surface.

It is a yet further advantage to provide a laser controller with a rotatable laser light transmitter that creates a vertical laser plane, and a remote controller to perform and control certain functions. After being placed on a jobsite floor surface and being set up in a jobsite floor plan, the laser controller can be commanded to aim its vertical laser plane at a point of interest, and thereby produce a visible laser light line along the jobsite floor surface that visually directs a human user to the specified physical point of interest. The user can view the display monitor on the remote controller to learn the appropriate distance between the laser controller and that point of interest. The user can stretch a tape measure from the laser controller, along the laser light line, for the specified distance, and that physical point of interest will have been found, which then can be marked on the jobsite floor.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, a layout and point transfer system is provided, which comprises: (a) a laser controller, including: (i) a laser light transmitter that emits a substantially vertical plane of visible laser light, the laser light transmitter being rotatable about a substantially vertical axis; (ii) an electronic distance measuring instrument that is rotatable about the substantially vertical axis; (iii) an electronic angle measuring instrument; and (iv) a first processing circuit, a first memory circuit including instructions executable by the first processing circuit, a first communications circuit, and a first input/output interface circuit; (b) a remote controller, including: (i) a second processing circuit, a second memory circuit including instructions executable by the second processing circuit, a second communications circuit, a display monitor, a user-operated input circuit, and a second input/output interface circuit, wherein the laser controller and the remote controller communicate with one another by use of the first and second communications circuits; and (c) a movable target screen, comprising: (i) a surface that is at least partially reflective to emissions from the electronic distance measuring instrument; wherein: (d) the first and second processing circuits are programmed with software to perform functions of: (i) using the laser light transmitter, emitting the substantially vertical plane of visible laser light, thereby creating a visible laser light line along a jobsite surface; (ii) using the electronic angle measuring instrument, aiming the laser light transmitter in a predetermined heading so that the visible laser light line crosses a predetermined point of interest on the jobsite surface; (iii) using the electronic distance measuring instrument, monitoring a physical distance between the electronic distance measuring instrument and the movable target screen, as the movable target screen is moved along the visible laser light line; and (iv) if the movable target screen is moved to a predetermined distance along the visible laser light line, then at least one of (A) the laser controller and (B) the remote controller provides a predetermined indication to show an ON POINT status, which corresponds to a physical location of the predetermined point of interest on the jobsite surface.

In accordance with another aspect, a method for using a layout and point transfer system is provided, in which the method comprises the following steps: (a) providing a laser controller, which includes: (i) a laser light transmitter that emits a substantially vertical plane of visible laser light, the laser light transmitter being rotatable about a substantially vertical axis; (ii) an electronic distance measuring instrument that is rotatable about the substantially vertical axis; (iii) an electronic angle measuring instrument; and (iv) a first processing circuit, a first memory circuit including instructions executable by the first processing circuit, a first communications circuit, and a first input/output interface circuit; (b) providing a remote controller, which includes: a second processing circuit, a second memory circuit including instructions executable by the second processing circuit, a second communications circuit, a display monitor, a user-operated input circuit, and a second input/output interface circuit, wherein the laser controller and the remote controller communicate with one another by use of the first and second communications circuits; (c) placing the laser controller on a jobsite surface in a work area; (d) finding, on the jobsite surface, a predetermined point of interest, by: (i) using the laser light transmitter, emitting the substantially vertical plane of visible laser light, thereby creating a visible laser light line along the jobsite surface; (ii) using the electronic angle measuring instrument, aiming the laser light transmitter in a predetermined heading so that the visible laser light line crosses the predetermined point of interest on the jobsite surface; (iii) using the electronic distance measuring instrument, monitoring a physical distance between the electronic distance measuring instrument and a movable target screen, as the movable target screen is moved along the visible laser light line; and (iv) if the movable target screen is moved to a predetermined distance along the visible laser light line, then providing a predetermined indication to show an ON POINT status, which corresponds to a physical location of the predetermined point of interest on the jobsite surface.

In accordance with yet another aspect, a method for setting up a layout and point transfer system is provided, in which the method comprises the following steps: (a) providing a laser controller, which includes: (i) a laser light transmitter that emits a substantially vertical plane of visible laser light, the laser light transmitter being rotatable about a substantially vertical axis; (ii) an electronic distance measuring instrument that is rotatable about the substantially vertical axis; (iii) an electronic angle measuring instrument; and (iv) a first processing circuit, a first memory circuit including instructions executable by the first processing circuit, a first communications circuit, and a first input/output interface circuit; (b) providing a remote controller, which includes: a second processing circuit, a second memory circuit including instructions executable by the second processing circuit, a second communications circuit, a display monitor, a user-operated input circuit, and a second input/output interface circuit, wherein the laser controller and the remote controller communicate with one another by use of the first and second communications circuits; (c) placing the laser controller on a jobsite surface in a work area; (d) identifying a first control point on the jobsite surface, then: (i) using the laser light transmitter, emitting the substantially vertical plane of visible laser light, thereby creating a visible laser light line along the jobsite surface; (ii) aiming the laser light transmitter so that the visible laser light line crosses the first control point; (iii) using the electronic angle measuring instrument, determining a first heading to the first control point; (iv) placing a target screen at the first control point; and (v) using the electronic distance measuring instrument, determining a first physical distance between the electronic distance measuring instrument and the target screen; (e) identifying a second control point on the jobsite surface, then: (i) using the laser light transmitter, emitting the substantially vertical plane of visible laser light, thereby creating a visible laser light line along the jobsite surface; (ii) aiming the laser light transmitter so that the visible laser light line crosses the second control point; (iii) using the electronic angle measuring instrument, determining a second heading to the second control point; (iv) placing a target screen at the second control point; and (v) using the electronic distance measuring instrument, determining a second physical distance between the electronic distance measuring instrument and the target screen; and (f) using jobsite coordinates of (i) the first control point and (ii) the second control point, and using (iii) the first physical distance, (iv) the second physical distance, (v) the first heading data, and (vi) the second heading data, determining, in terms of jobsite coordinates, a position of the laser controller on the jobsite surface.

In accordance with still another aspect, a portable layout cart accessory is provided, which comprises: (a) a remote controller, including: a processing circuit, a memory circuit including instructions executable by the processing circuit, a wireless communications circuit, a display monitor, a user-operated input circuit, and an input/output interface circuit; (b) a target screen, comprising: a surface that is at least partially reflective to at least one of (i) electromagnetic emissions and (ii) sonic emissions; and (c) a movable chassis with at least one mounting bracket for holding at least one of (i) the remote controller and (ii) the target screen; wherein: the display monitor outputs a visible message to show an ON POINT status, if the target screen is moved to a predetermined point of interest on a jobsite surface.

In accordance with yet a further aspect, a method for setting up a layout and point transfer system is provided, in which the method comprises the following steps: (a) providing a laser controller, which includes: (i) a laser light transmitter that emits a substantially vertical plane of visible laser light, the laser light transmitter being rotatable about a substantially vertical axis; (ii) an electronic angle measuring instrument; and (iii) a first processing circuit, a first memory circuit including instructions executable by the first processing circuit, a first communications circuit, and a first input/output interface circuit; (b) providing a remote controller, which includes: a second processing circuit, a second memory circuit including instructions executable by the second processing circuit, a second communications circuit, a display monitor, a user-operated input circuit, and a second input/output interface circuit, wherein the laser controller and the remote controller communicate with one another by use of the first and second communications circuits; (c) placing the laser controller on a jobsite surface in a work area; (d) finding, on the jobsite surface, a predetermined point of interest, by: (i) using the laser light transmitter, emitting the substantially vertical plane of visible laser light, thereby creating a visible laser light line along the jobsite surface; (ii) using the electronic angle measuring instrument, aiming the laser light transmitter in a predetermined heading so that the visible laser light line crosses the predetermined point of interest on the jobsite surface; (iii) using the remote controller, displaying a numeric distance between the laser controller and the predetermined point of interest; and (iv) placing a tape measure along the visible laser light line and measuring a physical distance from the laser controller until reaching the numeric distance that is displayed on the remote controller, which corresponds to a physical location of the predetermined point of interest on the jobsite surface.

In accordance with a further aspect, a layout and point transfer system is provided, which comprises: (a) a laser controller, including: (i) a laser light transmitter that emits a substantially vertical plane of visible wavelength laser light, the laser light transmitter being rotatable about a substantially vertical axis; (ii) an electronic distance measuring instrument that is rotatable about the substantially vertical axis; (iii) an electronic angle measuring instrument; and (iv) a first processing circuit, a first memory circuit including instructions executable by the first processing circuit, a first communications circuit, and a first input/output interface circuit; (b) a remote controller, including: (i) a second processing circuit, a second memory circuit including instructions executable by the second processing circuit, a second communications circuit, a display monitor, a user-operated input circuit, and a second input/output interface circuit, wherein the laser controller and the remote controller communicate with one another by use of the first and second communications circuits; and (c) a movable target screen, comprising: (i) a surface that is at least partially reflective to emissions from the electronic distance measuring instrument; wherein: (d) the first and second processing circuits are programmed with software, so as: (i) using the laser light transmitter, to emit the substantially vertical plane of visible wavelength laser light; (ii) using the electronic angle measuring instrument, to aim the laser light transmitter in a predetermined heading so that the substantially vertical plane of visible wavelength laser light is aimed at a predetermined point of interest on the jobsite surface; (iii) using the electronic distance measuring instrument, to monitor a physical distance between the electronic distance measuring instrument and the movable target screen, as the movable target screen is moved along the substantially vertical plane of visible wavelength laser light; and (iv) if the movable target screen is moved to a predetermined distance along the substantially vertical plane of visible wavelength laser light, then at least one of (A) the laser controller and (B) the remote controller provides a predetermined indication to show an ON POINT status, which corresponds to a physical location of the predetermined point of interest on the jobsite surface.

In accordance with a further aspect, a method for using a layout and point transfer system is provided, in which the method comprises the following steps: (a) providing a laser controller, which includes: (i) a laser light transmitter that emits a substantially vertical plane of visible wavelength laser light, the laser light transmitter being rotatable about a substantially vertical axis; (ii) an electronic distance measuring instrument that is rotatable about the substantially vertical axis; (iii) an electronic angle measuring instrument; and (iv) a first processing circuit, a first memory circuit including instructions executable by the first processing circuit, a first communications circuit, and a first input/output interface circuit; (b) providing a remote controller, which includes: a second processing circuit, a second memory circuit including instructions executable by the second processing circuit, a second communications circuit, a display monitor, a user-operated input circuit, and a second input/output interface circuit, wherein the laser controller and the remote controller communicate with one another by use of the first and second communications circuits; (c) placing the laser controller on a jobsite surface in a work area; (d) finding, on the jobsite surface, a predetermined point of interest, by: (i) using the laser light transmitter, emitting the substantially vertical plane of visible wavelength laser light, thereby creating a visible laser light line along the jobsite surface; (ii) using the electronic angle measuring instrument, aiming the laser light transmitter in a predetermined heading so that the vertical plane of visible wavelength laser light crosses the predetermined point of interest on the jobsite surface; (iii) using the electronic distance measuring instrument, monitoring a physical distance between the electronic distance measuring instrument and a movable target screen, as the movable target screen is moved along the visible laser light line; and (iv) if the movable target screen is moved to a predetermined distance along the visible laser light line, then providing a predetermined indication to show an ON POINT status, which corresponds to a physical location of the predetermined point of interest on the jobsite surface.

In accordance with a further aspect, a method for setting up a layout and point transfer system is provided, in which the method comprises the following steps: (a) providing a laser controller, which includes: (i) a laser light transmitter that emits a substantially vertical plane of visible wavelength laser light, the laser light transmitter being rotatable about a substantially vertical axis; (ii) an electronic distance measuring instrument that is rotatable about the substantially vertical axis; (iii) an electronic angle measuring instrument; and (iv) a first processing circuit, a first memory circuit including instructions executable by the first processing circuit, a first communications circuit, and a first input/output interface circuit; (b) providing a remote controller, which includes: a second processing circuit, a second memory circuit including instructions executable by the second processing circuit, a second communications circuit, a display monitor, a user-operated input circuit, and a second input/output interface circuit, wherein the laser controller and the remote controller communicate with one another by use of the first and second communications circuits; (c) placing the laser controller on a jobsite surface in a work area; (d) identifying a first control point on the jobsite surface, then: (i) using the laser light transmitter, emitting the substantially vertical plane of visible wavelength laser light, thereby creating a visible laser light line along the jobsite surface; (ii) aiming the laser light transmitter so that the vertical plane of visible wavelength laser light crosses the first control point; (iii) using the electronic angle measuring instrument, determining a first heading to the first control point; (iv) placing at least one movable target screen at the first control point; and (v) using the electronic distance measuring instrument, determining a first physical distance between the electronic distance measuring instrument and the target screen; (e) identifying a second control point on the jobsite surface, then: (i) using the laser light transmitter, emitting the substantially vertical plane of visible wavelength laser light, thereby creating a visible laser light line along the jobsite surface; (ii) aiming the laser light transmitter so that the vertical plane of visible wavelength laser light crosses the second control point; (iii) using the electronic angle measuring instrument, determining a second heading to the second control point; (iv) placing the at least one movable target screen at the second control point; and (v) using the electronic distance measuring instrument, determining a second physical distance between the electronic distance measuring instrument and the target screen; and (f) using jobsite coordinates of (i) the first control point and (ii) the second control point, and using (iii) the first physical distance, (iv) the second physical distance, (v) the first heading data, and (vi) the second heading data, determining, in terms of jobsite coordinates, a position of the laser controller on the jobsite surface.

In accordance with a further aspect, a method for using a layout and point transfer system is provided, in which the method comprises the following steps: (a) providing a laser controller, which includes: (i) a laser light transmitter that emits a substantially vertical plane of visible wavelength laser light, the laser light transmitter being rotatable about a substantially vertical axis; (ii) an electronic angle measuring instrument; and (iii) a first processing circuit, a first memory circuit including instructions executable by the first processing circuit, a first communications circuit, and a first input/output interface circuit; (b) providing a remote controller, which includes: a second processing circuit, a second memory circuit including instructions executable by the second processing circuit, a second communications circuit, a display monitor, a user-operated input circuit, and a second input/output interface circuit, wherein the laser controller and the remote controller communicate with one another by use of the first and second communications circuits; (c) placing the laser controller on a jobsite surface in a work area; (d) after the laser controller has been registered with a virtual floor plan for the jobsite surface; (e) finding, on the jobsite surface, a predetermined point of interest, by: (i) using the laser light transmitter, emitting the substantially vertical plane of visible wavelength laser light, thereby creating a visible laser light line along the jobsite surface; (ii) using the electronic angle measuring instrument, aiming the laser light transmitter in a predetermined heading so that the vertical plane of visible wavelength laser light crosses the predetermined point of interest on the jobsite surface; (iii) using the remote controller, displaying a numeric distance between the laser controller and the predetermined point of interest; and (iv) placing a tape measure along the visible laser light line and measuring a physical distance from the laser controller until reaching the numeric distance that is displayed on the remote controller, which corresponds to a physical location of the predetermined point of interest on the jobsite surface.

In accordance with a further aspect, a portable layout cart accessory is provided, which comprises: (a) a remote controller, including: a processing circuit, a memory circuit including instructions executable by the processing circuit, a wireless communications circuit, a display monitor, a user-operated input circuit, and an input/output interface circuit; (b) a target screen, comprising: a surface that is at least partially reflective to at least one of (i) electromagnetic emissions and (ii) sonic emissions; and (c) a movable chassis with at least one mounting bracket for holding at least one of (i) the remote controller and (ii) the target screen; wherein: the display monitor outputs a visible message to show an ON POINT status, if the target screen is moved to a predetermined point of interest on a jobsite surface.

In accordance with a yet further aspect, a layout and point transfer system is provided, which comprises: (a) a laser controller, including: (i) a laser light transmitter that emits a substantially vertical plane of laser light, the laser light transmitter being rotatable about a substantially vertical axis; (ii) an electronic distance measuring instrument that is rotatable about the substantially vertical axis; (iii) an electronic angle measuring instrument; and (iv) a first processing circuit, a first memory circuit including instructions executable by the first processing circuit, a first communications circuit, and a first input/output interface circuit; (b) a remote controller, including: (i) a second processing circuit, a second memory circuit including instructions executable by the second processing circuit, a second communications circuit, a display monitor, a user-operated input circuit, and a second input/output interface circuit, wherein the laser controller and the remote controller communicate with one another by use of the first and second communications circuits; and (c) a laser light detector system, including: (i) a movable target screen, comprising a surface that is at least partially reflective to emissions from the electronic distance measuring instrument; (ii) a laser light receiver, comprising: a third processing circuit, a third memory circuit including instructions executable by the third processing circuit, a third input/output interface circuit, and at least one photosensor that detects a wavelength emitted by the laser light transmitter; wherein: (d) the first, second, and third processing circuits are configured to: (i) using the laser light transmitter, to emit the substantially vertical plane of laser light; (ii) using the electronic angle measuring instrument, to aim the laser light transmitter in a predetermined heading so that the substantially vertical plane of laser light is aimed at a predetermined point of interest on the jobsite surface; (iii) using the laser light receiver, to monitor an angular position of where the substantially vertical plane of laser light strikes the at least one photosensor as the movable target screen is moved by a user, and to provide a predetermined indication to indicate an ON AZIMUTH status if the laser light receiver is correctly positioned with respect to the substantially vertical plane of laser light; (iv) using the electronic distance measuring instrument, to monitor a physical distance between the electronic distance measuring instrument and the movable target screen, as the movable target screen is moved along the substantially vertical plane of laser light; and (v) if the movable target screen is moved to a predetermined distance along the substantially vertical plane of laser light, then at least one of (A) the laser controller and (B) the remote controller provides a predetermined indication to indicate an ON POINT status, which corresponds to a physical location of the predetermined point of interest on the jobsite surface.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

DETAILED DESCRIPTION

Figure 1:
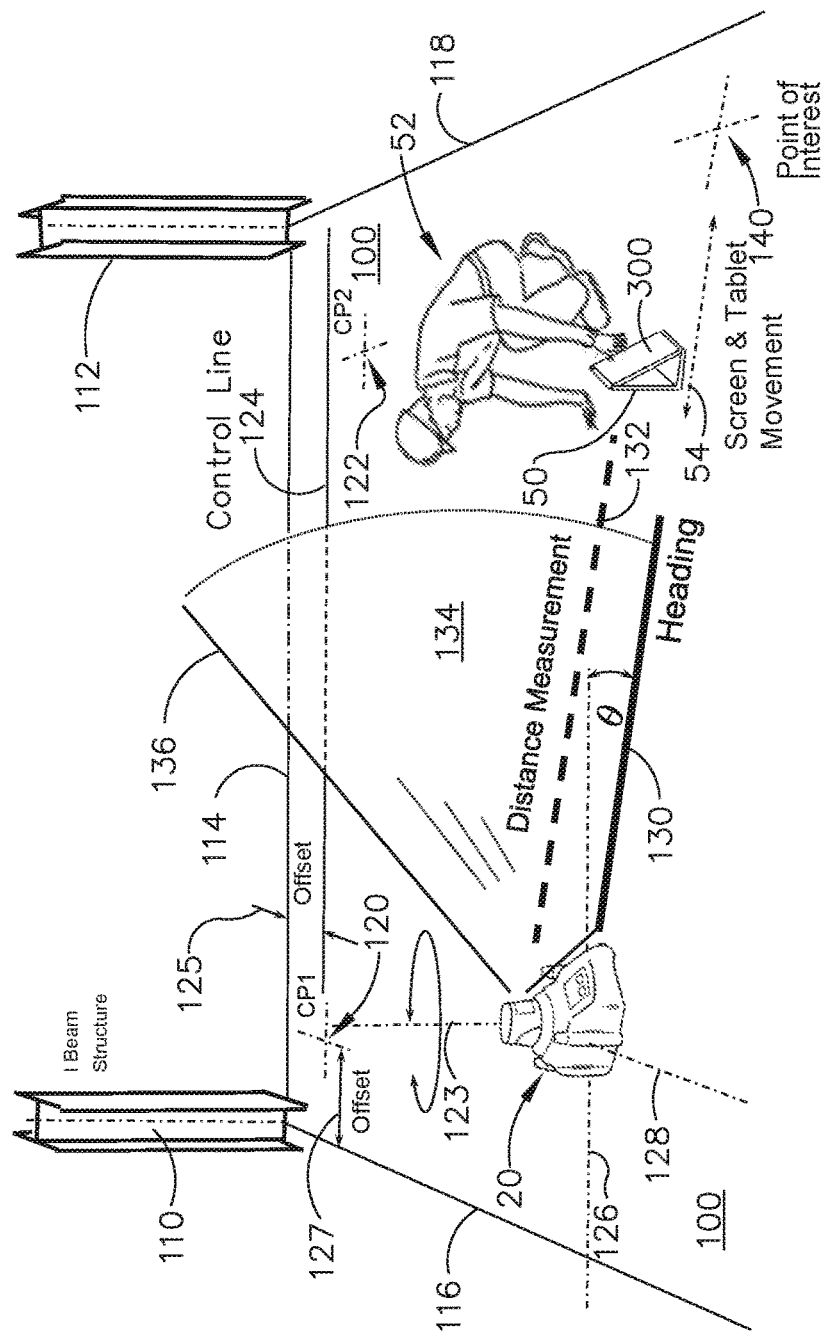
FIG. 1 is a diagrammatic view of how a human user would use a movable floor frame with a remote controller of a layout and point transfer system, as constructed according the principles of the technology disclosed herein, used for finding the location of a point of interest on a jobsite floor, after a laser controller has been set up (registered) on the floor plan.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

The terms "first" and "second" preceding an element name, e.g., first inlet, second inlet, etc., are used for identification purposes to distinguish between similar or related elements, results or concepts, and are not intended to necessarily imply order, nor are the terms "first" and "second" intended to preclude the inclusion of additional similar or related elements, results or concepts, unless otherwise indicated.

In addition, it should be understood that embodiments disclosed herein include both hardware and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the electronic based aspects of the technology disclosed herein may be implemented in software. As such, it should be noted that a plurality of hardware and software-based devices, as well as a plurality of different structural components may be utilized to implement the technology disclosed herein. Furthermore, if software is utilized, then the processing circuit that executes such software can be of a general purpose computer, while fulfilling all the functions that otherwise might be executed by a special purpose computer that could be designed for specifically implementing this technology.

It will be understood that the term "circuit" as used herein can represent an actual electronic circuit, such as an integrated circuit chip (or a portion thereof), or it can represent a function that is performed by a processing circuit, such as a microprocessor or an ASIC that includes a logic state machine or another form of processing element (including a sequential processing circuit). A specific type of circuit could be an analog circuit or a digital circuit of some type, although such a circuit possibly could be implemented in software by a logic state machine or a sequential processor. In other words, if a processing circuit is used to perform a desired function used in the technology disclosed herein (such as a demodulation function), then there might not be a specific "circuit" that could be called a "demodulation circuit;" however, there would be a demodulation "function" that is performed by the software. All of these possibilities are contemplated by the inventors, and are within the principles of the technology when discussing a "circuit."

Laser Controller

The basic system concept is generally illustrated in FIG. 1. There is a single laser controller 20 that uses a laser transmitter 472 (see FIG. 6) which outputs a vertical laser plane 134 that, when incident on the floor, produces a visible laser light line 130 on the work surface 100. After completion of a setup procedure the laser controller 20 is able to rotate a pivotable rotor portion on its pivot axis, so as to direct the vertical laser light plane 134 through a point of interest 140 on the jobsite's work surface 100. This action directly provides a visible heading for the user and allows him to know that the location he is interested in falls somewhere along that laser light line 130 on the jobsite floor 100.

The system also has the capability of measuring the distance between the transmitter and a movable "target screen" located at the user, and handled by the user. An electronic distance measuring instrument is provided on the rotating rotor portion of the laser controller such that it will always "aim" in the same azimuth direction (or "heading") as the vertical laser plane is aiming. In a preferred embodiment, the electronic distance measuring instrument comprises a laser distance meter (also known as an "LDM") that emits a narrow laser beam toward an intended target, and receives back some of that emitted laser beam energy—this is a well-known device. Also, in a preferred embodiment, the LDM is mounted on the laser controller 20 such that it emits its laser beam in a substantially horizontal direction, about six inches (152 mm) above the floor level.

In this illustrated embodiment, the laser controller 20 includes a laser distance meter ("LDM") 480 (see FIG. 6) that aims its measuring laser beam 132 along the same azimuth as the vertical laser light plane (also referred to as a laser "fan beam") 134. As noted above, both the LDM 480 and the laser plane transmitter 472 are mounted on the same pivotable portion of the laser controller 20, and the distance measuring module is intended to be located within the laser transmitter fan beam, and not only rotates with the vertical laser plane 134, but has the laser 486 used for the distance measurement aligned and coincident with the output laser plane used for the visual heading direction. Therefore, these laser light-producing emitters are always aimed along the same azimuth (or "heading").

Figure 6:
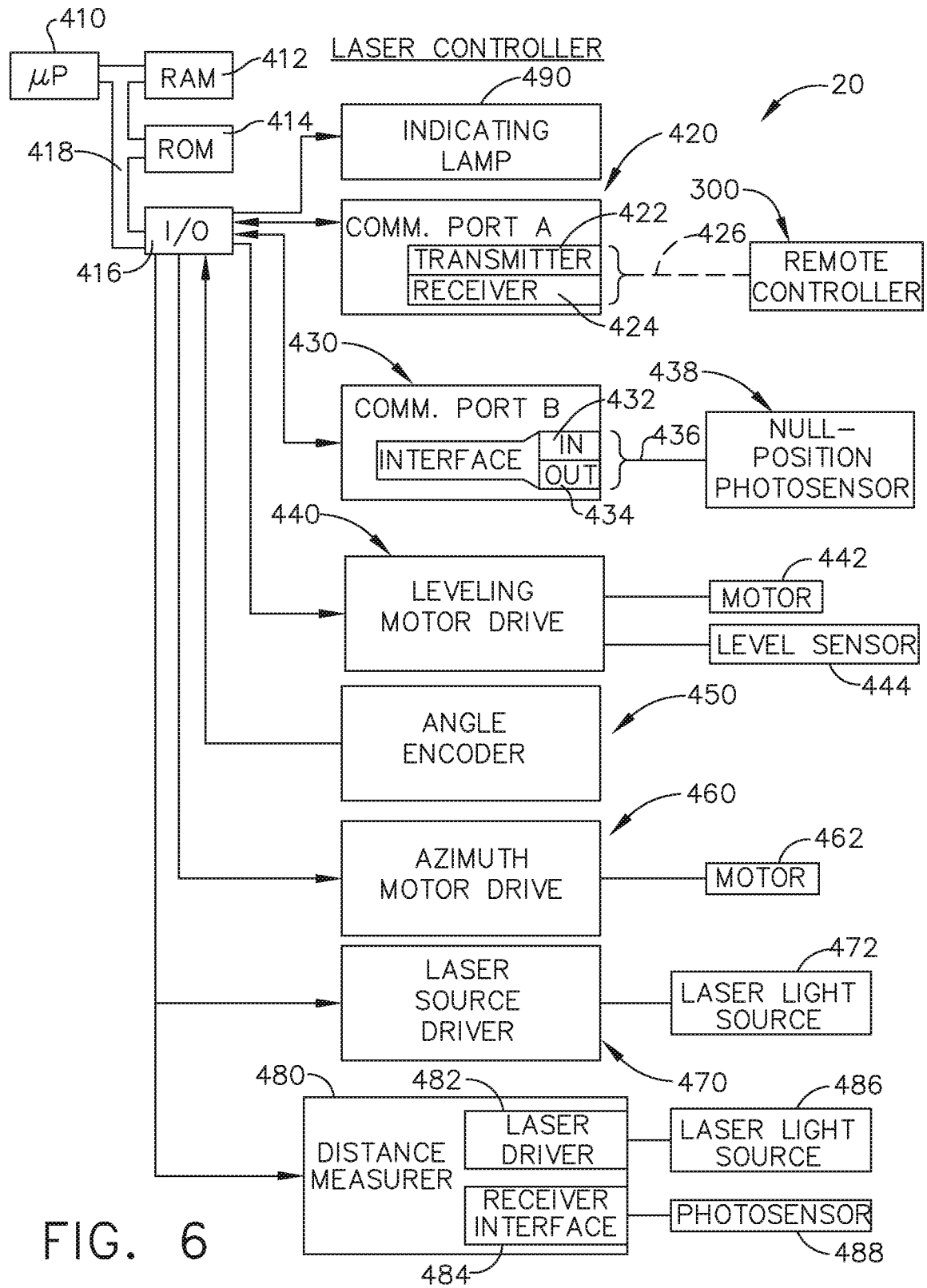
FIG. 6 is a block diagram of the major components of a laser controller that is used in the system of FIG. 1.

To be more precise, the term "heading" can be relative; if the laser controller is placed on a surface without knowing any setup information about how it is oriented to a jobsite floor plan coordinate system, or how it is oriented to the earth, still that laser controller will know the "heading" that its laser plane transmitter 472 is aimed at, because of its angle encoder 450 (see FIG. 6). However, that exact heading may or may not be equivalent to an azimuth; it depends on whether or not the laser controller has yet been leveled. Once leveled, the heading of the laser plane transmitter 472 will be equivalent to an azimuth, but again, that can be a relative quantity that may not match up to the earth, or to a jobsite floor plan. Finally, once the laser controller has been set up with a jobsite floor plan coordinate system, then the heading of the laser plane transmitter should match up to a true azimuth direction. The setting up of the laser controller 20 is discussed below in greater detail.

It will be understood that, as used in this description, the phrase "laser fan beam" includes other types of laser light producing products that are capable of creating a "laser plane" output. This specifically includes a transmitter that outputs a rotating laser beam, which effectively creates a laser light "plane" of multiple rotations of a laser beam.

When in use, the LDM 480 has the ability to measure the distance from the transmitter rotor spin axis to a target screen 50, which typically is located at the user 52. The LDM 480 thus can provide an accurate distance measurement in real time to the laser controller 20, which in turn can provide that information to a tablet computer 300, which is the remote controller that is visible to the user. The target screen 50 must be at least partially reflective to the distance-measuring energy, so that a portion of the laser light emitted by the LDM 480 will be returned to the photosensor 488 of the LDM.

It will be understood that a different type of distance measuring device (DMD) could be used, rather than a laser distance meter. For example, a sonic emitter or an ultrasonic emitter could be directed at the target screen, which would reflect a portion of the sonic energy, and a distance could be determined, much like SONAR devices. A certain amount of accuracy would be lost, of course, compared to a light-energy based distance measuring instrument, such as an LDM.

If an indicating lamp 490 is provided on the laser controller 20, then it can provide a flashing indication as to whether the user has moved the target screen 50 to a position that is too short, too long, or just at the correct distance ("on point"). By use of a wireless communications link 426 between the laser controller 20 and the remote controller 300, the measured distance between the LDM 480 and the target screen 50 can be transmitted and then displayed on the monitor screen 342 (see FIG. 7) of the tablet 300. Alternatively, as described in greater detail below, the laser light source could be flashed at different rates to provide an indication as to the current distance status, which would provide an easily visible indication to the user on the jobsite floor as to whether that user should hold still, or move toward or away from the laser controller.

As described above, there are two major components in this system: a laser controller 20 and a remote controller 300. The laser controller includes a laser transmitter 472 that produces a rotatable visible vertical laser plane to indicate heading, and includes an electronic distance measuring instrument 480, which provides a distance measuring capability within the laser controller. As noted above, it is preferred that the electronic distance measuring instrument 480 comprise a laser distance meter (or "LDM"), and that the LDM also be mounted on the same rotatable rotor portion of the laser controller 20 as is the laser transmitter 472.

First Embodiment: Rolling Floor Frame

The second major component of the system is the remote controller 300, such as a tablet computer, that is located with the user 52. (As used herein, the phrase "tablet computer," or merely "tablet," will have the same meaning as the phrase "remote controller.") In the illustrated embodiment of FIG. 1, the tablet 300 is mounted to a movable floor frame or chassis 54 that also holds a vertical screen (or "target") 50 that can be used to catch the laser fan beam 134 used for displaying the heading direction on which the point of interest lies. The movable floor frame (or chassis) 54 ties the screen 50 and tablet 300 together for convenience of use. As an example, the movable floor frame 54 could have wheels, or a skid, or a combination of both.

Figure 8:
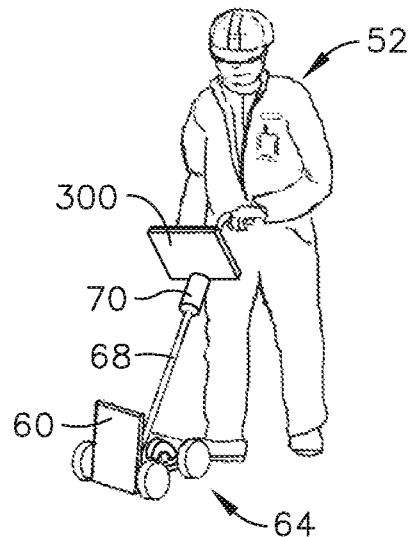
FIG. 8 is a diagrammatic view of a Hand-Operated Rolling Cart that carries a remote controller of the type illustrated in FIG. 7.

The remote controller 300 includes a viewable display monitor (or display screen) 342 that (as a touchscreen display) is used to input the desired point of interest to drive the laser transmitter to. In conjunction with the remote controller 300 is the LDM target, which provides a surface 50 onto which a distance can be measured. As will be described below, the remote controller-target screen combination can be provided in more than one package. For example, FIG. 1 illustrates a chassis 54 that mounts the remote controller 300 near floor level, while FIG. 8 illustrates a "walkable cart" 64 that mounts the remote controller 300 near waist level. Certainly other physical configurations can be designed, without departing from the principles of the technology disclosed herein.

General Use of the System

With the capabilities discussed above, and after a brief setup procedure to orient the system to the jobsite (described in greater detail below), any point of interest can be acquired through the following steps. In reference to FIG. 1, the user first selects a point of interest using the display monitor 342 of the tablet/controller 300 from the geometry displayed from an architect's building file. (In many cases, there will be a "point list" that the user will work from, which includes the jobsite coordinates for each of the points of interest that are to be laid out.)

After entering a command on the remote controller 300, the laser transmitter's vertical laser fan 134 rotates (along a spin axis 123) to show the heading on which the desired point of interest lies. (It will be understood that the laser plane (or fan beam) 134 produces an upper laser light edge at 134, and a lower laser light line at 130 that impacts the floor of the jobsite surface 100. In this situation, it is the laser light line 130 along the jobsite floor that is being viewed by the human user 52, and this laser light line 130 visually will indicate the proper heading (or azimuth) to the user.

As the laser controller 20 is aiming its vertical laser fan 134 along a particular heading, the electronic distance measuring instrument (e.g., a laser distance meter 480) will simultaneously be aiming along the same azimuth, a few inches above the jobsite floor. It is preferred that the LDM be mounted to transmit its laser beam essentially parallel to the jobsite floor, once the laser transmitter 20 has been leveled. In that manner, the distance readouts provided by the LDM will be truly accurate and plumb to the jobsite surface. (If the floor is intentionally sloped, then that factor can be calculated into the equations for determining other distances that will be measured in subsequent steps.)

The user now moves the movable frame 54 on which the vertical screen 50 and the tablet (remote controller) 300 is mounted, forward and back along the visible heading, until the tablet 300 indicates the distance 132 that correlates to the appropriate point of interest (at 140) along that heading.

Once the movable chassis (or frame) 54 has been correctly positioned at the appropriate distance (i.e., the distance between the LDM and the target screen 50), the user can then mark that point on the floor. This marking step will be easily and accurately accomplished, as it will visibly appear along the laser light line 130 which shows that heading, and the appropriate spot will be physically indicated right at the base of the target screen 50.

Set Up Procedures

It is typical to start a construction site layout effort by striking a chalk line that is offset (in the United States, typically at a two (2) foot distance) from the centerline between two existing vertical I-beams. These I-beams are typically positioned so that the main working axes are aligned with them. On FIG. 1, two such I-beams are designated by the reference numerals 110 and 112. As illustrated on FIG. 1, a centerline between those two I-beams is a line 114, and there are two perpendicular lines 116 and 118 that intersect the I-beams 110 and 112, respectively.

From the centerline 114, a first control point coordinate can be determined by offsetting in both main axis directions from a first I-beam structure (i.e., the I-beams 110 and 112). The offset line is designated at 124, and it is offset by a distance 125 from the I-beam centerline 114. This offset line 124 becomes a "control line." Several methods of setting up the system have been envisioned by the inventor(s). All involve knowing at least one control point coordinate.

System Set Up: Method 1

A first example setup method requires knowing the coordinates of both a first and a second control point, designated "CP1" (at 120) and "CP2" (at 122) in this example. In this first setup method, the first control point CP1 is found along the control line 124, while the second control point CP2 does not have to be along the control line that is shown in FIG. 1. Note that CP1 is offset from the line 114 (i.e., the centerline between the I-beams) by the distance 125 in one direction, and CP1 is offset from the perpendicular line 116 (which intersects I-beam 110) by a distance 127 in a second direction.

Figure 4:
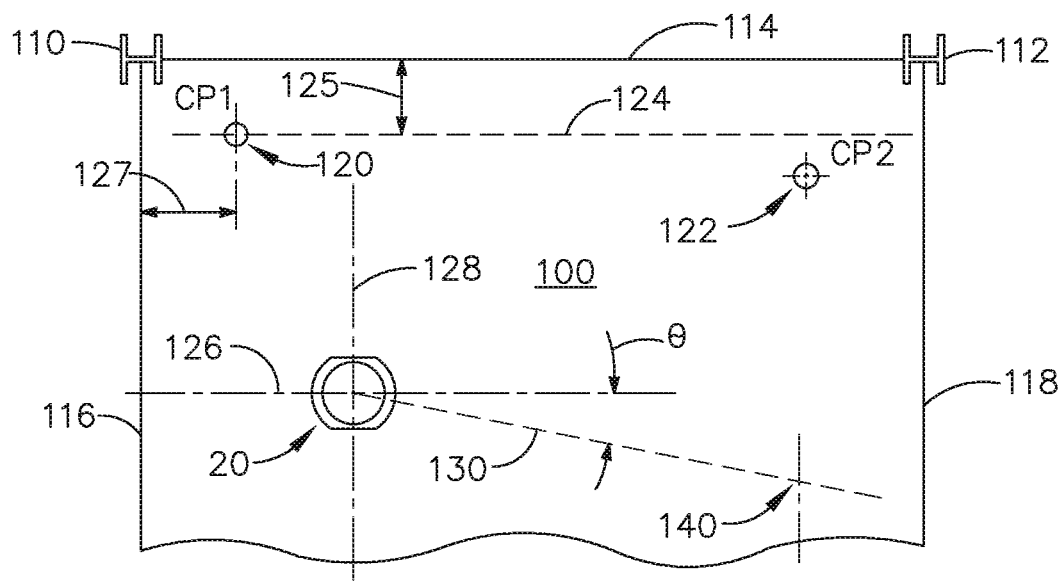
FIG. 4 is a diagram plan view showing positions of physical points and angles involved in the procedure to find a point of interest, according to FIG. 1, using the laser controller of FIG. 1.

Please note that FIG. 4 depicts the same information as that illustrated in FIG. 1, except from the perspective of an overhead view. The control line 124 is clearly seen, with CP1 along that line. The offset dimensions are indicated: the centerlines for the first control point (CP1) are 124 and 127; the centerlines for the laser controller 20 are 126 and 128. A point of interest 140 is found along a line 130 that intersects the pivot axis of the laser controller 20, and diverges from the parallel line 126 at an angle θ. (Line 126 is parallel to the control line 124.)

The procedure for setting up the system using this first method is as follows:

(1) The user places the laser controller 20 on the jobsite floor at a position that is not necessarily along the control line 124, but at a position that visually is clear of obstacles between the laser controller 20 and that control line segment 124.

(2) The user manually drives (rotates) the laser transmitter 472 to aim the laser fan beam so as to lay a laser light line 130 directly over control point CP1.

(3) The user places the remote controller's target screen 50 onto control point CP1.

(4) The user commands the laser controller 20 to measure and record the distance dimension 132 from the laser controller to CP1—using the laser distance meter 480. The user typically will be able to view this distance on the remote controller's display 342; also, the act of recording that distance dimension 132 will typically be stored in a memory location of the memory circuit 312 of the remote controller 300, under the control of the processing circuit 310. The azimuth angle of the laser fan beam (as perceived by the laser controller's angle encoder 450) is also now measured and recorded, in a like manner.

(5) The user now moves activity to the second control point, and steps (2) through (4) are repeated. This time, the laser transmitter 472 is rotated along its spin axis 123 to aim at CP2 by visually placing a laser light line over that control point CP2. The user now moves the remote controller's target screen 50 onto control point CP2. Then the user commands the laser controller 20 to measure and record the distance from the laser controller to CP2—again, using the laser distance meter 480. The azimuth angle of the laser fan beam (as perceived by the laser controller's angle encoder 450) is also now measured and recorded, in a like manner.

(6) The system will now calculate the position of the laser controller 20, based on the angle between the line segments from the laser transmitter and CP1 (called $d_{AT}$ on FIG. 2) and from the laser transmitter and CP2 (called $d_{BT}$ on FIG. 2), and the location coordinates of CP1 and CP2. The math involved is described below.

Once the position of the laser controller 20 is known in terms of the jobsite's coordinates, that particular position could be inserted (or "stored") in the virtual jobsite floor plan data file that is resident in the memory circuit 312 of the remote controller 300. This might only be a temporary condition, since the laser controller may well be moved to another portion of a large construction project, so as to lay out additional points of interest at locations that are not accessible from its first positioning on the physical jobsite floor.

Figure 2:
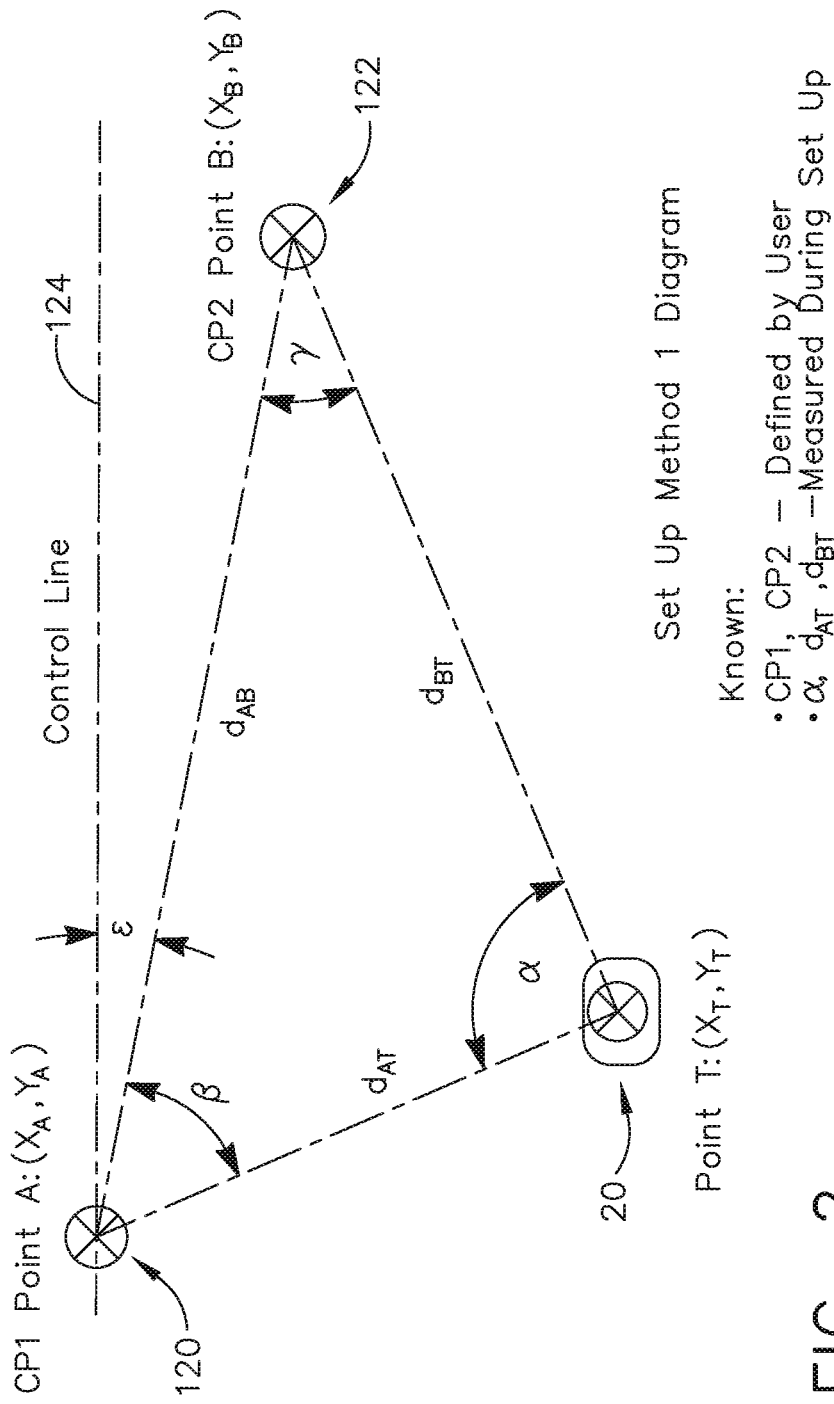
FIG. 2 is a diagram showing positions of physical control points and angles involved in registering the laser controller of FIG. 1 on a jobsite floor, using a setup routine according to a first method.

Referring now to FIG. 2, a diagram is provided relating to this first setup method. Calculation of the coordinates of the laser transmitter 20 are described in FIG. 2, FIG. 2A, FIG. 2B, and FIG. 2C. In this diagram and in these example equations, the laser transmitter 20 is referred to as point "T", the first control point (CP1) is referred to as point "A", and the second control point (CP2) is referred to as point "B".

See the equations that relate to FIG. 2 (below) for this first setup method example. As stated in this example, the user begins with knowing the coordinates of CP1 and CP2, and then measures one angle and determines two distances with the equipment provided, as disclosed herein. After all that information is fed to the remote controller 300, its processing circuit 310 calculates the coordinates of the laser controller at point "T". (Note that the laser controller's X-Y coordinates correspond to the intersection of the lines 126 and 128, on FIG. 1.) In this first setup method, there was no particular constraint on "where" the laser controller 20 should be placed, except that it needs to have no physical obstruction between itself and the two control points.

Referring now to the diagram of FIG. 2, the following equations are used:

Calculate distance $d_{AB}$ and angle $\varepsilon$:

$$d_{AB} = [(X_B - X_A)^2 + (Y_B - Y_A)^2]^{1/2}$$

Calculate Angles $\beta$ and $\gamma$:

$$\varepsilon = a\tan\left[\frac{Y_B - Y_A}{X_B - X_A}\right] \text{ (Law of Sines)}$$

$$\frac{d_{BT}}{\sin(\beta)} = \frac{d_{AB}}{\sin(\alpha)}$$

$$\beta = a\sin\left[\frac{d_{AT}}{d_{BT}}\sin(\alpha)\right]$$

And:

$$\alpha + \beta + \gamma = \pi$$

$$\gamma = \pi - \alpha - \beta$$

(Note: calculation of $\beta$ and $\gamma$ are used only for setup Method 2—see FIG. 3, below.)

Find the Equation of Line AT:

Slope $m_{AT} = \tan(\beta + \varepsilon)$ (Standard Equation of a Line is: $y = m \cdot x + b$)

$y = m_{AT} \cdot x + b_{AT}$ Substitute known CP1 point $A$: $(X_A, Y_A)$, and solve for Y-intercept $b_{AT}$.

$$Y_A = m_{AT} \cdot X_A + b_{AT}$$

$$b_{AT} = Y_A - m_{AT} \cdot X_A$$

$y = m_{AT} \cdot x + (Y_A - m_{AT} \cdot X_A)$ Equation of Line $AT$ (This is Equation 4.1)

Find the Equation of Line BT:

Slope $m_{BT} = \tan(\gamma - \varepsilon)$ (Standard Equation of a Line is: $y = m \cdot x + b$)

$y = m_{BT} \cdot x + b_{BT}$ $Y_B = m_{BT} \cdot X_B + b_{BT}$ Substitute known CP2 point $B$: $(X_B, Y_B)$, and solve for Y-intercept $b_{AT}$.

$$b_{BT} = Y_B - m_{BT} \cdot X_B$$

$y = m_{BT} \cdot x + (Y_B - m_{BT} \cdot X_B)$ Equation of Line $BT$ (This is Equation 4.2)

Equate Equation 4.1 and 4.2:

$$m_{AT} \cdot x + (Y_A - m_{AT} \cdot X_A) = m_{BT} \cdot x + (Y_B - m_{BT} \cdot X_B)$$

$$X_T = \frac{y_B - y_A - m_{BT} \cdot X_B + m_{AT} \cdot X_A}{m_{AT} - m_{BT}}$$

Substitute $X_T$ into Equation 4.1 to find the y-coordinate ($Y_T$) of transmitter T:

$$y = Y_T = m_{AT} \cdot \left[\frac{Y_A - Y_B - m_{BT} \cdot X_B + m_{AT} \cdot X_A}{m_{AT} - m_{BT}}\right] + (Y_A - m_{AT} \cdot X_A)$$

The position of transmitter T: $(X_T, Y_T)$ is now known.

Once the coordinates of the laser controller 20 (i.e., "T") are known, then the laser transmitter 472 can be aimed at any point of interest to be marked that is within non-obstructed viewing range of that laser controller 20. Of course, the point of interest must also be accessible by the target screen that is to be placed directly on that point of interest to be marked on the jobsite floor surface 100.

On the other hand, if a point of interest happens to be located right at the same position as a vertical wall or other type of vertical structure, then that vertical structure itself could act as the physical target screen (instead of the target screen 50 that is part of the rolling chassis 54). The architect's building plan might indicate this fact to the user, to inform the user that an existing vertical structure will happen to be positioned just at the point of interest. This might not be a common occurrence, but if it were to indeed occur, the system of this present technology would be able to handle that situation.

Figure 5:
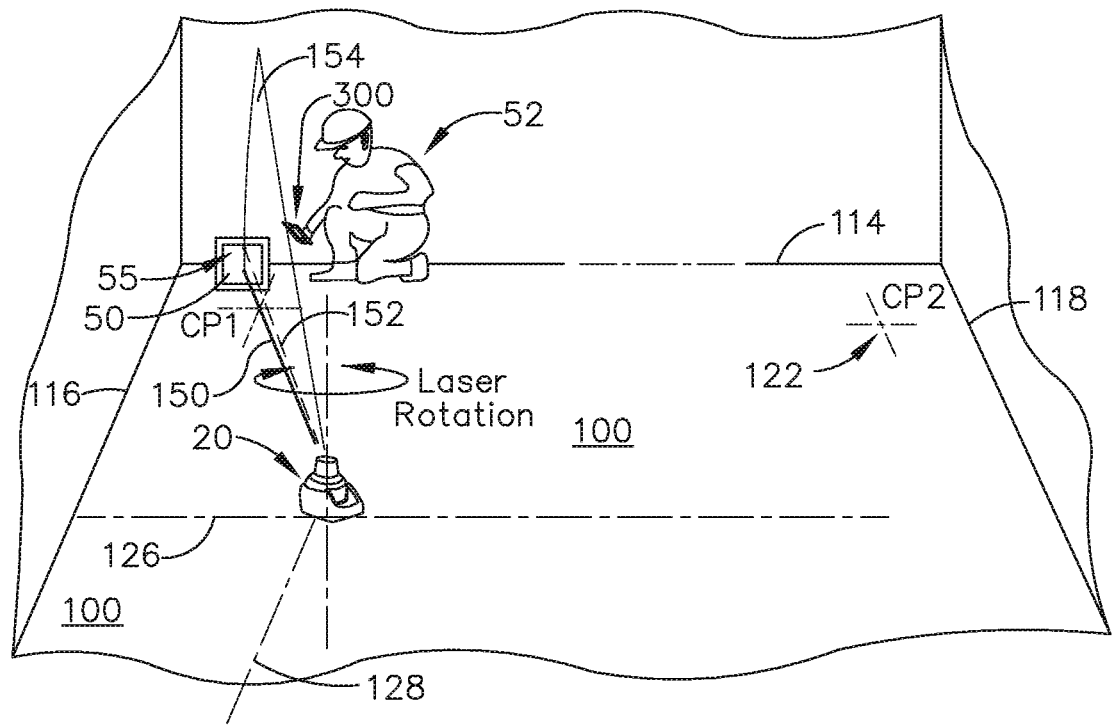
FIG. 5 is a diagrammatic view of how a human user would set up the layout and point transfer system of FIG. 1, using the setup routine according to the first method, as diagrammed in FIG. 2.

The illustration of FIG. 5 gives an example of how a human user would use the remote controller 300 with a detached target screen 50. In this setup mode, the laser controller 20 is aiming a fan beam 154 toward the first control point CP1, while also aiming the laser light output produced by a laser light source 486 of the laser distance meter 480. The fan beam 154 produces a visible laser light line 150 along the jobsite floor surface, and the LDM 480 produces a laser light line 152 that is parallel to the visible laser light line 150. The visible laser light line 150 makes it easy for the human user 52 to visibly determine exactly where the correct heading (in the azimuth direction) to move the target screen 50, until the correct distance is reached. The main requirement is that the user keep the target screen at a proper elevation so that the LDM laser light line 152 will actually intersect the target screen surface at a point 55. This should not be difficult, as the target screen 50 should be sufficiently large to extend from the floor surface up to the correct elevation so as to intersect the laser light produced by the laser light source 486 of the LDM 480.

System Set Up: Method 2

A second example setup method requires knowing the coordinates of a first control point, designated "CP1" (at 120) in this example. However, the second control point "CP2" (at 121) is not known, except that it is assumed to be along a control line 129. Note that, in this second setup method, the first control point is the "origin" or "source" of the control line 129. The jobsite coordinates of CP1 are not typically designated as (0,0), but what is meant here is that the physical position of CP1 is to be used as the source of determining an axis that is parallel to the main axis on which this construction site is referenced (on the architect's plan). In other words, an axis through this point CP1 becomes the control line 129, even if this new control line 129 is not necessarily two feet offset from a centerline between two I-beams. In fact, this new control line 129 might not even be parallel to any pair of I-beams on the jobsite, although that certainly would not be typical.

The procedure for setting up the system using this second method is as follows:

(1) The user places the laser controller 20 on the jobsite floor at a position that definitely is not along the control line 129, but at a position that visually is clear of obstacles between the laser controller 20 and the control line segment 129.

(2) The user places the remote controller's target screen 50 onto control point CP1. As before, the main purpose is to determine the distance between the laser controller 20 and CP1.

(3) The user manually drives (rotates) the laser transmitter 472 to aim the laser fan beam so as to lay a laser light line 130 directly over control point CP1.

(4) The user commands the laser controller 20 to measure and record the distance from the laser controller to CP1—using the laser distance meter 480. The user typically will be able to view this distance on the remote controller's display 342; also, the act of recording that distance will typically be stored in a memory location of the memory circuit 312 of the remote controller 300, under the control of the processing circuit 310. This measured distance is referred to as $d_{AT}$, which corresponds to CP1 also being referred to as point "A" and the laser controller also being referred to as point "T". The azimuth angle of the laser fan beam (as perceived by the laser controller's angle encoder 450) is also now measured and recorded, in a like manner.

(5) The user now moves activity to the second control point. In this second setup method, the user places the remote controller's target screen 50 anywhere along the control line 129. As before, the main purpose is to now determine the distance between the laser controller 20 and CP2. Steps (2) through (4) are now repeated.

Figure 3:
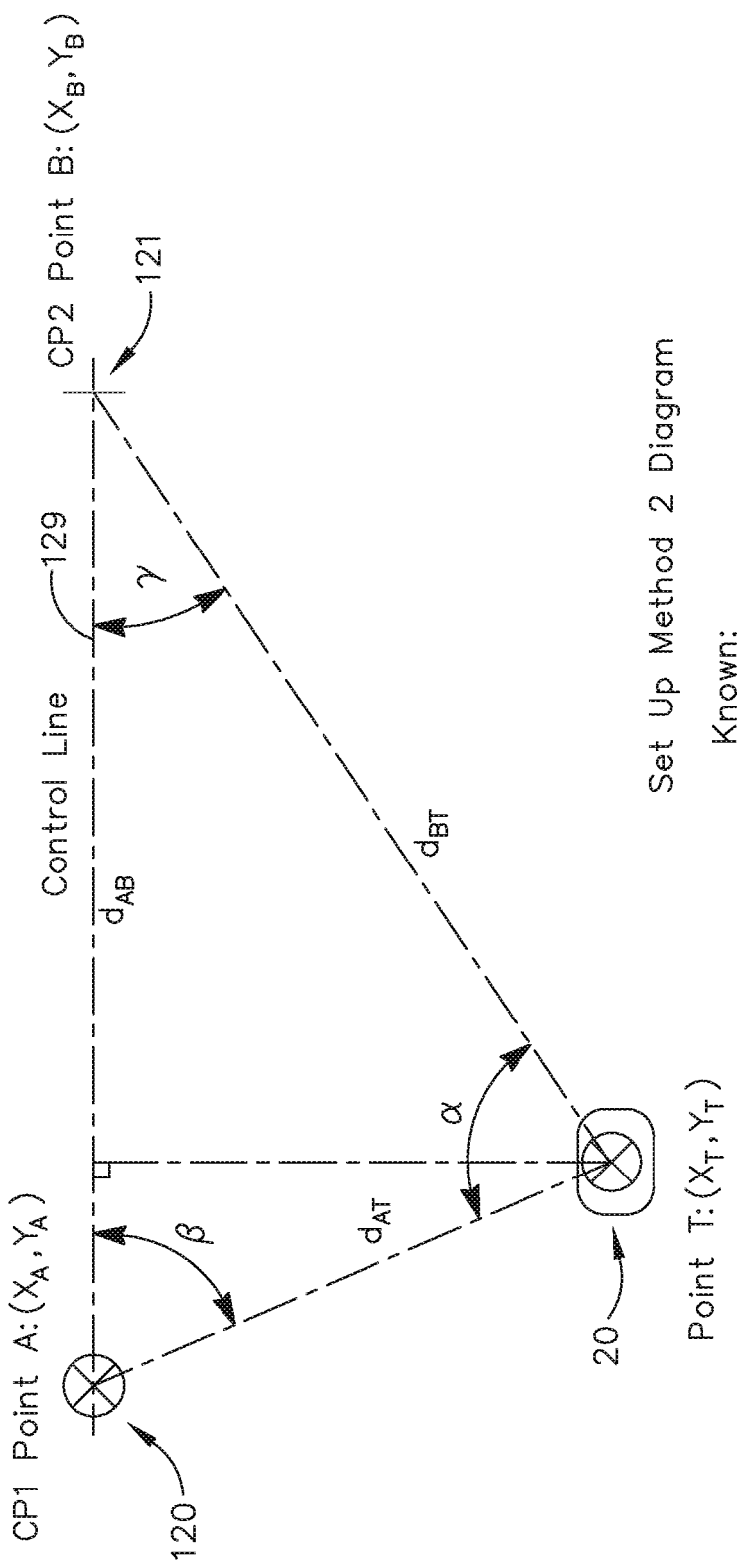
FIG. 3 is a diagram showing positions of physical control points and angles involved in registering the laser controller of FIG. 1 on a jobsite floor, using a setup routine according to a second method.

(6) The laser transmitter 472 is rotated along its spin axis 123 to aim at CP2 by visually placing a laser light line over that control point CP2, noting that in this second setup method, the coordinates of CP2 are not known in advance—this is the control point designated 121 on FIG. 3, not the control point 122 of FIG. 2. The user now moves the remote controller's target screen 50 onto control point CP2. Then the user commands the laser controller 20 to measure and record the distance from the laser controller to CP2—again, using the laser distance meter 480. This measured distance is referred to as $d_{BT}$, which corresponds to CP2 also being referred to as point "B". The azimuth angle of the laser fan beam (as perceived by the laser controller's angle encoder 450) is also now measured and recorded, in a like manner.

(7) The system will now calculate the position of the laser controller 20, based on the angle α between the line segments from the laser transmitter and CP1 ($d_{AT}$ on FIG. 3) and from the laser transmitter and CP2 ($d_{BT}$ on FIG. 3), and the location coordinates of CP1 and CP2. The math involved is described below.

Referring now to FIG. 3, a diagram is provided relating to this first setup method. Calculation of the coordinates of the laser transmitter 20 are described in FIG. 3, with associated equations (below). In this diagram and in these example equations, the laser transmitter 20 is referred to as point "T", the first control point (CP1) is referred to as point "A", and the second control point (CP2) is referred to as point "B".

Referring now to the diagram of FIG. 3, the following equations are used for this second setup method example:

Calculate Distance $d_{AB}$ and Angles β and γ:

$$\frac{d_{AT}}{\sin(\gamma)} = \frac{d_{BT}}{\sin(\beta)} \quad \text{(Law of Sines)}$$

And:

$$\alpha+\beta+\gamma=\pi$$

(Sum of the inside angles of a triangle=180°)

$$\gamma=\pi-\alpha-\beta$$

Then:

$$d_{AT}\cdot\sin(\beta)=d_{BT}\cdot\sin(\pi-\alpha-\beta)=d_{BT}\cdot\sin(\alpha+\beta)$$

$$d_{AT}\cdot\sin(\beta)=d_{BT}\cdot(\sin(\alpha)\cos(\beta)+\cos(\alpha)\sin(\beta))$$

Solve for β:

$$\beta = \tan^{-1} d_{BT} \cdot \sin(\alpha)$$

$$d_{AT} - d_{BT} \cdot \cos(\alpha)$$

$$\beta = \tan^{-1}\left[\frac{d_{BT} \cdot \sin(\alpha)}{d_{AT} - d_{BT} \cdot \cos(\alpha)}\right]$$

Coordinates of the transmitter can be found as follows:

$$X_T = X_A + d_{AT}\cos(\beta)$$

$$Y_T = X_A - d_{AT}\sin(\beta)$$

The position of transmitter T: $(X_T, Y_T)$ is now known.

As stated in this example, the user begins with knowing the coordinates of CP1 but not CP2, but selects a point along the control line 129 as CP2. During this procedure, the user measures one angle and determines two distances with the equipment provided, as disclosed herein. After all that information is fed to the remote controller 300, its processing circuit 310 calculates the coordinates of the laser controller at point "T". In this second setup method, there was a particular constraint on "where" the laser controller 20 should be placed—it cannot be on the control line 129. Also, there needs to be no physical obstruction between laser controller 20 and the two control points, as always.

Another possible setup method could place the laser controller 20 direction on a known control point, which would simplify the geometry for the setup equations. In that instance, the X-Y coordinates would automatically be known, although the azimuth angle would still need to be determined, to line up with the jobsite baseline.

Once the laser controller 20 has been set up with a jobsite floor plan, regardless of which method was used to achieve that setup (or "registration") into the floor plan, the laser controller can be immediately used to find points of interest. There are two possible ways of "finding" points of interest:

(1) If the point of interest is "known" (i.e., "predetermined"), that means the coordinates for that point of interest are already in the jobsite floor plan, and therefore, the laser fan beam of the laser controller can be commanded to aim directly at those coordinates, thereby allowing the user to simply walk along that laser fan beam's visible light line until reaching the correct distance, and then marking that point on the jobsite surface. This is a primary use of the technology disclosed herein.

(2) If the point of interest is "unknown," then the user is working in a "survey mode" to manually select a new specific physical feature on the jobsite that the user wants to add into the virtual jobsite floor plan. The user may or may not want to keep that new particular point in the virtual floor plan forever, but at least for now, the user wants to determine the coordinates of that specific feature in terms of the jobsite floor plan. In this survey mode, the user will manually command the laser fan beam to rotate until that fan beam is aiming directly at the specific feature of interest—i.e., the laser light line will cross directly over that specific feature. The user can then move along that laser light line with the movable target until reaching the specific feature and command the laser controller to take a distance reading (with the LDM). Once the heading (azimuth angle) and the distance to the specific feature are known, the laser controller, or the remote controller, will be able to calculate the coordinates of that formerly "unknown" point of interest, and it will no longer be "unknown," but instead, it will become registered in the virtual jobsite floor plan. It should be noted that, if the specific feature is a wall or other vertical structure at least six inches in height, then the laser fan beam could be aimed directly at that specific feature and the laser distance meter (LDM) probably would be able to get a "return" from the LDM's distance measuring beam, so it is quite possible that the desired distance could be found for the unknown point of interest, without the user actually moving to that spot with the movable target.

Laser Controller Hardware Description

Referring now to FIG. 6, a block diagram of a laser controller used in the present system is illustrated, and is generally designated by the reference numeral 20. Laser controller 20 includes a processing circuit 410, which will have associated random access memory (RAM) at 412, associated read only memory (ROM) at 414, and at least one input/output circuit at 416. These memory circuits 412, 414, and 416 communicate with the processing circuit 410 by use of a bus 418, which typically is referred to as an address bus or a data bus, and can also contain other types of signals, such as interrupts and perhaps other types of timing signals.

The input/output circuit 416 will sometimes also be referred to herein as an "I/O" circuit. This I/O circuit 416 is a primary interface between the real world devices and the processing circuit 410. The I/O circuit 416 is in communication with various communications devices and also various types of motor drive circuits and sensor circuits.

The input/output circuit 416 is in communication with a communications port A, which is generally designated by the reference numeral 420. Communications port 420 includes a transmitter circuit 422 and receiver circuit 424. Communications port 420 is provided to exchange data information with the remote controller 300. The communication link between remote controller 300 and communications port 420 is designated by the reference numeral 426. In a preferred mode of this system, the communication link 426 will be wireless, although a cable could be connected between the communications port 420 and the remote controller 300, if desired.

An optional second communications port, referred to as port B, is generally designated by the reference numeral 430 on FIG. 6. This port 430 comprises a data interface with an input circuit at 432 and output circuit at 434. If used, this communications port 430 can transfer data to and from an optional null-position photosensor, generally designated by the reference numeral 438, using a communication path 436. While it would be possible for communication link 436 to be wireless, there is no particular need for that to be so. This optional equipment is found on other laser transmitters sold by Trimble, Inc. (formerly known as Trimble Navigation Limited), but it is not necessary for the primary functions that are described herein. One possible reason to provide this optional equipment would be to use the laser controller 20 as a substitute for other equipment in Trimble QuickMark Layout systems.

Laser controller 20 also includes a self-leveling motor drive circuit, generally designated by the reference numeral 440. This drive circuit provides the voltage and current for a leveling motor 442. In addition, it receives signals from a level sensor 444, and these input signals will determine what types of commands will be sent to the motor 442 from the drive circuit 440. If desired, this can be a self-contained system that may not need to communicate with the processing circuit 410. However, the laser controller 20 will typically desire knowledge of whether or not the laser controller has actually finished its leveling function before the laser controller 20 begins to function in its normal mode of operation. In addition, the processing circuit 410 may well desire to control the leveling motor drive circuit 440, essentially to keep it de-energized at times when it is not critical for the laser controller to actually be attempting to level itself with respect to gravity.

It will be understood that an automatic leveling function is desired, but it is not a requirement for using this technology. If it is not used, then each time the laser controller 20 is moved to a new position on the jobsite surface, the user must manually level that laser controller. In that type of embodiment, the laser controller would likely be provided with leveling screws and at least one bubble vial.

Laser controller 20 also includes an angle encoder 450, in a preferred embodiment of this control system. Angle encoder 450 will provide input signals to the processing circuit 410, so that it knows exactly where the laser transmitter is being pointed with respect to the azimuth direction. Measuring the azimuth could be a wholly manual operation, if desired to reduce system cost by eliminating the encoder. However, for a fully automated system, the angle encoder 450 will be necessary. Certainly the frequent changes in the azimuth direction of the laser transmitter that tend to occur in this point layout control system would make a decision to delete the angle encoder seem later like a horrible idea. An electronic angle encoder will provide an electrical or optical output signal that is related to the angle (or "heading") that has been measured by the encoder subassembly. In the laser controller 20, that angle encoder output signal is directed to the I/O interface circuit 416.

Laser controller 20 preferably will also include an azimuth motor drive, generally designated by the reference numeral 460. Motor drive 460 will provide the proper current and voltage to drive the azimuth motor 462, which is the motive force to aim the laser transmitter. This could be part of a self-contained system, working with the angle encoder 450. However, on FIG. 6, it is illustrated as being controlled by the processing circuit 410, which is necessary to perform the functions that are specified in the logic flow charts that are provided herewith. It will also be understood that, as an option, a manually-adjusted azimuth instrument could be provided on the laser controller, rather than including an azimuth motor drive as described above.

The leveling motor system includes a leveling platform for the azimuth motor 442, which has output shaft and a pinion gear that meshes with a spur gear. The spur gear has an output shaft that is vertical, which runs through an encoder disc subassembly and up to a second wheel or disc that includes a pair of butt cell photosensors. The encoder disc subassembly typically has some type of visible markings that can be detected by an encoder readhead, which is located along the outer perimeter of the encoder disc. The overall angle encoder subassembly 450 includes both the encoder disc subassembly and the encoder readhead. Typical optical encoders have a fixed portion and a rotatable portion.

Laser controller 20 also includes a laser light source driver circuit 470, which provides the current and voltage to drive a laser light source 472. This typically will be a laser diode, although it could be some other type of laser light beam emitter, if desired. As described above, the laser light source will typically be emitting visible wavelength light, although a non-visible wavelength light source could be desirable for certain applications, and a laser light source emitting infrared light could be used in that situation. The laser source driver 470 is controlled by processing circuit 410 in the configuration illustrated on FIG. 6.

The laser controller 20 will typically include a "fan beam" laser transmitter 472. However, it will be understood that other types of laser light sources could be used, including a rotating laser beam (such as a dithering laser beam), if desired. There must be some minimum amount of divergence to create a laser light "plane" so that the laser light will at least intersect the floor surface of a jobsite, and perhaps also intersect a ceiling surface for interior spaces on jobsites. The laser controller 20 will have many uses, even if the laser light source only is pointing at a floor surface. In this description, it will be assumed that the laser light source is a fan beam laser or an equivalent, so that either (i) a continuous plane of laser light is being emitted by laser controller 20, or (ii) a moving beam of laser light (i.e., a stream of photons in a line that moves its aiming angle over time) is emitted by laser controller 20 in a manner so as to create a "plane" of laser light that emulates a fan beam.

An electronic distance measuring instrument, generally designated by the reference numeral 480, is included in the laser controller 20. The distance measurer 480 communicates with the microprocessor 410 through the input/output circuit 416. If the distance measurer 480 uses laser light as its distance sensing means, then it can also be referred to as a "laser distance meter" or "LDM." Other types of distance measuring instruments also could be used, such as a sound-based device, as noted above.

Assuming the distance measurer 480 is an LDM, it will include a laser driver circuit 482 and a laser beam receiver interface circuit 484. The laser driver 482 provides current for a laser light source 486, which emits a laser light beam, such as the laser light beam 130 (as shown on FIG. 1). A photosensor 488 receives the reflected laser light (from light beam 130), and the current signal that is output by the photosensor 488 is directed to the laser receiver interface circuit 484. After appropriate amplification and possible demodulation, that signal is sent through the I/O circuit 416 to the microprocessor 410. In this manner, the DMD 480 can determine an accurate distance between the laser controller 20 and a target that light beam 130 is reflected from, back to the photosensor 488.

An indicating lamp 490 can be included in the laser controller 20 to provide visual signals to a human user. Certain flashing signals could indicate a particular status, such as being TOO LONG, or TOO SHORT, with regard to the distance measurement between the DMD 480 and the target screen being manipulated by the user. Or, as described in greater detail below, the laser light source could be flashed at different rates to provide an indication as to the current distance status, which would provide an easily visible indication to the user on the jobsite floor as to whether that user should hold still, or move toward or away from the laser controller.

To indicate status, an audible output could be used as well, or instead of a visible lamp. Such an audible output could beep at certain rates (instead of flashing, for example), or if the audible output device acts like a speaker, it could change pitches to signal a change in status. (Note that such an audible output could be provided on the Remote Controller instead of, or in addition to, an audible output at the laser controller. See below.)

Remote Controller Hardware Description

Figure 7:
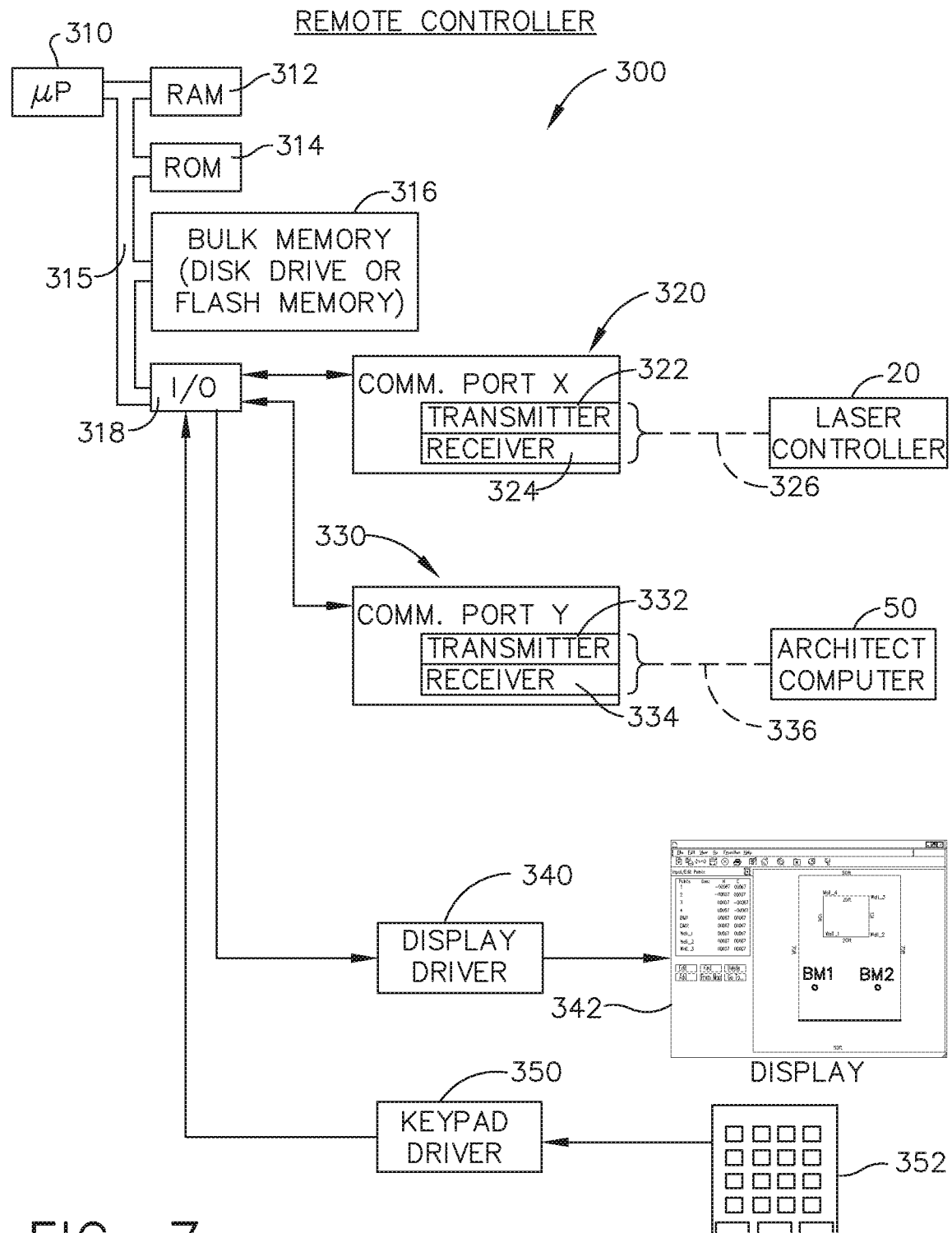
FIG. 7 is a block diagram of the major components of a remote controller that is used in the system of FIG. 1.

Referring now to FIG. 7, a block diagram is provided for a remote controller, which is generally designated by the reference numeral 300. Remote controller 300 includes a processing circuit 310, with associated RAM 312, ROM 314, some type of bulk memory or external memory 316, and an input/output circuit 318. These circuits are all in communication with the processing circuit 310 via a bus 315, which normally would carry data signals and address signals, and other types of microprocessor signals, such as interrupts.

The bulk memory 316 could be a disk drive, or perhaps some type of flash memory. If in the form of flash memory, it could be an external memory device (such as a "portable memory device") that can plug into the remote controller, via a USB port, for example. In that situation, there would be a USB interface port between the bulk memory device 316 and the bus 315.

The I/O circuit 318 will be in communication with a first communications port 320, which is designated as communications port "X" on FIG. 7. Communications port 320 includes a transmitter circuit 322, and a receiver circuit 324. Communications port 320 is designed to communicate with the laser controller 20, typically using a wireless signal via a wireless pathway 326 (as noted on FIG. 7). As described in greater detail below, in this point layout system the laser controller 20 will communicate distance information and azimuth angle information with the remote controller 300, and that information arrives via the wireless path 326 to and from communications port 320.

An optional second communications port 330 can be included in remote controller 300, and this is designated as communications port "Y" on FIG. 7. The communications port 330 includes a transmitter circuit 322 and receiver circuit 334. If installed, communications port 330 can be used to exchange information with an architect computer 50, via a communication link 336. On FIG. 7, the communication link 336 is depicted as a wireless link, although it certainly could be constructed by use of an electrical cable or an optical cable, if desired. If used, communications port 330 will be able to exchange floor layout data with the architect computer 50; more specifically, it can receive a virtual jobsite floor plan and store it in the bulk memory circuit 316. In addition, if the remote controller 300 receives information about a new or "unknown" point of interest in the jobsite floor plan, then that information not only can be saved in the bulk memory circuit 316, but could be also communicated back to the architect computer 50 (via the communications port 330) to be placed in the original floor plan. Or, a revised virtual jobsite floor plan (which includes the new point of interest) can be saved as a file in bulk memory circuit 316, and that entire file could be transferred to the architect computer 50.

It will be understood that the architect computer 50 could comprise a "fixed" unit that essentially remains in the architect's office, and passes data to the remote controller 300 while the remote controller is physically at the office, or perhaps they may remotely communicate with one another via a wide area network, such as the Internet. Alternatively, the architect computer 50 could comprise a "portable" unit that is transported to the jobsite, and communicates with portable unit 300 while on site. Finally, as portable computers become even smaller in physical size, it is possible that a portable remote controller and the architect computer will eventually become merged into a single device. On the other hand, a tablet computer is much more durable than many other forms of portable computers, and for the rigors that the remote controller 300 will be subjected to, it does not seem highly probably that it would merge functions with the architect's computer 50.

A display driver circuit 340 is in communication with the I/O circuit 318. Display driver circuit 340 provides the correct interface and data signals for a display 342 that is part of remote controller 300. If remote controller 300 is a laptop computer, for example, then this would be the standard display seen in most laptop computers. Or, perhaps the remote controller 300 is a calculator-sized computing device, such as a PDA (Personal Digital Assistant) or a smart phone, in which case the display would be a much smaller physical device. Display 342 could be a touch screen display, if desired, such as found on many tablet computers.

One example of a type of remote controller that could work in this system (with some modification) is the portable "layout manager," which is an existing hand-held computer sold by Trimble, Inc. (formerly, Trimble Navigation Limited), Model Number LM80. It should be noted that one cannot simply take the LM80 and immediately use it as a remote controller in the present system; the software must be modified to perform the necessary calculations, which are described herein. In addition, the input/output circuits must be modified to be able to communicate commands and data both to and from the laser controller 20.

A keypad driver circuit 350 is in communication with I/O circuit 318. Keypad driver circuit 350 controls the signals that interface to an input sensing device 352, such as a keypad, as depicted on FIG. 7. Again, if the display 342 is of a touch screen type, then there may not be a separate keypad on remote controller 300, because most of the command or data input functions will be available by touching the display itself. There may be some type of power on/off switch, but that would not necessarily be considered a true keypad (and typically would not be used for entering data).

Second Embodiment: Hand-Operated Rolling Cart

Referring now to FIG. 8, a handheld, or hand-pushed, rolling cart is illustrated at 64. The cart 64 includes a chassis with wheels, and has a target screen 60 mounted near the bottom portion of the cart. An extension arm or handle 68 travels upward to a mount 70, to which the remote controller 300 is attached. In the illustrated embodiment, the remote controller 300 is again a tablet computer that is directly operated by a human user 52. A preferred tablet 300 would include a display monitor 342 that also is a touchscreen, for use as a user input circuit, rather than having a separate keypad. However, a separate keypad 352 could nevertheless be provided, if desired.

The rolling cart 64 could be a relatively small cart, but large enough to support the vertical target screen 60, having its bottom edge in close proximity to the surface of the floor 200. The cart 64 should be easily moved forward and back, using four wheels, as shown. The handle 68 extends upward to the user 52, allowing him to maneuver the cart while he is standing. Attached to the handle 68 is the mounting bracket 70, which houses and supports the remote controller 300. The display 342 should be oriented on the bracket 70 so that the user is able to easily view the tablet.

Use of the Hand-Operated Rolling Cart

Figure 9:
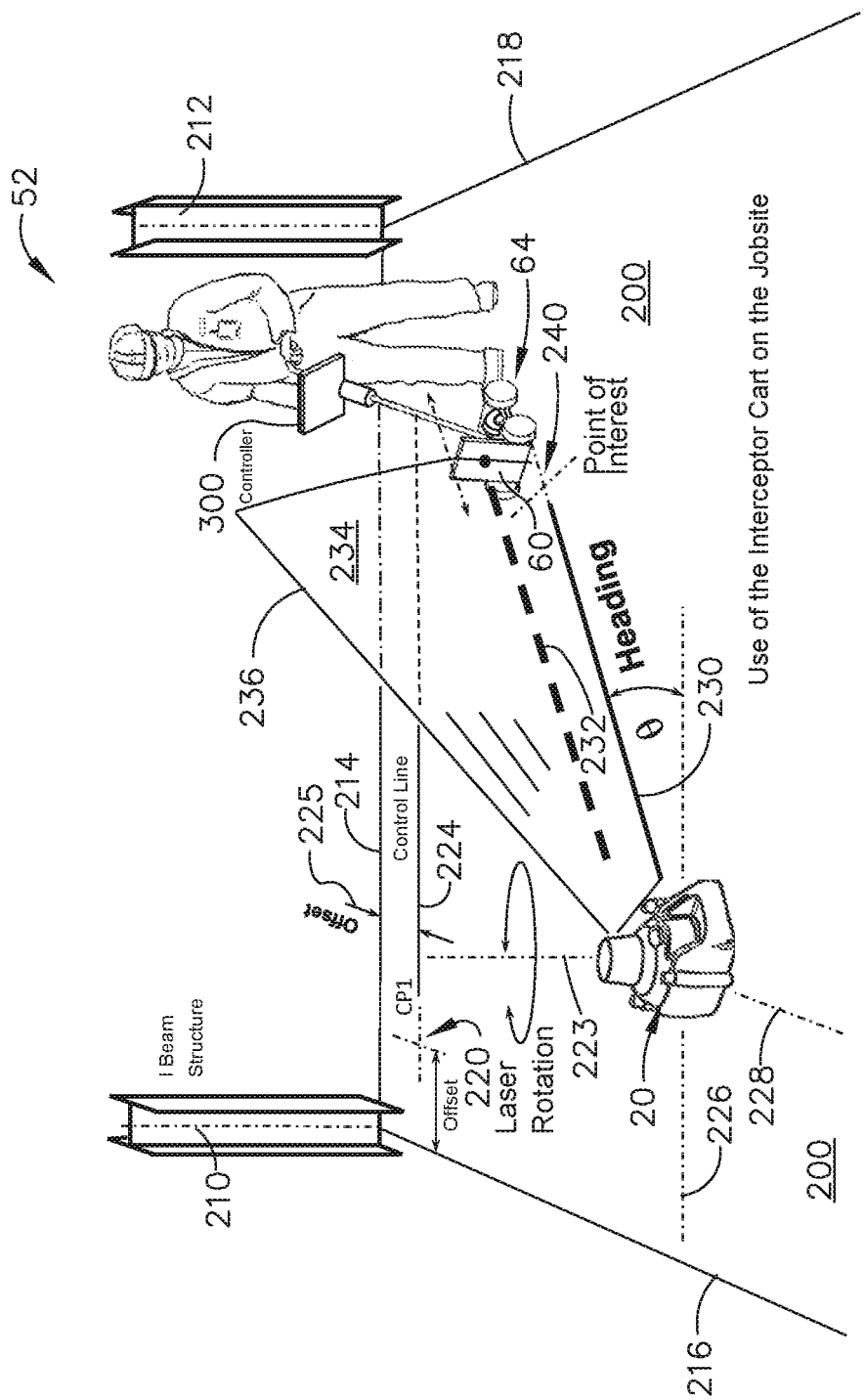
FIG. 9 is a diagrammatic view of how a human user would use the Hand-Operated Rolling Cart of FIG. 9 as part of a layout and point transfer system, as constructed according the principles of the technology disclosed herein, used for finding the location of a point of interest on a jobsite floor, after a laser controller has been set up (registered) on the floor plan.

Referring now to FIG. 9, the user can easily find a point of interest on the jobsite floor 200 by maneuvering the cart 64 so that the target screen 60 intercepts the distance meter laser spot 65 at any distance from the laser controller 20, and along the heading provided by a visible laser light line 230. It should be noted that the laser fan beam 234 will extend all the way between its uppermost edge 236 and its lower boundary—which is the jobsite floor itself. Therefore, the laser fan beam 234 will not only produce the visible horizontal laser light line 230 on the jobsite floor, but will also produce a visible vertical laser light line 66 on the target screen surface at 60. This is a highly visible vertical line that the user will easily see while using the rolling cart 64, and all that the user needs to do is move the cart back and forth—while keeping the cart 64 within the visible laser fan beam 234—until finding the correct distance.

The LDM 480 of the laser controller 20 will measure that distance 232 between the target screen 60 and the laser transmitter 472, and display the distance on the tablet's display monitor 342. In addition, an indication can be provided as to whether the user should move closer in toward the transmitter, or to move farther out from the transmitter, or to stand still if the user is "on point".

If a distance correction from the laser distance meter 480 to the cart 64 must be made, the cart is easily moved forward and back along the heading indicated. As noted above, while correcting the distance, the user only needs to keep the rolling cart 64 within the correct heading, which is visibly indicated in a manner that is quite difficult to miss. And once the correct distance from the laser controller 20 is attained along the visible heading, the point of interest at 240 can then be marked on the floor 200 at the bottom edge of the target screen 60 (see FIG. 10).

The hand-operated rolling cart 64 offers certain advantages, including a structure that mounts the useful elements of the target screen 60 and tablet-remote controller 300 on one easy-to-maneuver frame. The handle 68 can be folded flat against the frame of the cart, for easy stowing when not in use. The cart 64 allows the user to search and find the point of interest while standing, thus saving wear and tear on his knees, hips and back, which may result with the alternative of crawling around on all fours, or bending low over and over.

Once the target screen 60 has been moved to the correct position on the jobsite surface, the intersection of the horizontal laser light line 230 and the vertical laser light line 66 directly and visually indicates the location of the current point of interest to the user. These two laser light lines provide a type of L-shaped mark (or "L-mark") on the jobsite surface and movable target surface that cannot be achieved with any conventional equipment. The elbow point of that lighted "L-mark" (at, or near, the bottom of the visible vertical light line at 238 on FIG. 10, for example) will be directly at the point of interest. It will be understood that this "L-mark" visual indication will also take place when using the movable floor frame 54 that is illustrated on FIG. 1, in which a vertical laser light line will also appear on the target screen 50 of that movable floor frame.

It should be noted that the visible horizontal laser light line 230 does not necessarily need to extend all the way to the point of interest 240. For example, if the jobsite floor surface is uneven (a common occurrence), then the laser plane 234 might not reach the floor surface by the time it crosses the point to be marked (i.e., at the point of interest 240). However, the new system will work just fine anyway, because the bottom edge of the vertical laser light plane 234 will continue along the same heading, just at a slightly higher altitude just off the floor surface. So long as the vertical laser light plane impacts the target screen 60, it will impart a highly visible vertical line on that target screen 60—this is the laser light line 66 on FIG. 10. If the target screen 60 is plumb (i.e., vertical), as designed, then the laser light line 66 will "aim" directly down toward the desired point of interest, once the accessory cart 64 has been placed at the correct distance from the electronic distance measuring instrument 480 of the laser controller 20. In this situation, the user may not literally see an "L-mark" right at the point of interest, but the vertical laser light line 60 on the target screen 66 will nevertheless provide an accurate location for marking the point of interest on the jobsite floor surface.

In addition to the variation discussed in the previous paragraph, in an alternative embodiment the laser plane could emanate in a manner such that the bottom edge of the laser plane never touches the jobsite floor surface. In this arrangement, there would be no visible laser light line running horizontally across the floor, however, the user could easily find the visible wavelength laser plane merely by walking across the jobsite floor with the target screen in hand, while moving in a non-radial direction with respect to the laser controller. Once the target screen intercepted the laser plane, a vertical line of visible laser light would become very noticeable and the user would know that the desired radial direction had been found. The user could then move in that now-visible radial direction until reaching the correct distance from the laser controller; that of course would then indicate that the desired point of interest had been found. See FIGS. 17 and 18, and the description below relating to those FIGS. 17 and 18, which describe this alternative embodiment in greater detail.

Figure 10:
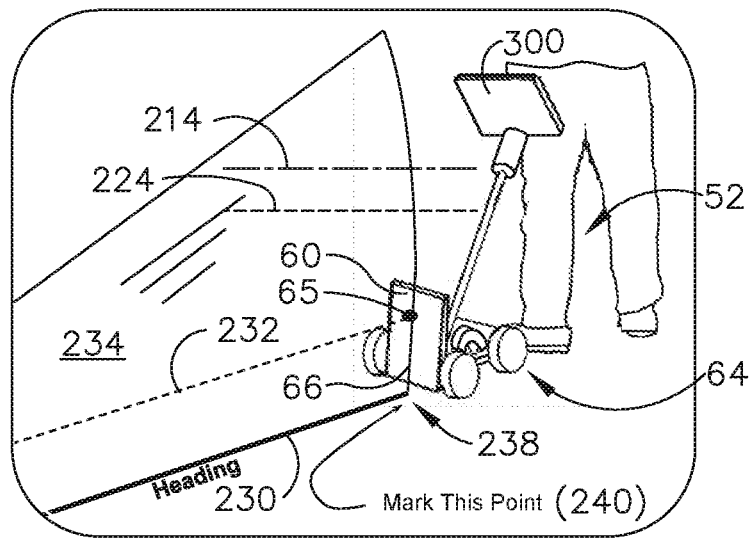
FIG. 10 is a closeup diagrammatic view of a portion of FIG. 9, showing the target screen portion of the Hand-Operated Rolling Cart.

On FIGS. 9 and 10, a control line 224 is depicted as being offset from a centerline 214 between to vertical I-beams 210 and 212. A first control point CP1 is designated at 220, along the offset control line 224, which is offset by a distance dimension at 225. The laser controller 20 is positioned at a pair of X-Y centerlines 226 and 228, which are offset from parallel lines 216 and 218, which themselves intersect the I-beams 210 and 212 along the jobsite floor 200. The correct heading from the laser controller 20 to the point of interest 240 diverges from the parallel line 226 by an angle θ. The overall geometry of FIG. 9 is the same as that of FIG. 1.

Flow Chart: Setup Procedure

Figure 11:
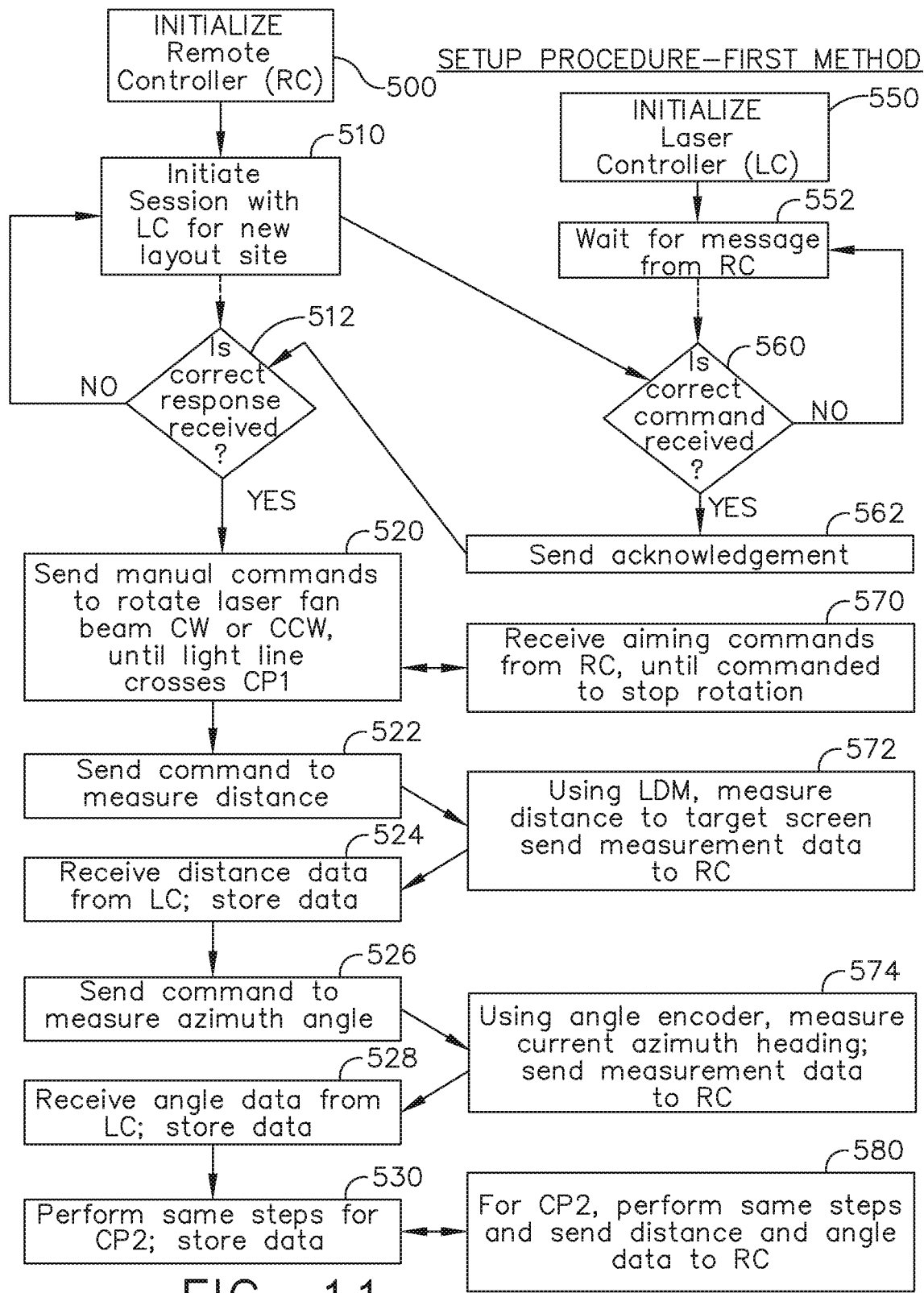
FIG. 11 is a flow chart of certain steps performed during a set-up routine, used in the system depicted in FIG. 1.

Referring now to FIG. 11, a flow chart is provided to show some of the important steps in a setup procedure for the laser controller, as it is first placed on a jobsite floor. The flow chart of FIG. 11 involves the first method that was discussed above, in reference to FIG. 2. Both controllers are first initialized to begin the procedure: the remote controller (or "RC") is initialized at a step 500, and the laser controller (or "LC") is initialized at a step 550.

After being initialized, the RC initiates a communications session with the LC at a step 510, with the purpose of laying out points at a new site—i.e., a new portion of a floor plan of a construction jobsite. After being initialized, the LC waits for a message from an RC, at a step 552. Once the LC receives a message, it must determine whether a correct command has been received, at a decision step 560. If not, the LC continues to wait at step 552. If so, the LC sends an acknowledgement message back to the RC at a step 562.

It will be understood that the messages that are passed between the RC 300 and the LC 20 could be wireless in nature, or if desired, a cable could be run between the two devices. Since the RC will be moved around the jobsite floor quite often, it makes sense to use a wireless communications protocol.

At a step 520, the RC will now accept manual commands entered by the human user to rotate the laser transmitter on the LC. At a step 570, these commands will rotate the laser fan beam either clockwise or counterclockwise, depending on which exact command is entered by the user. The manual rotation control commands entered by the user on the keypad 352 or touchscreen display 342 of the RC 300 will automatically be transmitted to the LC. The user will continue to issue such manual commands until the laser fan beam (fan beam 154 on FIG. 5, for example) produces a laser light line (e.g., line 150 on FIG. 5) that directly crosses the first control point (such as CP1, on FIG. 5). Once the laser light line is crossing the control point CP1, the user enters a command to halt the rotation of the laser fan beam (at step 570).

It should be noted that the user may, alternatively, manually control the laser controller 20 to rotate the laser fan beam, without using the remote controller 300. However, this type of manual control would require the user to move to the laser controller's location every time the user desired to rotate the laser transmitter, which would certainly slow down the efficiency of the point layout work.

The user should now place a target screen directly on the control point, and then enter a command to inform the RC of that status. The RC now sends a command to the LC, at a step 522, to measure the distance to that target screen. At a step 572, using the electronic distance measuring instrument 480 (e.g., an LDM), the LC performs the distance measuring function, and sends the result to the RC, which is received by the RC at a step 524. That distance result is also stored into memory at the RC in step 524.

The RC now sends a command to the LC to measure the present azimuth heading at a step 526, and the LC, using its angle encoder 450, performs that measurement and sends the result to the RC, at a step 574. It will be understood that the LC could automatically perform the azimuth angle measurement in the same step as when the LC measures the distance to the target screen, without requiring an intermediate command, such as that noted above for step 526.

At a step 528, the RC receives the angle data from the LC, and stores that data in memory. This angle data concerning CP1 will be used later as the first heading that is needed to calculate the angle $\alpha$, as illustrated in the floor plan diagram of FIG. 2.

The flow chart of FIG. 11 continues at a step 530, which indicates that all the steps between 520 and 528 for the RC will need to be performed again, this time to aim the laser fan beam at the second control point (CP2). This flow chart also continues at a step 580, which indicates that all the steps between 570 and 574 for the LC will also need to be performed, again time to aim the laser fan beam at the second control point (CP2), and to take the required measurements so as to send distance and angular heading data to the RC. At the end of these measurements while aiming at CP2, the angle data will be used later as the second heading that is needed to calculate the other side of angle $\alpha$, as illustrated in the floor plan diagram of FIG. 2.

It will be understood that the flow chart of FIG. 11 does not show all the math steps needed to perform the calculations that are needed to determine the position of the LC 20 on the jobsite floor plan. Those are purely mathematical functions that are easily programmed for execution by the processing circuit of either the RC or the LC. It is preferred to perform those math functions at the RC 300, because the architect's floor plan is already stored in its memory circuit 312 (or 314), and moreover, the microprocessor of a tablet computer is very likely a higher-powered computer chip than what will be used for the LC. (Most users will use the RC, as a tablet computer, for many other various functions anyway, so it makes sense to program that processing circuit 310 with the APP that will be needed to perform these math calculations, and the other point layout functions, as well.)

Flow Chart: Layout Procedure

Figure 12:
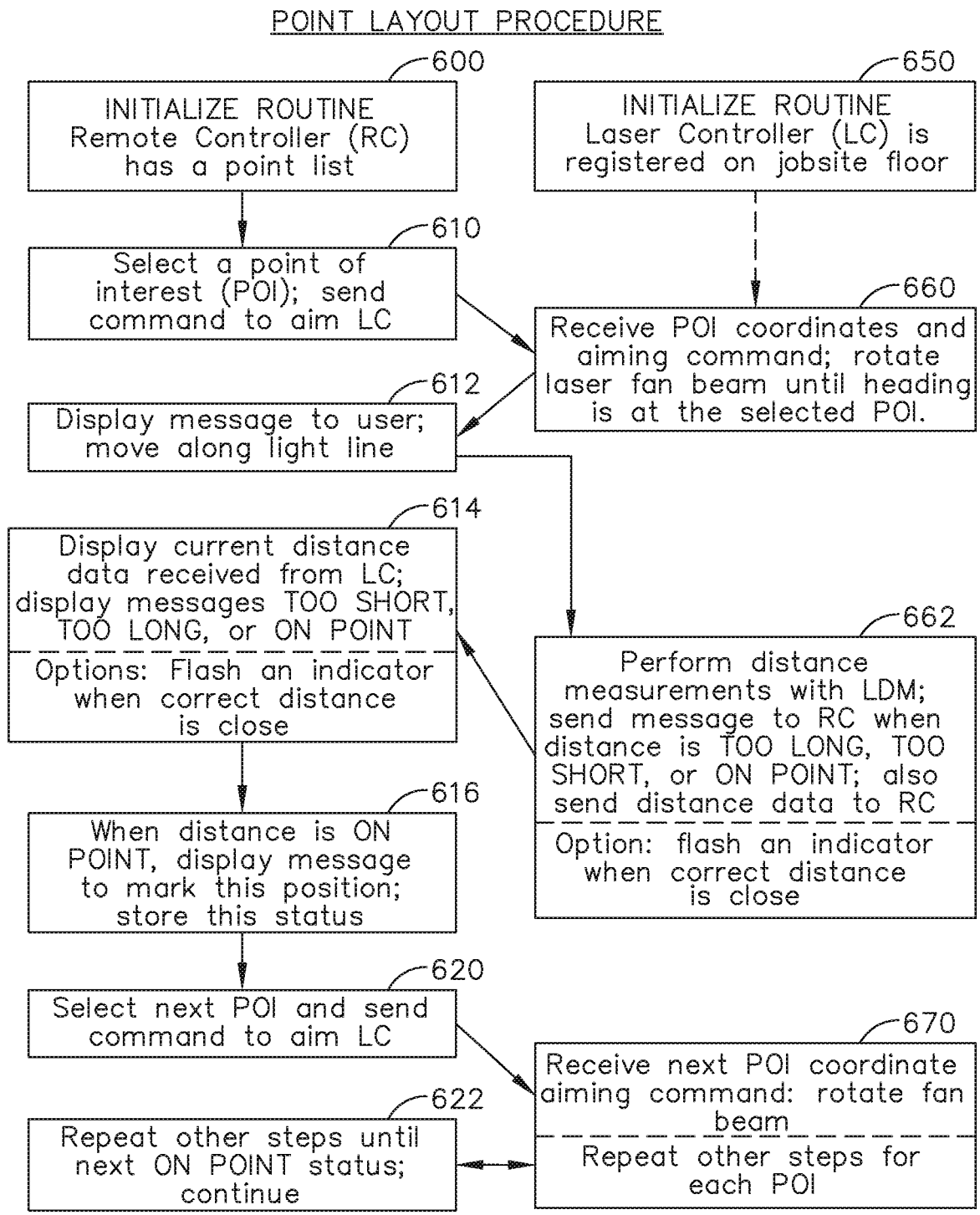
FIG. 12 is a flow chart of certain steps performed during a point layout routine, used in the system depicted in FIG. 1.

Referring now to FIG. 12, a flow chart is provided to show some of the important steps in a point layout procedure using the laser controller, after it has been placed on a physical jobsite floor and setup to the floor plan for that jobsite. The flow chart of FIG. 12 involves the layout functions that are illustrated in FIGS. 1 and 9, using either the floor frame (or rolling chassis) 54 (of FIG. 1) or the rolling cart 64 (of FIG. 9).

As in the flow chart of FIG. 11, FIG. 12 involves logic steps to be performed by both the remote controller 300 (or "RC") and the laser controller 20 (or "LC"). Both controllers have an initial condition at the beginning of the flow chart of FIG. 12: the RC has a "point list" already stored in its memory, which is called up when this routine is initialized at a step 600; the LC is already registered on the jobsite floor when this routine is initialized at a step 650.

It will be understood that each controller—i.e., the remote controller 300 and the laser controller 20—has its own operating software that is executed on its own processing circuit. However, it will also be understood that both of these controllers 300 and 20 are designed to work in conjunction with one another. Otherwise, everything probably would have to be built into a single device and placed into the laser controller. While such a unitary device would have the capability to perform its functions without any significant design problems, it would be less user friendly, because the user would have to keep moving back to that unitary laser controller to perform the point layout tasks. Instead, the preferred approach is to separate the functions so the user can carry (or roll on the floor) the remote controller around to each point of interest as it is being laid out on the jobsite floor, and never have to move back to the location of the laser controller, until the entire point list has been laid out. The use of wireless communications between the RC and the LC facilitates these tasks, as noted above.

On FIG. 12, the first task after initializing this routine is for the human user to select a point of interest at a step 610. (Note: as discussed above, the actual choice of which point of interest to select can be automated by the software, if desired.) The RC now sends a command to the LC, still at step 610, to aim the laser fan beam at the correct heading, so that a laser light line will be visually indicated on the jobsite floor surface.

At a step 660, the LC receives the POI coordinates, or it receives a command to aim at a specific azimuth angle—this is a matter of design choice by the system design engineer. Either way, the LC now rotates its laser transmitter 472 to emit a fan beam (such as the laser plane 134, as seen in FIG. 1) along the correct heading. The RC can now display a message to the user, at a step 612, that the user should now move along the visible light line with the target screen.

The human user 52 (of FIG. 1) will now easily see the correct heading to follow, while attempting to place the target screen at the correct distance from the LC. It should be noted that, if the RC actually displays the sought after distance on its display monitor 342, then an experienced user will likely move quickly to a spot along the visible laser light line 130 of FIG. 1 that is very close to the correct actual distance to the POI. After that, the remaining "back and forth" movements to close in on the exact distance for each point of interest should be accomplished very quickly.

The LC will now perform periodic distance measurements, at a step 662, using its distance measuring instrument 480 (e.g., an LDM). The sample rate should be quite fast, at least in human terms, so the user feels that he is receiving almost continuous updates of the distance reading. The measured distances can be transmitted to the RC; in addition, if the LC was informed by the RC of the sought-after distance for this POI, then the LC can also send messages to the RC of the current distance status, such as TOO LONG, TOO SHORT, or ON POINT. Moreover, the LC can have an indicator that visually flashes light or produces an audible beep (or other sound), and the flashing rate (or beeping rate) can change, as the TOO LONG, TOO SHORT, or ON POINT status changes. An audible tone or beep may not be the best indicator on a busy (and perhaps noisy) jobsite.

Additionally, if there are LEDs of more than one color on the LC, then a different color could be flashed to indicate which distance status is currently operative—"green" could have the meaning of ON POINT, while "yellow" and "red" could have the TOO LONG or TOO SHORT meanings, for example. Furthermore, the yellow and/or red lamps could also flash at different rates, as the user approaches the correct distance to the POI.

As the measured distance data is received by the RC, that distance can be displayed to the user at a step 614. Moreover, the display monitor 342 could noticeably display a bright message (perhaps in color) to the user that indicates the TOO LONG, TOO SHORT, or ON POINT current distance status. As noted above for the LC, the display on the RC could either flash or show different colors as the distance status changes, and/or if the correct (sought after) distance is being approached by the user. Additionally, an audible tone or beep could be output on the tablet (RC) 300, if desired, although a busy jobsite may not be conducive to hearing such audible signals. The audible tone could "beep" at faster or slower rates, to indicate TOO LONG or TOO SHORT, for example; a steady "on-tone" could represent an ON POINT current distance status. Another exemplary way to indicate the current distance status using the display monitor 342 could be to show "arrow" symbols, much like are used on laser receivers that show elevation (as ABOVE GRADE, BELOW GRADE, and ON GRADE). One arrow could be illuminated (or could flash) to show TOO LONG, while a second arrow could be illuminated (or could flash) to show TOO SHORT, status states.

Another helpful way that the system hardware could provide an indication to the user of the current distance status is to flash (or modulate) the laser transmitter output light beam itself. In greater detail, the laser light transmitter 420 of the laser controller 20 could be commanded to turn its optical output beam on and off, repetitively, as an indication of TOO LONG, TOO SHORT, or ON POINT. For example, if the current distance status is TOO LONG, then the frequency of the light flashing could be relatively fast, such as three flashes (on and off) per second; and if the current distance status is TOO SHORT, then the frequency of the light flashing could be relatively slow, such as only one flash (on and off) per second; finally, if the current distance status is ON POINT, the frequency of the light flashing could be zero, which would be a constant "on" light beam.

Such laser light flashing would be eminently visible by the human user on the jobsite, because the laser light lines that run across the jobsite floor surface, and across the target screen 50 (and any other surfaces that are impacted by the laser light plane) will brightly "shine on", and then "shine off"—either quickly or slowly—as the correct distance is finally reached by the user who is manipulating the target screen. Another refinement could be to vary the duty cycle of the on and off flashing light beams. In other words, if the flash rate is three cycles per second, the duty cycle could be 50%, and the user would have a "good signal" to visibly see the laser light lines being created by the laser light plane. However, if the flash rate is only one cycle per second, or perhaps even slower, then the system designer may wish to increase the duty cycle to 70% or 80%, for example, so the user will still have "good signal" to visibly see those laser light lines, instead of being required to wait for a longer "off time" that would be created by use of a smaller duty cycle.

After the user has discovered the correct location for the current point of interest—i.e., the target screen is now ON POINT—the display monitor 342 at a step 616 can display a message to inform the user that he should now mark this position on the jobsite floor. The RC 300 can store this status, so as to prepare for moving on to the next point of interest.

At a step 620, the RC will select the next point of interest, and will send a command to aim the laser fan beam of the LC at that next POI, just like in step 610. The LC receives this command for the next POI at a step 670, and rotates its laser transmitter 472 accordingly, just like in step 660. The LC will now repeat the other functions involving step 662, and the RC will now repeat the functions of steps 614 and 616, and so on, for each POI on the point list.

Once the entire point list has been laid out, this portion of the jobsite floor plan will be completed. The laser controller 20 will now likely be moved to a different portion of the same jobsite, or to a new jobsite altogether.

Figure 13:
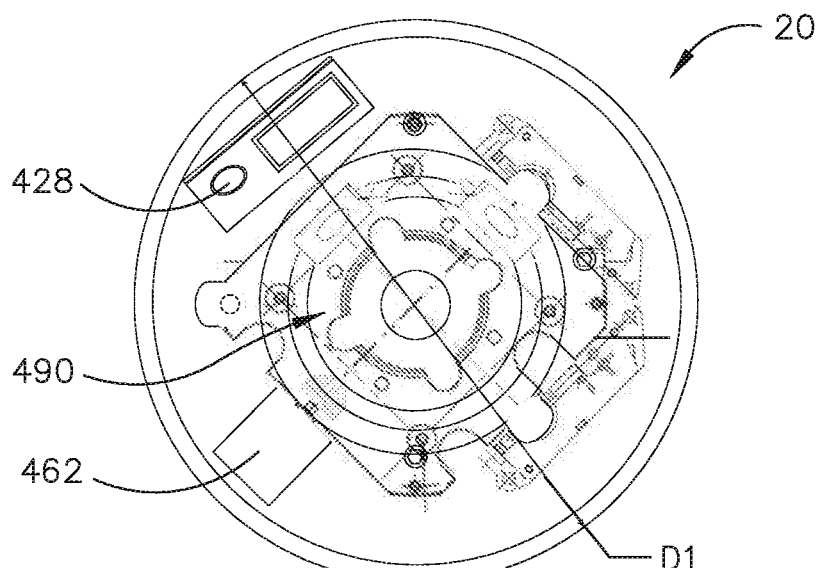
FIG. 13 is a plan view of an exemplary laser controller that is used in the system of FIG. 1.
Figure 14:
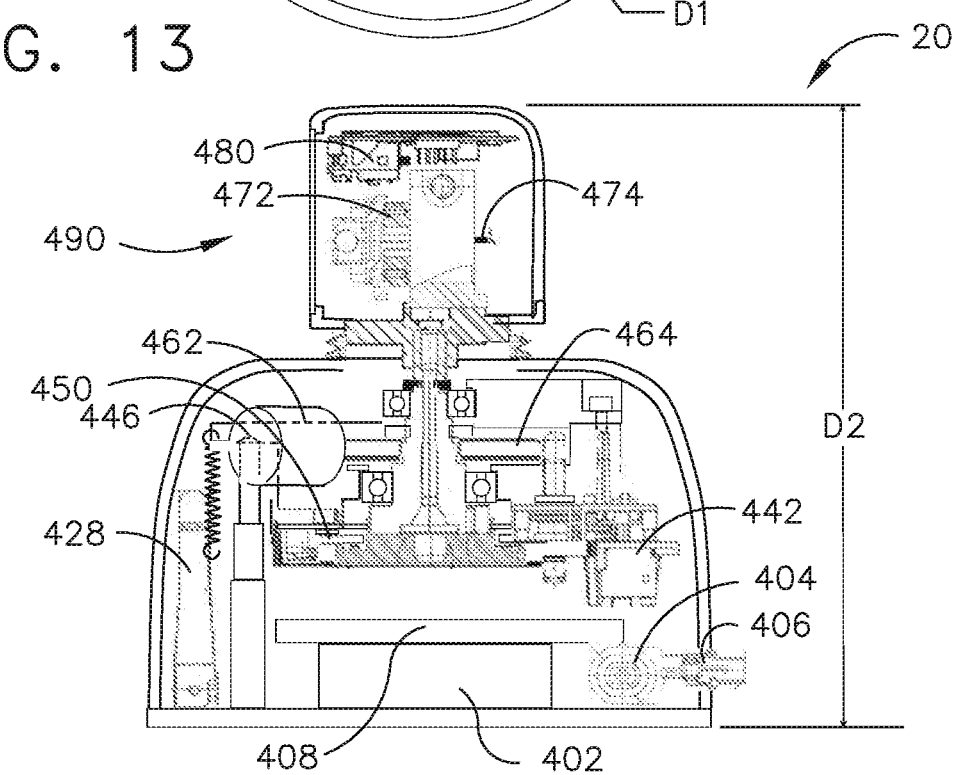
FIG. 14 is an elevational view in cross-section of the exemplary laser controller of FIG. 13.

Referring now to FIGS. 13 and 14, an exemplary laser controller 20 is illustrated in a top, plan view and a side, elevational cross-section view. The electronic distance instrument 480 is placed near the top of the laser controller package, so that its distance measuring laser beam output is directed at an elevation of approximately six inches (152 mm) above floor level, once the laser controller 20 is placed on a jobsite floor surface. The exemplary laser controller 20 has proposed dimensions "D1" and "D2;" the proposed overall outer dimension "D1" is about 6.28 inches (160 mm) in diameter, while the proposed overall outer dimension "D2" is about 6.89 inches (175 mm) in height.

Also placed near the top of the laser controller assembly 20 is the laser transmitter 472, which has an associated circuit board 474 and a laser fan cylinder lens 476. The cylinder lens 476 receives a laser beam (as a straight line), and converts that optical energy into a fan beam that is spread into a laser plane by the cylinder lens, as illustrated at 134 and 154, for example.

The entire top portion of the laser controller assembly, generally designated by the reference numeral 490, is able to rotate completely around its circumference at a 360 degree angle, so that any desired heading can become the "aiming angle" of interest for the fan beam laser plane, and for the electronic distance instrument directional output of this laser controller 20. An azimuth drive subassembly is provided that controls the heading of the "aiming angle," which includes the azimuth drive motor 462, an azimuth drive disk 464, and an angle encoder 450.

To make the laser controller 20 fully automatic, it is preferred to include a self-leveling platform, which includes the leveling motor 442, a level sensor 444 (not shown on FIGS. 13 and 14), and a leveling platform pivot at 446.

A battery pack 402 is included at the bottom portion of the laser controller 20, so that replacement of the batteries will be easily done, using an access cover on the bottom of the enclosure. A power switch is included at 404, and a charging jack at 406. A main circuit board is located near the bottom of the laser controller, at 408. In addition, an antenna 428 is included inside the enclosure for receiving and transmitting wireless signals.

Figure 15:
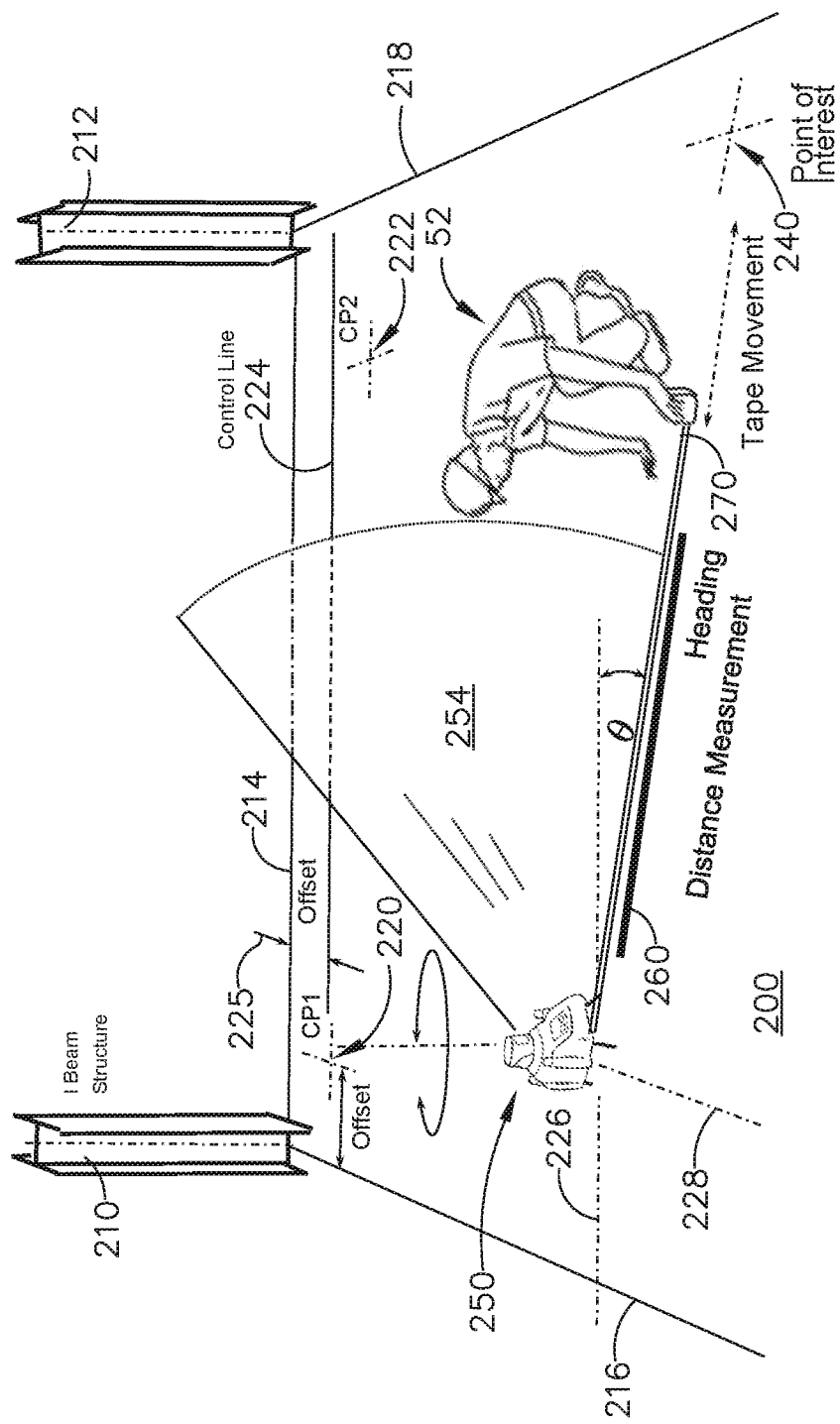
FIG. 15 is diagrammatic view of how a human user would use an alternative embodiment laser controller with a remote controller of a layout and point transfer system, as constructed according the principles of the technology disclosed herein, used for finding the location of a point of interest on a jobsite floor, after the laser controller has been set up (registered) on the floor plan.
Figure 16:
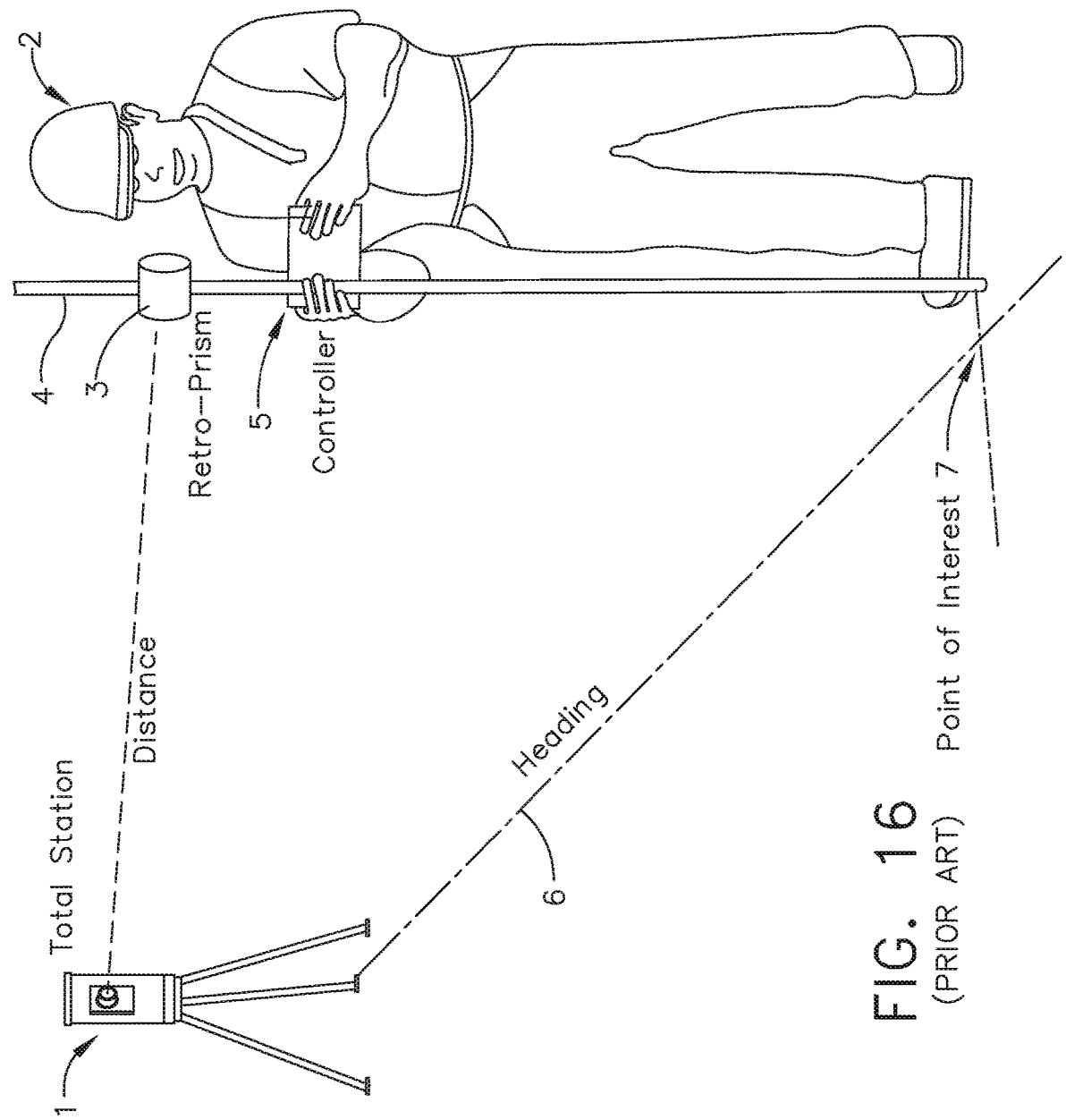
FIG. 16 is a diagrammatic view of a conventional total station laser system that is known in the prior art, depicting its attempt to find the position of a point of interest on a jobsite floor.

Referring now to FIG. 15, an alternative embodiment for a laser controller can be used to find points of interest, in which the laser controller does not include an electronic distance measuring unit. A simplified laser controller 250 still includes a rotatable platform with a laser fan beam emitter, so it emits a laser fan beam 254 that produces a laser light line 260 along a jobsite floor surface 200. The registration of the laser controller 250 into the jobsite floor plan will require a manual measurement of distance to the control points 220 and 222 during the setup procedure. Once that has been accomplished, the laser controller 250 will be ready for use in laying out points of interest.

If a "known" point of interest is to be laid out, then the coordinates will be made known to the laser controller 250 (typically by use of a remote controller 300 carried by the user 52, in which the remote controller has the virtual jobsite floor plan stored in its memory circuit 316). The laser controller 250 can then be commanded to aim its fan beam directly at the known point of interest 240, which will produce a visible laser light line 260 along the jobsite floor surface, all the way to (and likely past) the physical location for that point of interest. The distance to that point of interest can be displayed on the display monitor 342 of the remoter controller 300. The user 52 can then physically run a tape measure 270 from the laser controller along the laser light line 260, and mark the spot at the correct distance. That marked spot is the point of interest 240.

If a point of interest is "unknown," the user can select a physical location (the "physical spot") on the jobsite floor, and then command the laser fan beam 254 to aim at that exact physical spot. (This is the "survey mode" for use with this equipment.) The user can then run a tape measure 270 between the laser controller 250 and that physical spot (at 240 on FIG. 15, for example) to determine the exact distance therebetween. The user can input that measured distance between the physical spot 240 and the laser controller 250 on the keypad, or touchscreen display, of the remote controller 300, and the application software on the remote controller will calculate the coordinates of that physical spot, and it can be placed into the virtual jobsite floor plan, thereby becoming a "known" point of interest.

The laser controller 250 used in these examples in connection with FIG. 15 is a true "low cost" piece of equipment. It has no laser distance meter, and no movable frame or cart is necessary to be used with a movable target screen. Of course, this system is also more difficult to use than the fully automated laser controller 20 that is used with the examples that are described in connection with FIG. 1 and other views, herein. The user would be required to repeatedly move back and forth between the laser controller 250 and the "next" point of interest, and also must physically move a tape measure 270 and take precise distance measurements, over and over, and over. But it might still be a vast improvement over whatever methodology a given user had previously been using.

Registering the laser controller 250 with the jobsite floor plan would be similar to the setup procedure discussed above, in connection with FIG. 5. Instead of using a laser distance meter that is mounted on the laser controller 20, the user would place the laser controller 250 on the jobsite floor surface, then aim the laser fan beam direction at one of the control points, and then use a tape measure to determine the physical distance between that control point and the laser controller 250. That measured distance is then keyed (entered) into the remote controller 300. This procedure would then be repeated for a second control point. Once the azimuth angles and distances are known for both control points, the laser controller's position on the jobsite floor plan can be calculated as per the discussion above that involves the calculations relating to FIG. 2, for example.

Figure 17:
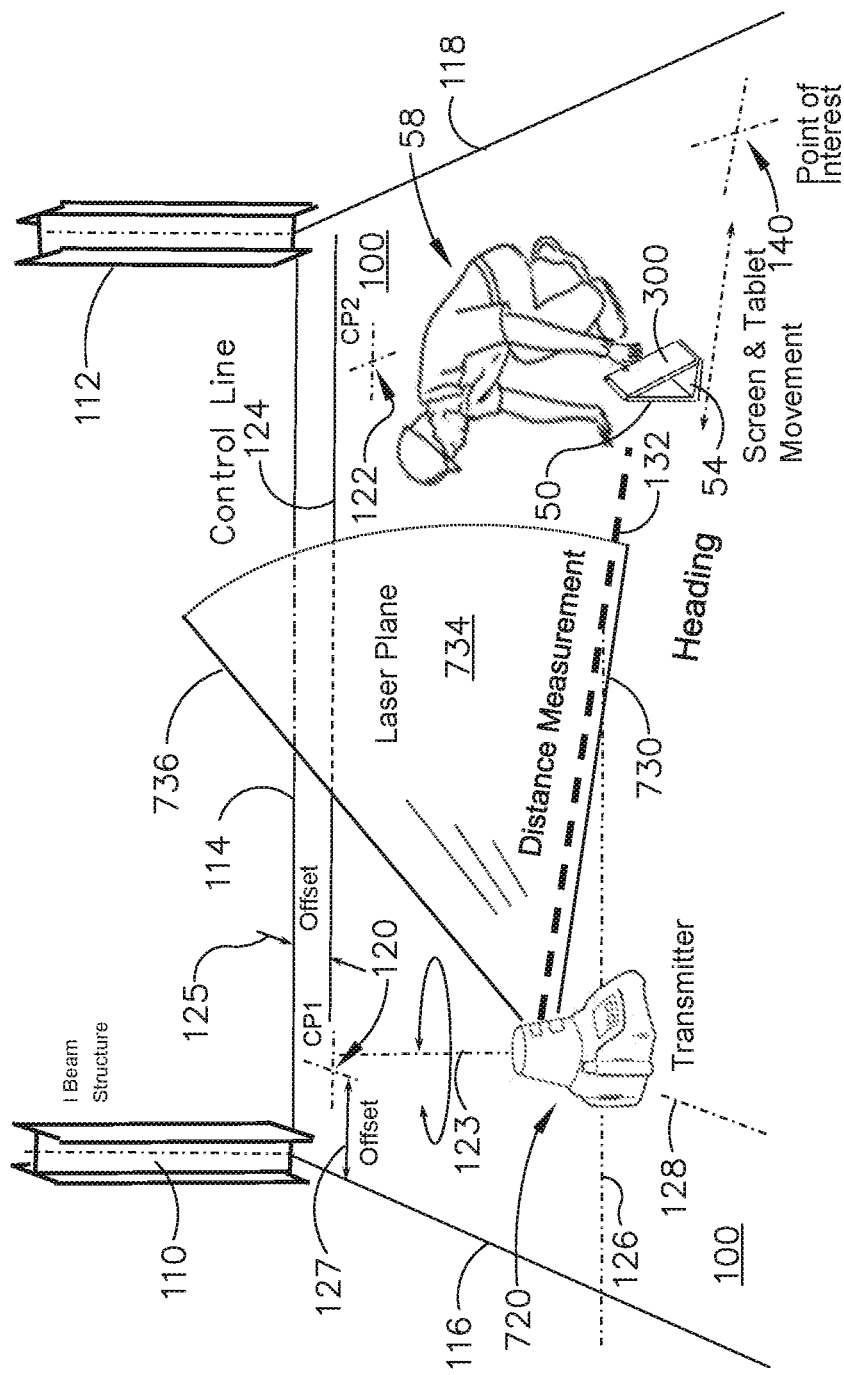
FIG. 17 is a diagrammatic view of how a human user would use a movable floor frame with a remote controller of a layout and point transfer system, as constructed according the principles of the technology disclosed herein, used for finding the location of a point of interest on a jobsite floor, after a laser controller with a horizontal bottom edge light line has been set up (registered) on the floor plan.

The basic system concept is again generally illustrated in FIG. 17. A single laser controller 720 is provided, which also uses a laser transmitter 472 (see FIG. 6) which outputs a vertical laser light plane 734 that has a different cylinder lens that directs the plane of visible wavelength laser light between a top edge line 736 and a bottom edge line 730. The bottom edge line 730 can be a substantially horizontal line that never contacts the work surface 100 of the jobsite.

The user handles a target screen 50, and a visible laser light line will appear on that target screen when the user has correctly positioned the target screen such that the laser plane 734 intersects that target screen 50. After completion of a setup procedure the laser controller 720 is able to rotate a pivotable rotor portion on its pivot axis, so as to direct the vertical laser light plane 734 toward a point of interest 140 on the jobsite's work surface 100, and the user 58 will be able to visually see the correct direction of the laser plane 734 be keeping the target screen 50 within the laser plane while moving that target screen in a radial line direction, either toward or away from the laser controller 720, as needed.

When the user first begins to search for the laser plane 734, that user can move the target screen 50 in a non-radial direction until that screen intercepts the visible wavelength laser light plane. Once that occurs, the user would likely move the target screen 50 (in a non-radial direction) to a position such that the visible laser line produced by the laser plane 734 on the target screen appears near the middle of the target screen 50. After that, the user can begin moving the target screen 50 in a radial direction until arriving at the correct distance for the "next" point of interest on the jobsite surface.

The laser controller 720 also has the capability of measuring the distance between the transmitter and the movable target screen 720, which is typically located at, and handled by, the user. An electronic distance measuring instrument is provided on the rotating rotor portion of the laser controller 720 such that it will always "aim" in the same azimuth direction (or "heading") as the vertical laser plane is aiming. In a preferred embodiment, the electronic distance measuring instrument comprises a laser distance meter (also known as an "LDM") that emits a narrow laser beam toward an intended target, and receives back some of that emitted laser beam energy—this is a well-known device. Also, in a preferred embodiment, the LDM is mounted on the laser controller 720 such that it emits its laser beam in a substantially horizontal direction, about six inches (152 mm) above the floor level.

In the illustrated embodiment of FIG. 17, the laser controller 720 includes a laser distance meter ("LDM") 480 (see FIG. 6) that aims its measuring laser beam 132 along the same azimuth as the vertical laser light plane (also referred to as a laser "fan beam") 734. As noted above, both the LDM 480 and the laser plane transmitter 472 are mounted on the same pivotable portion of the laser controller 720, and the distance measuring module is intended to be located within the laser transmitter fan beam, and not only rotates with the vertical laser plane 734, but has the laser 486 used for the distance measurement aligned and coincident with the output laser plane used for the visual heading direction. Therefore, these laser light-producing emitters are always aimed along the same azimuth (or "heading").

When in use, the LDM 480 has the ability to measure the distance from the transmitter rotor spin axis to a target screen 50, which typically is located at the user 52. The LDM 480 thus can provide an accurate distance measurement in real time to the laser controller 720, which in turn can provide that information to a tablet computer 300, which is the remote controller that is visible to the user. The target screen 50 must be at least partially reflective to the distance-measuring energy, so that a portion of the laser light emitted by the LDM 480 will be returned to the photosensor 488 of the LDM.

If an indicating lamp 490 is provided on the laser controller 720, then it can provide a flashing indication as to whether the user has moved the target screen 50 to a position that is too short, too long, or just at the correct distance ("on point"). By use of a wireless communications link 426 between the laser controller 20 and the remote controller 300, the measured distance between the LDM 480 and the target screen 50 can be transmitted and then displayed on the monitor screen 342 (see FIG. 7) of the tablet 300. Alternatively, as described in greater detail below, the laser light source could be flashed at different rates to provide an indication as to the current distance status, which would provide an easily visible indication to the user on the jobsite floor as to whether that user should hold still, or move toward or away from the laser controller.

Figure 18:
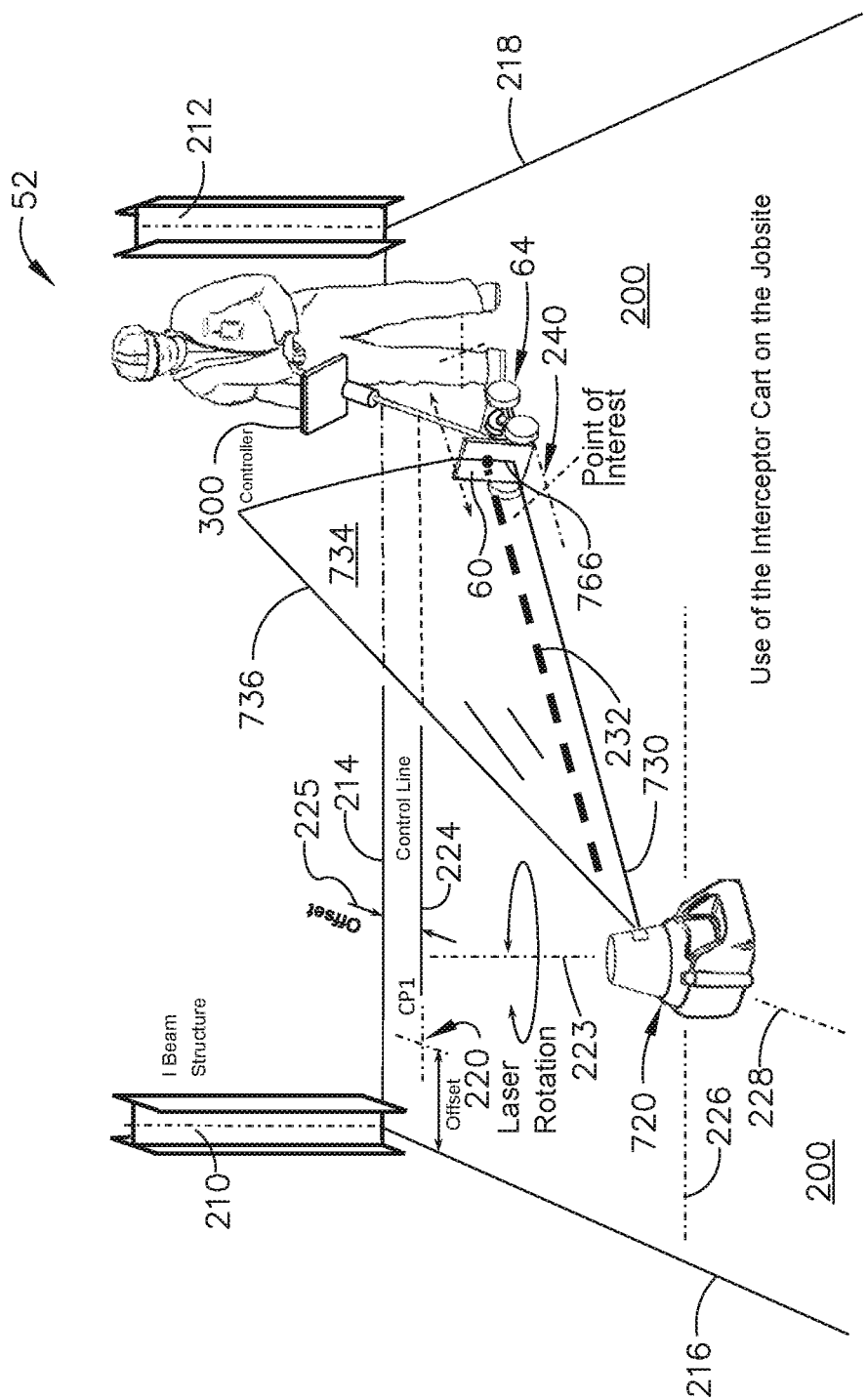
FIG. 18 is a diagrammatic view of how a human user would use the Hand-Operated Rolling Cart of FIG. 9 as part of a layout and point transfer system, as constructed according the principles of the technology disclosed herein, used for finding the location of a point of interest on a jobsite floor, after a laser controller with a horizontal bottom edge light line has been set up (registered) on the floor plan.

Referring now to FIG. 18, the laser controller 720 is illustrated in use with the movable "rolling" accessory cart 64. As described above in reference to FIG. 9, the user can easily find a point of interest on the jobsite floor 200 by maneuvering the cart 64 so that the target screen 60 intercepts the distance meter laser spot 65 at any distance from the laser controller 720, and along the heading provided by a visible laser light plane 734. It should be noted that the laser fan beam 734 will extend all the way between its uppermost edge 736 and its lowermost edge 730—which is a horizontal laser light line substantially paralleling the jobsite floor. Therefore, the laser fan plane 734 will produce a visible vertical laser light line 766 on the target screen surface at 60. This is a highly visible vertical line that the user will easily see while using the rolling cart 64, and all that the user needs to do is move the cart back and forth—while keeping the cart 64 within the visible laser fan beam 734—until finding the correct distance.

As in the case of the first embodiment described above, the LDM 480 of the laser controller 720 will measure that distance 232 between the target screen 60 and the laser transmitter 472, and display the distance on the tablet's display monitor 342. In addition, an indication can be provided as to whether the user should move closer in toward the transmitter, or to move farther out from the transmitter, or to stand still if the user is "on point".

Figure 19:
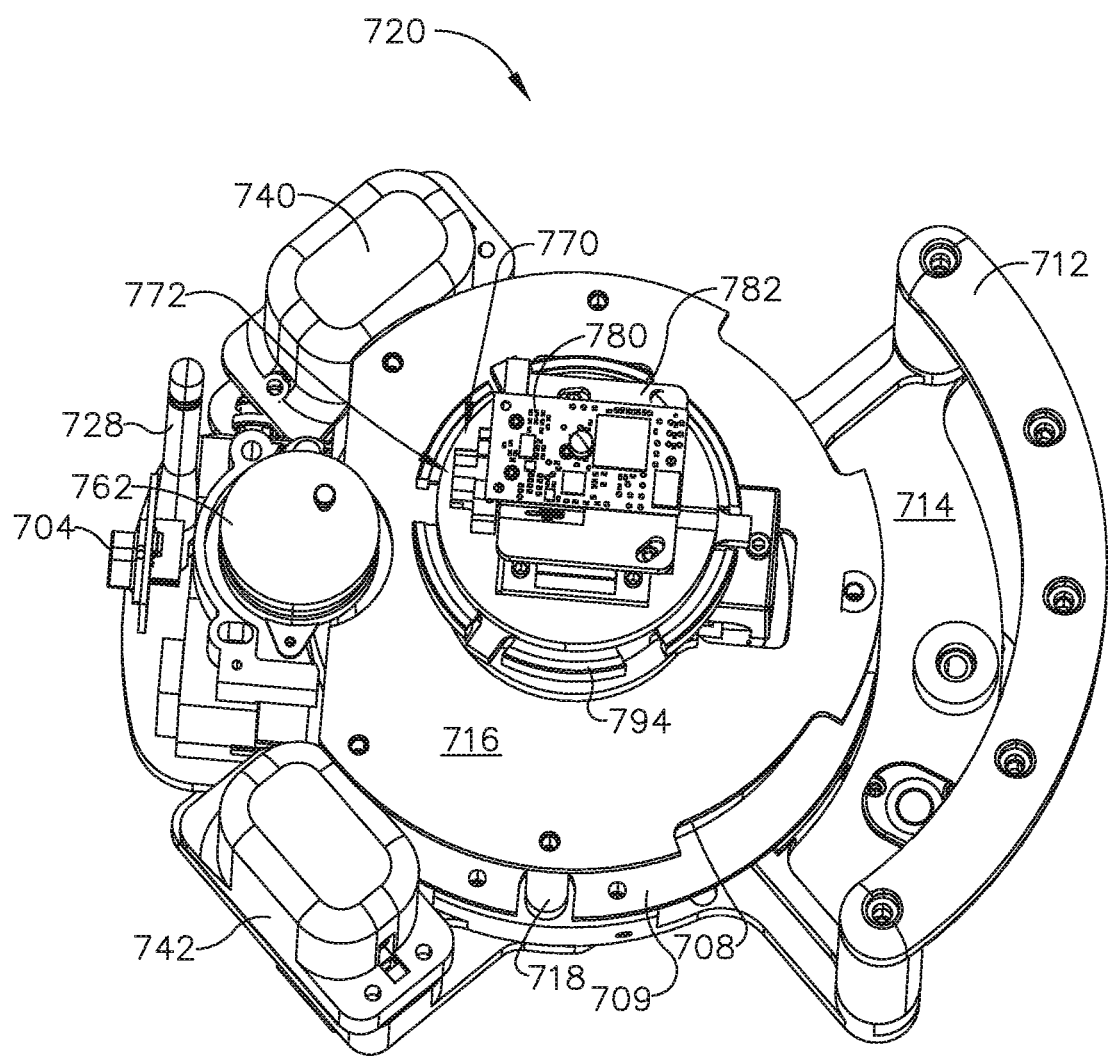
FIG. 19 is a perspective view from the front and above of a second embodiment of an exemplary laser controller that is used in the system of FIG. 1, showing the interior components without the housing.
Figure 20:
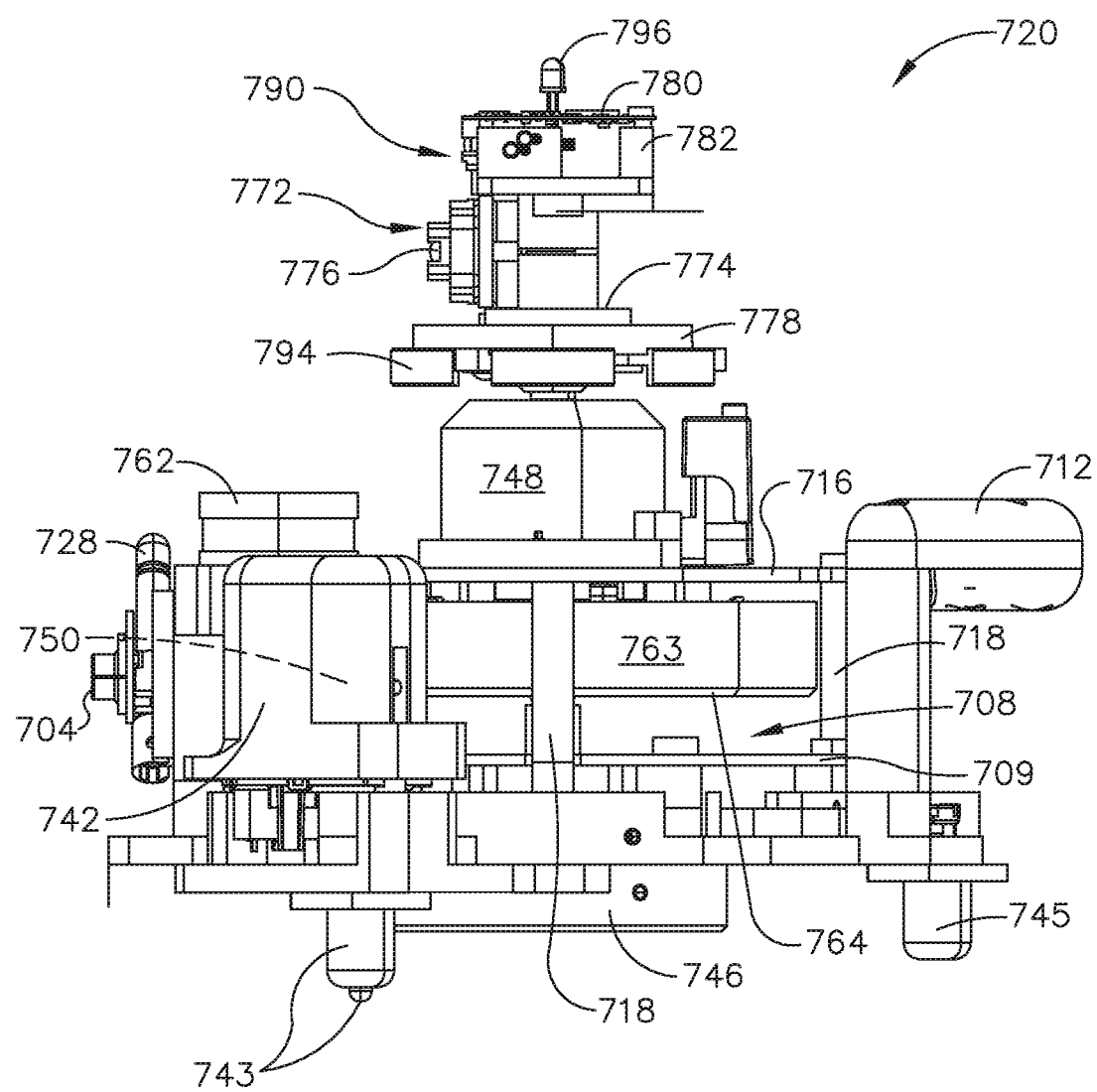
FIG. 20 is a side elevational view of the laser controller of FIG. 19, showing the interior components without the housing.
Figure 21:
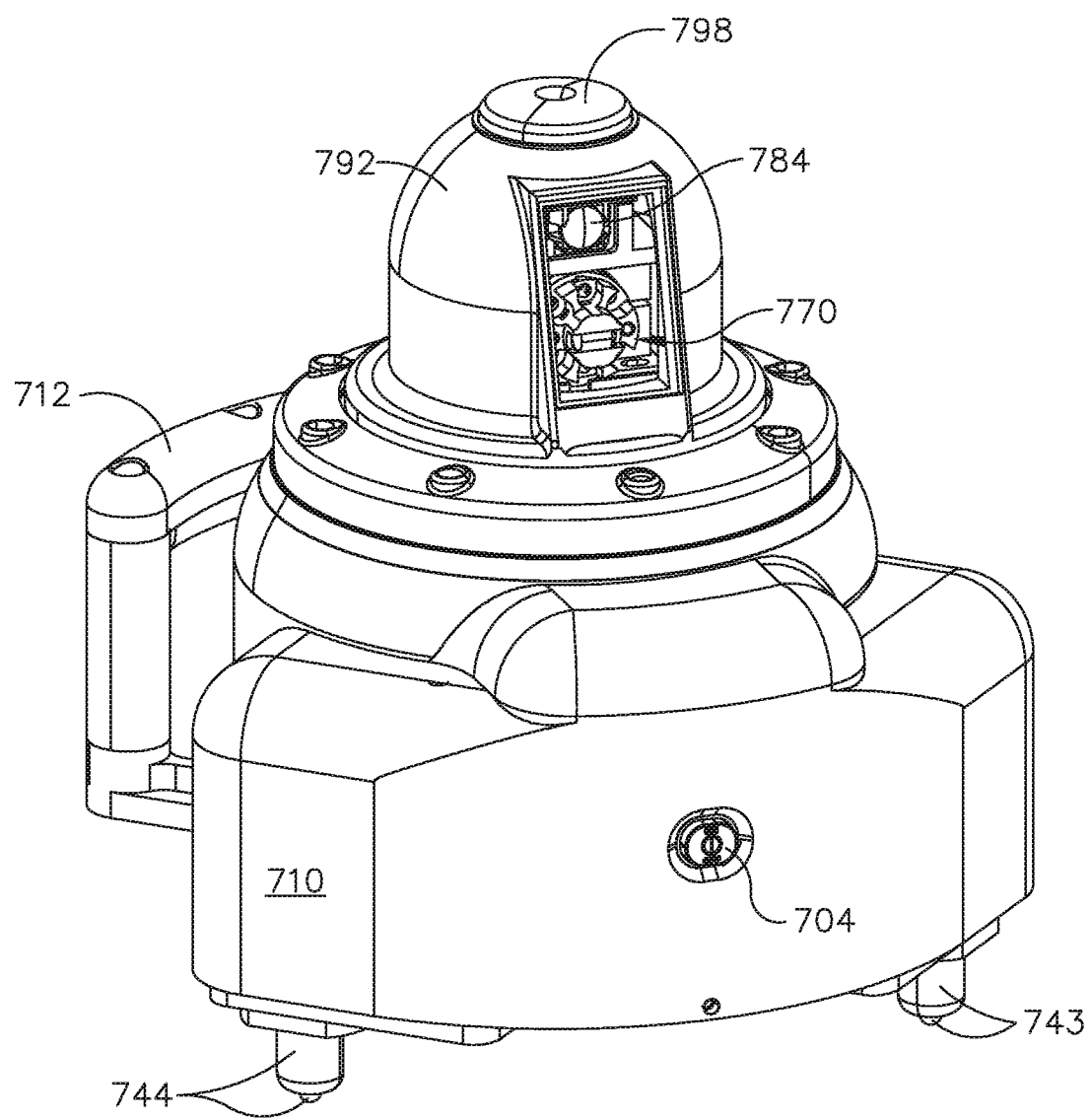
FIG. 21 is perspective view from the side and above of the laser controller of FIG. 19, showing the housing, and showing the front of the rotating turret on top.

Referring now to FIGS. 19 through 21, a second embodiment exemplary laser controller 720 is illustrated. An electronic distance measuring (EDM) instrument is placed near the top of the laser controller package, so that its distance measuring laser beam output is directed at an elevation of approximately six inches (152 mm) above floor level, once the laser controller 720 is placed on a jobsite floor surface. As seen in FIG. 19, the EDM includes a printed circuit board 780, which rests on a mounting block 782. In this embodiment, the EDM is a laser distance measuring instrument, and the EDM laser emitter/receiver is best seen in FIG. 21 at reference numeral 784.

The exemplary laser controller 720 has many rotatable components in its upper "turret" portion 790, which can be seen in FIGS. 19 and 20. Rotatably mounted in the upper turret 790 are the EDM components 780 and 782 (as noted above) and a laser emitter subassembly 770. The laser emitter subassembly 770 includes a laser transmitter 772 (typically using a laser diode as the laser light source), a collimating lens, and a cylinder lens that creates a fan beam of visible wavelength laser light. A portion of the cylinder lens can be seen at reference numeral 776 on FIG. 20. The cylinder lens 776 receives a laser beam (as a straight line), and converts that optical energy into a fan beam that is spread into a laser plane by the cylinder lens (such as the fan beam, or laser light plane, 734 on FIG. 17).

Another circuit board 774 is mounted as part of the rotatable laser emitter subassembly 770. An upper rotatable housing 792 is seen in FIG. 21; this housing 792 is removable, and attaches to a series of mounting clips 794 that are mounted around the perimeter of a rotatable base 778. In the uppermost portion of the rotatable turret 790 is an indicating lamp 796, which typically is an LED. Surrounding the lamp 796 is a "beacon" lens cap 798, which is highly visible to users standing near the laser controller 720 when the lamp 796 is illuminated.

Certain other components that rotate are located in the lower portion of the laser controller 720. This includes an azimuth drive friction wheel 763 and an azimuth drive encoder disk 764. The entire rotatable portion of the laser controller 720 is supported by bearings in a bearing housing 748, as seen in FIG. 20.

The entire top portion of the laser controller 720 assembly, generally designated by the reference numeral 790, is able to rotate completely around its circumference at a 360 degree angle, so that any desired heading can become the "aiming angle" of interest for the fan beam laser plane, and for the electronic distance instrument directional output of this laser controller 720. An azimuth drive subassembly is provided that controls the heading of the "aiming angle," which includes an azimuth drive motor 762, the azimuth drive disk 764, and an angle encoder 750.

In the illustrated embodiment of the laser controller 720, the azimuth drive motor 762 is a stepper motor, which has an output that contacts the friction wheel 763 to rotate the entire top turret 790. The encoder disk 764 provides position information feedback, so this system is a precise aiming instrument, with virtually no gear backlash in this mechanical form.

To make the laser controller 720 fully automatic, it is preferred to include a self-leveling platform, which includes two leveling motors 740 and 742, a level sensor (not shown), a stationary leg 745, and two movable leveling legs at 743 and 744. A leveling platform "contains" all these components, using a platform tri-bracket mount 746. The two movable leveling legs 743 and 744 and the stationary leg 745 are all attached to this mount 746. The movable leveling legs will extend or retract as necessary to provide a self-leveling platform, once the laser controller 720 has been placed on a jobsite surface, regardless of the roughness or the lack of "horizontalness" of that surface (within reason).

A battery pack (not shown on FIG. 20) will typically be included at the bottom portion of the laser controller 720, so that replacement of the batteries will be easily done, using an access cover on the bottom of the enclosure. A power switch is included at 704, and a charging jack (not shown) will typically be included.

A stationary main circuit board 708 is located near the bottom of the laser controller, which mounts on a stationary mounting plate 709. A handle 712 is attached to a mounting base 714, which is the base of the overall laser controller 720. An antenna 728 is included inside the enclosure for receiving and transmitting wireless signals.

A stationary upper mounting plate 716 is included in the lower portion of the exemplary laser controller 720. There are several standoffs 718 that hold the upper mounting plate 716 and the mounting base 714, which provide a spacedapart volume for holding the azimuth drive components and the self-leveling drive components.

FIG. 21 shows the entire laser controller 720 with its housings (or covers). The upper housing is at reference numeral 792, which rotates with the entire rotatable "turret" portion 790. The lower housing is at reference numeral 710. The mounting legs are visible in this view, including the two movable legs 743 and 744. The lasers are both visible, including the EDM laser emitter/receiver 784 and the laser light plane emitter at 770.

Figure 22:
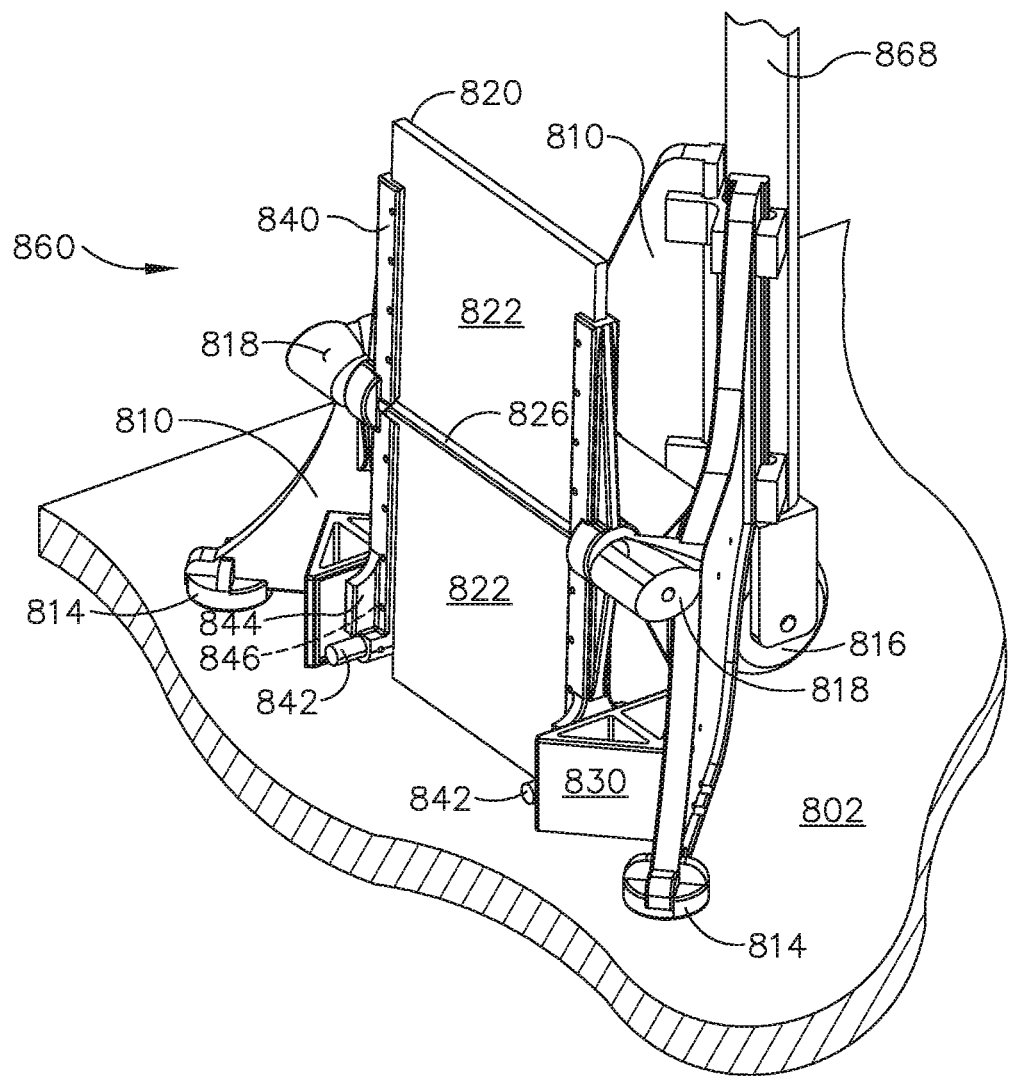
FIG. 22 is a perspective view from the front and side of a second embodiment of an exemplary movable accessory cart, showing details of the pivotable target screen.
Figure 23:
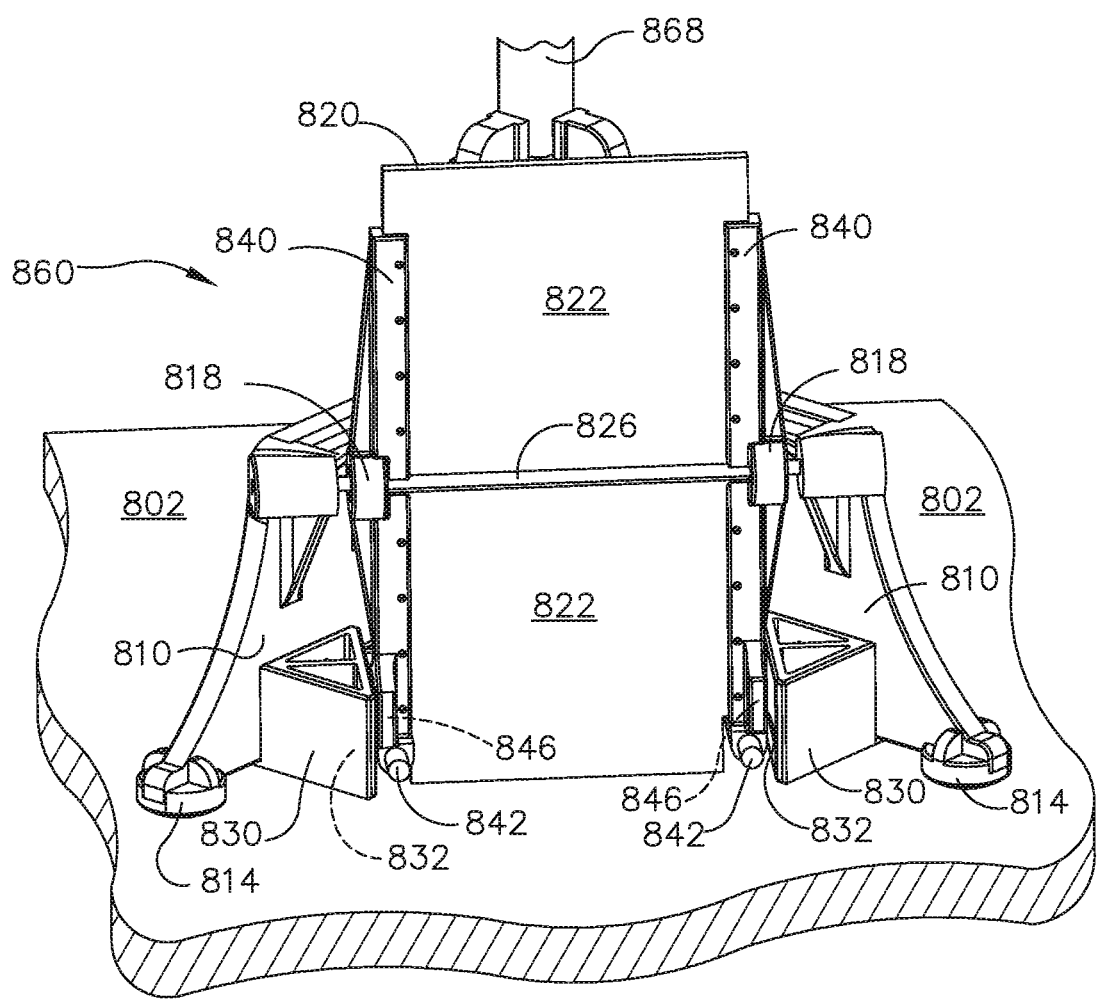
FIG. 23 is front view, slightly in perspective, of the movable accessory cart of FIG. 22, again showing details of the pivotable target screen.
Figure 24:
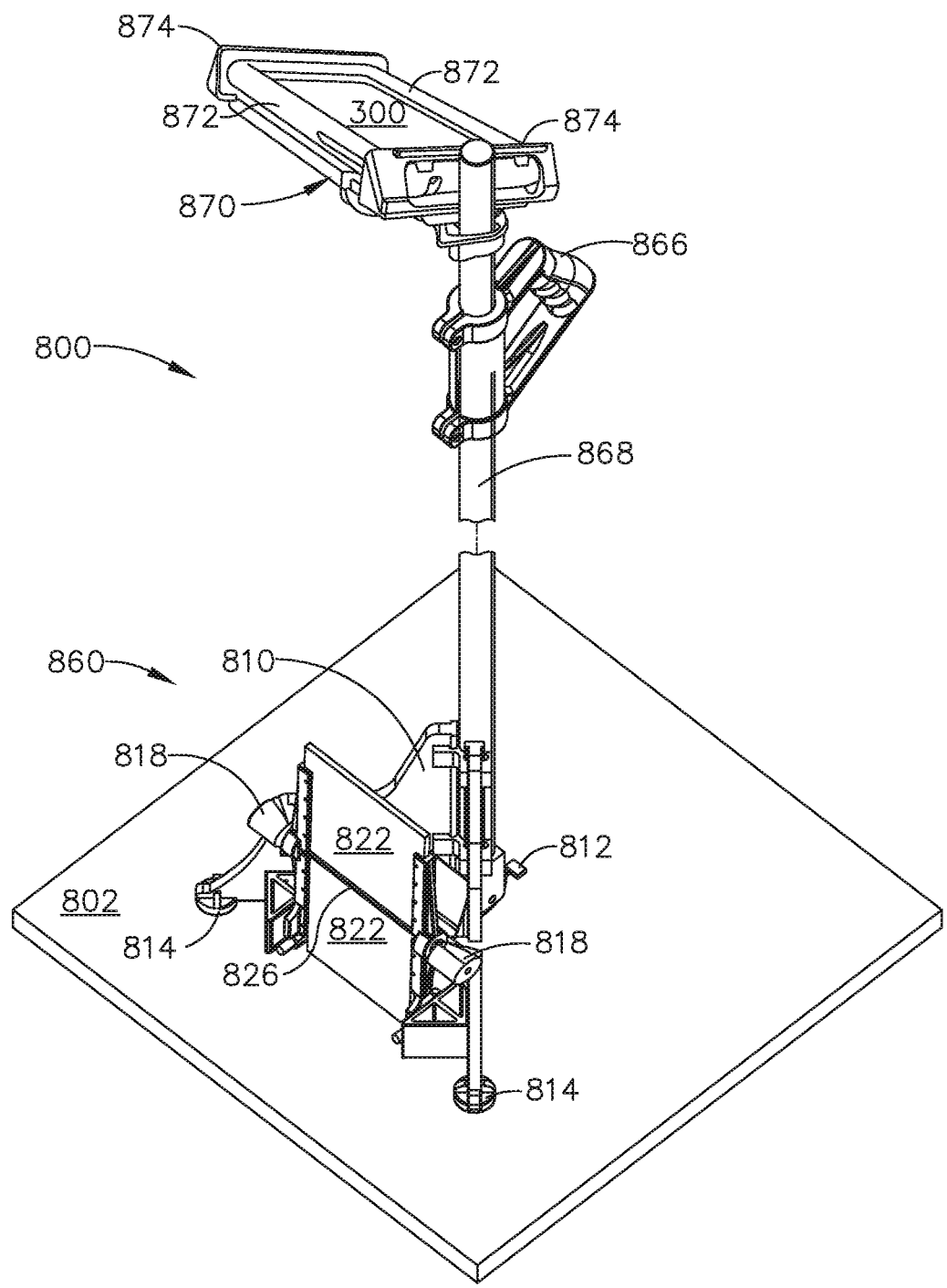
FIG. 24 is a perspective view from the front, side, and above of the entire movable accessory cart of FIG. 22.

Referring now to FIGS. 22-24, a second embodiment of an exemplary movable accessory cart is generally designated by the reference numeral 800. The movable cart 800 is similar to the movable "rolling" accessory cart 64 discussed above, with certain improvements. The bottom portion (or chassis) of the movable cart 800 includes a rolling rear wheel 816, and two non-rolling mounting feet 814. When a user moves the cart 800, an extension arm 868 is slightly tilted so as to lift the two mounting feet 814 off the jobsite surface at 802. When the cart 800 has been positioned as desired, the user untilts the extension arm 868 to allow the mounting feet 814 to touch the floor surface, and the cart will then stand still at that position.

As can be best seen in FIGS. 22 and 23, there is a target screen 820, which has a bright finish surface at 822 that faces toward the "front" of the cart 800; in FIG. 23, the "front" of the cart is facing the observer of this view. In this exemplary embodiment 860, the target screen 820 is made of plexiglass that is translucent to visible wavelength light, and the bright surface 822 is a white label that has been affixed to that front surface of the target screen 820. When a vertical plane of visible wavelength laser light impacts the target screen from the front, the label 822 allows a portion of the visible wavelength light to pass through that label 822 and through the translucent material so that a human user will be able to see a vertical line of laser light passing out the back surface of the target screen 820. At the same time, a large portion of the visible wavelength laser light that strikes the front of the target screen 820 will be reflected by the bright surface finish of the label 822, and therefore, if a human user is positioned to the front of the target screen 820, that user will be able to see the vertical line of laser light reflecting off that surface 822. In essence, a user will be able to see the laser light line on the target screen 820 regardless of his relative position to that target screen (on the jobsite floor).

The target screen 820 and the bright surface 822 are part of a target screen subassembly that is generally designated by the reference numeral 860. The target screen 820 is held by a mounting frame 840 that is pivotable about a horizontal pivot shaft 826. The pivot shaft 826 is held in place by a pair of fixed shaft mounts 818 which, in turn, are attached to an overall mounting bracket 810. The mounting bracket 810 is attached to the extension arm 868 by a mounting clamp 812.

Most of the components of the target screen subassembly 860 are made of plastic, or some other non-metallic material. The target screen frame 840 is preferably plastic, and has two openings near the bottom for a pair of brass weights 842. The positions of the brass weights 842 are adjustable, and during manufacture, the brass weights 842 are moved to positions that will cause the target screen 820 to go to a plumb (vertical) position about its fixed pivot shaft 826, when released.

If the target screen subassembly 860 had no dampening, then even slight vibrations could partially impair its desired vertical positioning. To compensate for that possibility, a pair of aluminum plates 832 are positioned along the surface of a pair of plastic mounting brackets 830. In addition, a pair of permanent magnets 846 are positioned along the surface of a pair of widened portions of the frame 840. (These are best seen on FIG. 23.) The magnets 832 will move with the frame 840, and their magnetic fields will intersect the non-moving aluminum plates 832.

When the movable accessory cart 800 is moved to a new location on the jobsite surface, the target screen 820 will tend to rotate rather freely about its pivot axis at the pivot shaft 826. As the target screen 820 rotates, the magnets 846 will be moving along with the bottom portion of the target screen 820/frame 840 subassembly, and when their magnetic fields pass into the aluminum plates 832, eddy currents will be induced, which will create a "back-reluctance" that tends to slow down the rotational movement of the overall target screen 820 structure. This magnetic system does not need to be critically dampened, especially since it is desired to allow the brass weights 842 to perform their task of causing the target screen 820 to go to a plumb (vertical) position before the laser plane 734 and the EDM 784 are used for positioning accuracy. The rocking motion of the pivotable target screen 820 will dampen out fairly quickly, once the accessory cart 800 has been allowed to stand still.

It will be understood that the exact materials described above are not critical to the functioning of the target screen subassembly 860. Other non-metallic materials could be used for the plastic parts described above, and the brass and aluminum parts could be replaced with other materials, without departing from the principles of the technology disclosed herein.

It should be noted that the target screen 820 needs to be "tall" enough so that the laser spot produced by the EDM instrument 480 (or 784) of the laser controller 20 (or 720) will be intercepted by that target screen. In the system described above, if the "front" surface of the target screen 820 has the bright surface finish (or label) 822, then that "front" surface is the criterion that is being measured by the laser distance measuring instrument of the EDM. Therefore, it is the laser light line being produced on that "front" surface that is the indicator of the correct position of the point of interest being sought on the jobsite surface.

FIG. 24 shows the entire second embodiment movable accessory cart 800. As noted above, the target screen subassembly is at the reference numeral 860, and the bottom portion of the cart 800 rests on the jobsite surface 802. There is a handle 866 that allows the human user to easily tilt the cart 800 and move it to a different location on the jobsite floor.

The very top portion of the movable accessory cart 800 includes an adjustable mount 870 that holds a remote controller in place for easy use by the human user. The remote controller will typically comprise a tablet computer 300, which is held in place by a tablet holder 872, and that in turn is held in place by a tablet mounting bracket 874. The adjustable mount 870 will hold the tablet mounting bracket 874 at an orientation that is selectable by the user.

Separate Laser Receiver Embodiment

Figure 25:
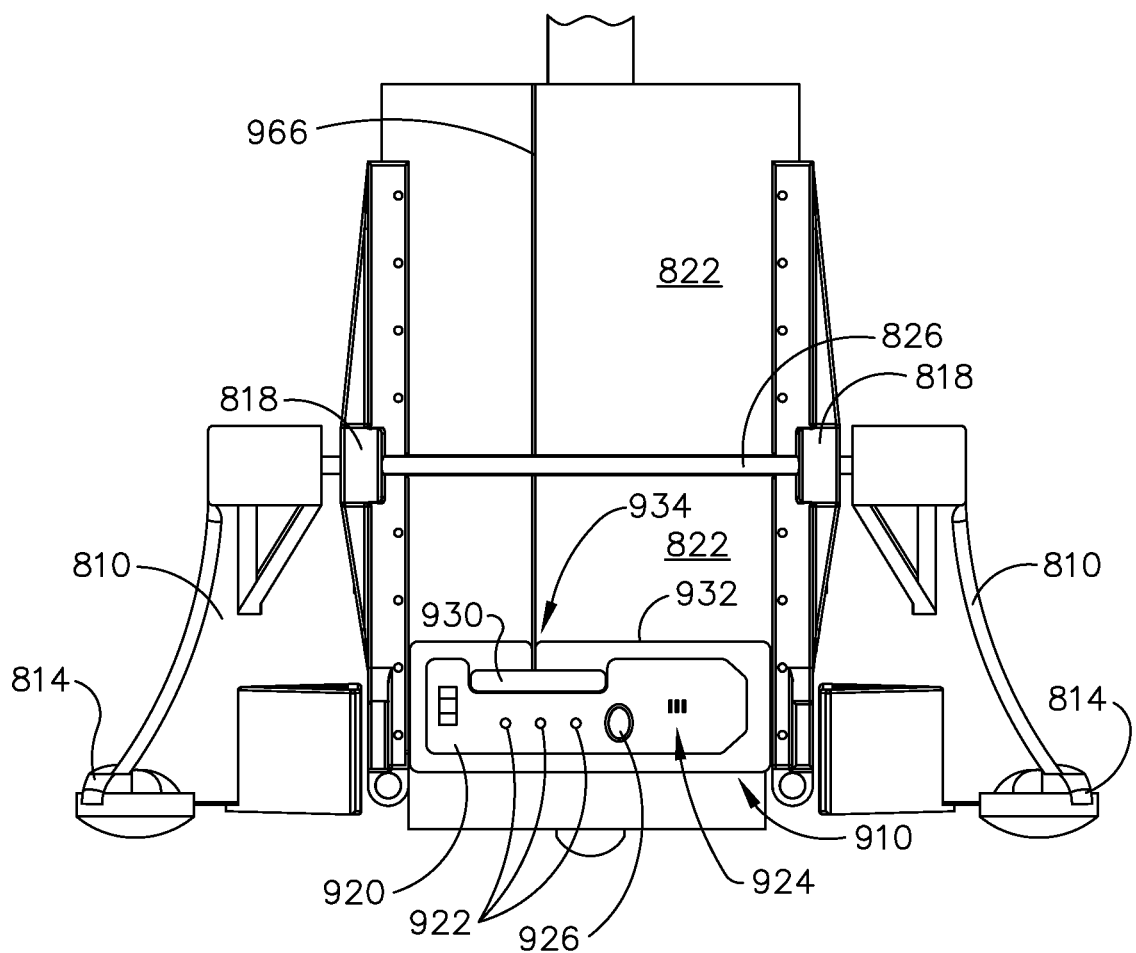
FIG. 25 is front view of an alternative exemplary movable accessory cart, showing details of the pivotable target screen that has a laser receiver mounted thereto.
Figure 26:
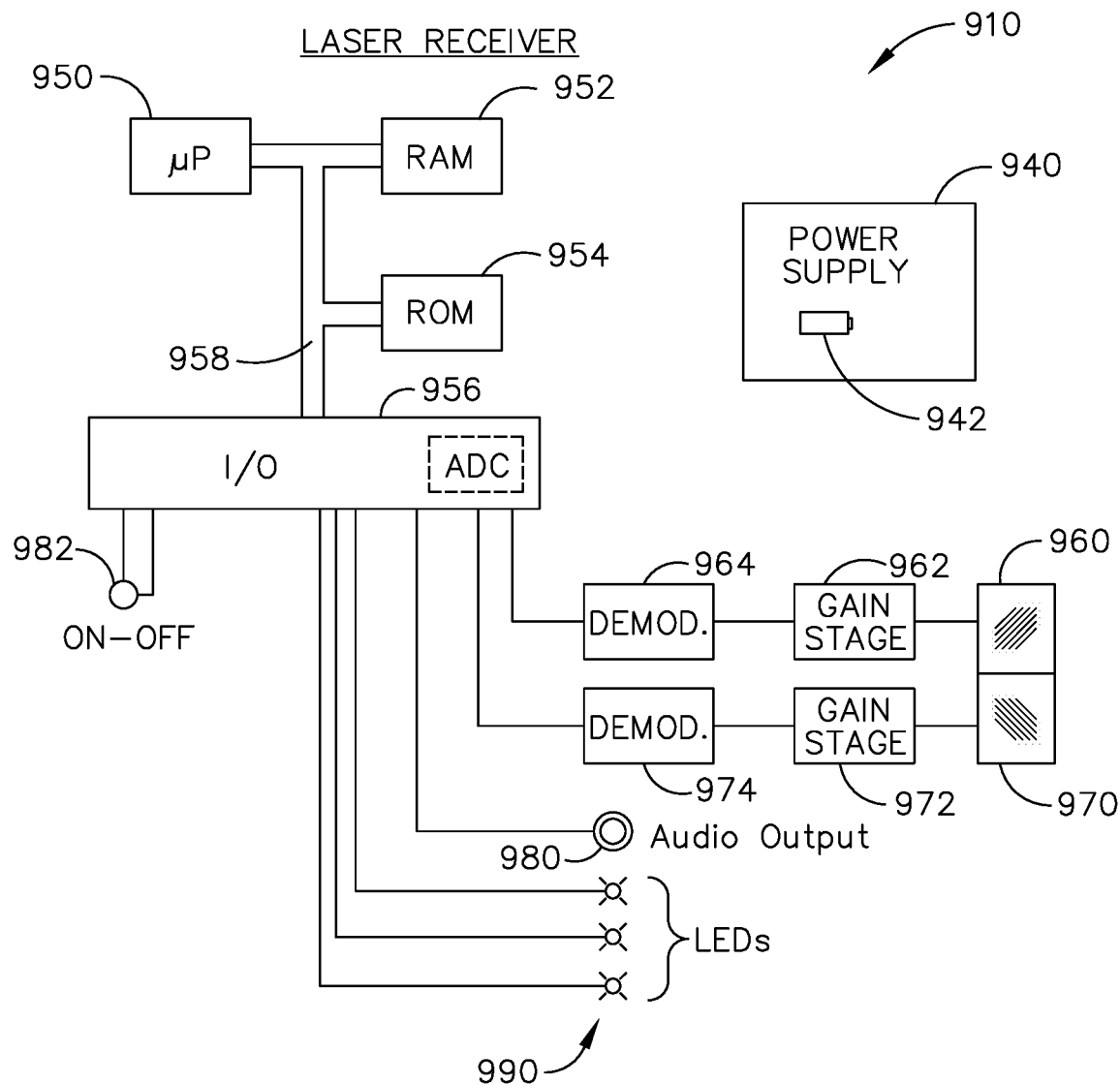
FIG. 26 is a block diagram of the major components of a laser receiver that is used in the alternative exemplary movable accessory cart of FIG. 25, which can be used in the system of FIG. 1.

In another alternative embodiment, a separate laser receiver 910 is provided for detecting the laser light fan beam from the laser controller 20. This embodiment could be very useful in "bright light" situations, e.g., in which the sunlight is so intense that a visible wavelength laser plane would be difficult to see, or in which the distance between the laser controller and the target screen is sufficiently great that the laser fan beam is less intense (and more difficult to see). FIG. 26 provides a block diagram of a laser receiver that could be used to detect the laser light, generally designated by the reference numeral 910. FIG. 25 illustrates a mounting scheme for using the laser receiver 910 with the movable accessory cart 800.

The use of a separate laser receiver 910 also allows for the use of a laser transmitter that can use a light source 472 that emits invisible wavelength light, such as infrared (IR) light at 780 nanometers.

Referring now to FIG. 25, the laser receiver 910 is mounted in a horizontal orientation so that its longitudinal photosensor at 930 is directed in that horizontal direction. An exemplary laser receiver for this purpose is a Trimble Model No. HR 220, with a photosensor that is capable of detecting both visible wavelength and infrared light. Of course, a different style of laser receiver could be used for other light wavelengths, if desired, including those of ultraviolet light. Typically, the light wavelengths would be near the visible spectrum, but that is not necessary; also, typically the light source 472 will be a laser light source, so as to create a laser light plane.

On FIG. 25, the bottom portion of the accessory cart 800 is illustrated, including the target screen with its bright finish surface at 822 that faces toward the "front" of the cart. As described above, the target screen 820 is held by a mounting frame 840 that is pivotable about a horizontal pivot shaft 826. The pivot shaft 826 is held in place by a pair of fixed shaft mounts 818 which, in turn, are attached to an overall mounting bracket 810. At the extremities of the mounting bracket 810 are two non-rolling mounting feet 814. This portion of the accessory cart of FIG. 25 operates in the same manner as that described above in reference to FIGS. 22-24. The main difference, of course, is the addition of the laser receiver 910.

On FIG. 25, the laser receiver 910 includes a housing 920, a photosensor at 930, a set of indicating lamps 922, an audible output device at 924, and a power switch at 926. As noted above, the photosensor 930 is oriented in a horizontal direction (i.e., the longitudinal axis of the photosensor is horizontal), which allows the photosensor to detect a laser light plane that is either "ON AZIMUTH" or not. If not, the photosensor are able to detect the position of the laser light plane that is to the left, or to the right of ON AZIMUTH.

The laser receiver housing 920 has an upper edge at 932, and that edge includes a notch at 934. The notch 934 provides a visible indication as to the location of where the ON AZIMUTH position is found for the photosensor 930. If the laser plane has been located and the accessory cart 800 has been correctly positioned, there will be a laser light line 966 that impacts the target screen surface 822 right at the notch 934, as shown on FIG. 25. Therefore, FIG. 25 depicts the accessory cart being positioned in the correct location on the jobsite floor surface to intercept the laser light plane along the correct azimuth angle. When this condition occurs, the laser receiver is able to provide both an audible and visible indication that the accessory cart is ON AZIMUTH.

Referring now to FIG. 26, the laser receiver 910 includes several important hardware components, such as a processing circuit 950, with associated RAM 952, ROM 954, and an input/output ("I/O") circuit 956. These circuits are all in communication with the processing circuit 950 via a bus 958, which normally would carry data signals and address signals, and other types of microprocessor signals, such as interrupts. Since the laser receiver will be handling analog signals, there likely will be an analog-to-digital converter ("ADC") somewhere in this hardware circuitry, and a typical place for such ADC circuit could be with the signal conditioning I/O circuit 956. The ADC circuit could be multiplexed, or there could be more than one ADC circuit for the plurality of analog signals coming from the photosensor 930.

It should be noted that a single microcontroller circuit could potentially contain all the hardware circuits described in the previous paragraph. Moreover, an ASIC could potentially contain all those hardware circuits, as well as additional memory elements for a computer program that is used to execute commands on the processing circuit. In addition to the above hardware components, some type of communications port could be included in the laser receiver 910, such as a wireless transmitter and/or wireless receiver (not shown). Also, a hardware communications port, such as a USB port, could be included (not shown).

The heart of the laser receiver 910 is the photosensor device, which on FIG. 26 is depicted as a pair of photocells that are mounted back-to-back at reference numerals 960 and 970. This is somewhat typical arrangement (with two "butt cells"), although it probably represents the minimum level of sophistication for such photocells that are to be used to detect the position of a laser beam that is striking the laser receiver. Any desired arrangement of photocells can be used to make up the photosensor 930, whether as a simple pair of diagonal split cells, or a much more complex set of multiple individual photocells that are multiplexed and amplified at different gains to achieve a desired effect for quickly and accurately detecting the position of a laser light strike. Several different exemplary schemes have been disclosed in patents owned by Trimble, including U.S. Pat. Nos. 5,486,690, 6,133,991, and 7,012,237.

On FIG. 26, it is assumed that there are two photocells 960 and 970 that make up the photosensor 930 for the laser receiver 910. Each photocell has an analog output that is directed to a gain amplifier stage 962 or 972, respectively. The outputs from the gain stages are then directed to a pair of demodulation stages 964 and 974, respectively. It should be noted that the demodulation stages are optional; for example, if the laser light source 472 is not modulated, then a demodulation stage is not necessary. On FIG. 26, the final analog signals from the demodulation stages are directed to the I/O circuit 956, where they can be digitized by an A/D converter (the ADC). Please note that some microcontrollers contain an internal ADC, and in that situation, the analog signals can pass through the I/O circuit 956 unprocessed, and then be directed to the microcontroller 950.

The laser receiver 910 has several outputs, including an audible output device 980, such as a piezoelectric audio emitter, and a set of LEDs at 990. As can be seen on FIG. 25, there are three lamps 990; the left lamp (on FIG. 25) would be energized if the laser plane was striking to the "LEFT" of the "zero notch" 934; the right lamp (on FIG. 25) would be energized if the laser plane was striking to the "RIGHT" of the "zero notch" 934. Simultaneously, the audible output device 980 could emit a set of loud "beeps" at two different rates to indicate that the laser plane has been detected either to the LEFT of, or to the RIGHT of, the position of the "zero notch" 934. All of these indicators are controlled by the laser receiver controller (e.g., the processing circuit 950) and will be easily understood by the human user who is moving the accessory cart 800.

Finally, FIG. 26 depicts a user-controlled power (ON-OFF) switch at 982. An electrical power supply is depicted at 940, which uses a set of batteries 942. Most standard laser receivers include a timing circuit, and if it detects no user activity for a predetermined time interval (such as 30 minutes), then a "battery saver" circuit will turn off the electronics automatically.

The use of an IR laser light source can be beneficial under certain jobsite conditions. The alternative embodiment depicted in FIGS. 25 and 26 provides a solution for such conditions and, while the laser light line that impacts the target screen 822 may not be visible to the human eye, the ease of use of the accessory cart 800 nevertheless makes it easy for the user to "find" the correct azimuth angle that leads to the point of interest that is being "aimed at" by the laser controller 20. If the jobsite floor has some small obstructions, the laser receiver will still be able to detect the non-visible laser light, so long as the floor obstructions are not too large in vertical size. Moreover, the electronic distance sensor would continue to operate in the same manner as described above, in reference to FIGS. 1, 5, 9, 10, and 17-18.

It will be understood that the embodiment of FIGS. 25 and 26 could be used with any wavelength of laser light, including invisible wavelengths, if desired. The addition of the laser receiver 910 allows the layout system and methodologies disclosed herein to be performed regardless of the jobsite lighting conditions, and regardless of the exact wavelength of the laser light plane being emitted by the laser controller.

Two earlier patent documents are related to the technology disclosed herein, and are hereby incorporated by reference. These patent documents are: U.S. Pat. No. 8,087,176, titled "TWO DIMENSION LAYOUT AND POINT TRANSFER SYSTEM;" and U.S. Pat. No. 8,943,701, titled "AUTOMATED LAYOUT AND POINT TRANSFER SYSTEM." Both of these patent documents are assigned to Trimble Navigation Limited of Sunnyvale, Calif., and are incorporated herein by reference in their entirety.

It will be understood that the logical operations described in relation to the flow charts of FIGS. 11-12 can be implemented using sequential logic (such as by using microprocessor technology), or using a logic state machine, or perhaps by discrete logic; it even could be implemented using parallel processors. One preferred embodiment may use a microprocessor or microcontroller (e.g., microprocessor 410) to execute software instructions that are stored in memory cells within an ASIC. In fact, the entire microprocessor 410, along with RAM and executable ROM, may be contained within a single ASIC, in one mode of the technology disclosed herein. Of course, other types of circuitry could be used to implement these logical operations depicted in the drawings without departing from the principles of the technology disclosed herein. In any event, some type of processing circuit will be provided, whether it is based on a microprocessor, a logic state machine, by using discrete logic elements to accomplish these tasks, or perhaps by a type of computation device not yet invented; moreover, some type of memory circuit will be provided, whether it is based on typical RAM chips, EEROM chips (including Flash memory), by using discrete logic elements to store data and other operating information (such as the distance and angle data stored, for example, in memory circuits 312 or 412), or perhaps by a type of memory device not yet invented.

It will also be understood that the precise logical operations depicted in the flow charts of FIGS. 11-12, and discussed above, could be somewhat modified to perform similar, although perhaps not exact, functions without departing from the principles of the technology disclosed herein. The exact nature of some of the decision steps and other commands in these flow charts are directed toward specific future models of sensing and control system devices used with construction equipment (those involving laser transmitters sold by Trimble Navigation Limited, for example) and certainly similar, but somewhat different, steps would be taken for use with other models or brands of sensing or control systems in many instances, with the overall inventive results being the same.

It will be further understood that any type of product described herein that has moving parts, or that performs functions (such as computers with processing circuits and memory circuits), should be considered a "machine," and not merely as some inanimate apparatus. Such "machine" devices should automatically include power tools, printers, electronic locks, and the like, as those example devices each have certain moving parts. Moreover, a computerized device that performs useful functions should also be considered a machine, and such terminology is often used to describe many such devices; for example, a solid-state telephone answering machine may have no moving parts, yet it is commonly called a "machine" because it performs well-known useful functions.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal." Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

As used herein, the term "substantially vertical" relates to the "plumbness" of an item, such as a laser light plane, or a laser light line. The important feature about something being substantially vertical is the degree of accuracy that is required for a particular construction project. The "verticalness" of a laser light line or a laser light plane could be rather coarse for some projects, perhaps even as coarse as plus or minus 10 degrees from true vertical; in that instance, a laser plane that is substantially vertical could be off by that plus or minus 10 degrees, and still produce satisfactory results. That seems rather absurd for most construction project, to be sure; however, for projects involving short distances, plus or minus 10 degrees from true vertical may suffice. On the other hand, for example, the typical tolerance for self-leveling equipment sold by Trimble, Inc. is more like plus or minus 20 to 45 seconds of arc (0.00556 to 0.0125 degrees) from true vertical. Again, it depends upon the requirements for a specific jobsite, but certainly the tolerance values provided by Trimble's standard equipment is more than satisfactory for meeting the definition of producing a "substantially vertical" laser light plane.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A layout and point transfer system, comprising:
   (a) a laser controller, including:
      (i) a laser light transmitter that emits a substantially vertical plane of laser light, said laser light transmitter being rotatable about a substantially vertical axis;
      (ii) an electronic distance measuring instrument that is rotatable about said substantially vertical axis, said electronic distance measuring instrument being directional about said substantially vertical axis and aimed at the same azimuth angle as said substantially vertical plane of visible wavelength laser light;
      (iii) an electronic angle measuring instrument; and
      (iv) a first processing circuit, a first memory circuit including instructions executable by said first processing circuit, a first communications circuit, and a first input/output interface circuit;
   (b) a remote controller, including:
      (i) a second processing circuit, a second memory circuit including instructions executable by said second processing circuit, a second communications circuit, a display monitor, a user-operated input circuit, and a second input/output interface circuit, wherein said laser controller and said remote controller communicate with one another by use of said first and second communications circuits; and
   (c) a laser light detector system, including:
      (i) a movable target screen, comprising:
         (A) a movable chassis; and
         (B) a screen having a size and shape to intercept said visible wavelength laser light when the chassis is sitting on a jobsite surface, in which said screen includes a surface that is at least partially reflective to emissions from said electronic distance measuring instrument;
      (ii) a laser light receiver, comprising: a third processing circuit, a third memory circuit including instructions executable by said third processing circuit, a third input/output interface circuit, and at least one photosensor that detects a wavelength emitted by said laser light transmitter;
   wherein:
   (d) said first, second, and third processing circuits are configured to:
      (i) to allow a specific point of interest to be selected at said user-operated input circuit;
      (ii) emit from the laser light transmitter said substantially vertical plane of visible wavelength laser light, under the control of said first processing circuit;
      (iii) to aim said laser light transmitter in a predetermined heading under the control of said first processing circuit and at an angle that is determined by said electric angle measuring instrument, so that the substantially vertical plane of visible wavelength laser light is aimed at said selected point of interest on said jobsite surface;
      (iv) to determine an angular position between where the substantially vertical plane of laser light strikes said at least one photosensor and said laser light receiver, and to provide a predetermined indication to indicate an ON POINT status if said laser light receiver is positioned at a predetermined distance along said substantially vertical plane of visible wavelength laser light that corresponds to a physical distance between the electronic distance measuring instrument and the selected point of interest, as measured by said electronic distance measuring instrument;
      (v) to determine a physical distance between said electronic distance measuring instrument and said movable target screen, in which said physical distance is measured in near real time by said electronic distance measuring instrument; and
      (vi) if said movable target screen is positioned at a predetermined distance along said substantially vertical plane of visible wavelength laser light that corresponds to the physical distance between the electronic distance measuring instrument and the selected point of interest, as measured by said electronic distance measuring instrument, then for at least one of (A) said laser controller and (B) said remote controller to provide an indication of an ON POINT status.

2. The system of claim 1, wherein: said substantially vertical plane of laser light comprises light of a wavelength that is not visible to a human eye.

3. The system of claim 1, wherein: (i) if the status of said determined angular position is LEFT, then said laser light receiver will output a first visible indication; (ii) if the status of said determined angular position is RIGHT, then said laser light receiver will output a second visible indication; and (iii) if the status of said determined angular position is ON AZIMUTH, then said laser light receiver will output a third visible indication.

4. The system of claim 1, wherein: (i) if the status of said determined angular position is LEFT, then said laser light receiver will output a first audible indication; (ii) if the status of said determined angular position is RIGHT, then said laser light receiver will output a second audible indication; and (iii) if the status of said determined angular position is ON AZIMUTH, then said laser light receiver will output a third audible indication.

5. The system of claim 1, wherein: (i) if the status of said determined physical distance is TOO LONG, then said display monitor on the remote controller will output a first visible indication; (ii) if the status of said determined physical distance is TOO SHORT, then said display monitor on the remote controller will output a second visible indication; and (iii) if the status of said determined physical distance is ON POINT, then said display monitor on the remote controller will output a third visible indication.

6. The system of claim 1, wherein: (i) if the status of said determined physical distance is TOO LONG, then said remote controller will output a first audible indication; (ii) if the status of said determined physical distance is TOO SHORT, then said remote controller will output a second audible indication; and (iii) if the status of said determined physical distance is ON POINT, then said remote controller will output a third audible indication.

7. A method for setting up a layout and point transfer system, said method comprising:
(a) providing a laser controller, which includes: (i) a laser light transmitter that emits a substantially vertical plane of visible wavelength laser light, said laser light transmitter being rotatable about a substantially vertical axis; (ii) an electronic distance measuring instrument that is rotatable about said substantially vertical axis, said electronic distance measuring instrument being directional about said substantially vertical axis and aimed at the same azimuth angle as said substantially vertical plane of visible wavelength laser light; (iii) an electronic angle measuring instrument; and (iv) a first processing circuit, a first memory circuit including instructions executable by said first processing circuit, a first communications circuit, and a first input/output interface circuit;
(b) providing a remote controller, which includes: a second processing circuit, a second memory circuit including instructions executable by said second processing circuit, a second communications circuit, a display monitor, a user-operated input circuit, and a second input/output interface circuit, wherein said laser controller and said remote controller communicate with one another by use of said first and second communications circuits;
(c) placing said laser controller on a jobsite surface in a work area;
(d) finding a first control point on said jobsite surface, then:
(i) emitting from said laser light transmitter said substantially vertical plane of visible wavelength laser light, thereby creating a visible laser light line along said jobsite surface;
(ii) aiming said laser light transmitter in a predetermined heading under the control of said first processing circuit and at an angle that is determined by said electric angle measuring instrument so that the vertical plane of visible wavelength laser light crosses said first control point on said jobsite surface;
(iii) using said electronic angle measuring instrument, determining a first heading to said first control point;
(iv) placing at least one movable target screen at said first control point; and
(v) using said electronic distance measuring instrument, determining a first physical distance between said electronic distance measuring instrument and said movable target screen;
(e) finding a second control point on said jobsite surface, then:
(i) emitting from said laser light transmitter said substantially vertical plane of visible wavelength laser light, thereby creating a visible laser light line along said jobsite surface;
(ii) aiming said laser light transmitter in a predetermined heading under the control of said first processing circuit and at an angle that is determined by said electric angle measuring instrument so that the vertical plane of visible wavelength laser light crosses said second control point on said jobsite surface;
(iii) using said electronic angle measuring instrument, determining a second heading to said second control point;
(iv) placing said at least one movable target screen at said second control point; and
(v) using said electronic distance measuring instrument, determining a second physical distance between said electronic distance measuring instrument and said movable target screen; and
(f) using jobsite coordinates of (i) said first control point and (ii) said second control point, and using (iii) said first physical distance, (iv) said second physical distance, (v) said first heading data, and (vi) said second heading data, determining, in terms of jobsite coordinates, a position of said laser controller on said jobsite surface.

8. The method of claim 7, wherein: the laser controller coordinates are inserted into a virtual jobsite floor plan that is stored in said second memory circuit of the remote controller.

9. The method of claim 7, wherein: the movable target screen comprises a surface that is at least partially reflective to emissions from said electronic distance measuring instrument.

* * * * *